(12) United States Patent
Lee et al.

(10) Patent No.: US 9,495,058 B2
(45) Date of Patent: Nov. 15, 2016

(54) MOBILE TERMINAL FOR DISPLAYING FUNCTIONS AND DISPLAY CONTROLLING METHOD THEREOF

(75) Inventors: Choonjae Lee, Gwangju (KR); Jiyoun Lee, Seoul (KR); Hyungtae Jang, Seoul (KR); Minjeong Lee, Anyang-si (KR); Younghoon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1112 days.

(21) Appl. No.: 13/332,344

(22) Filed: Dec. 20, 2011

(65) Prior Publication Data

US 2012/0306927 A1   Dec. 6, 2012

(30) Foreign Application Priority Data

May 30, 2011   (KR) ........................ 10-2011-0051453

(51) Int. Cl.
| | | |
|---|---|---|
| G06F 3/033 | (2013.01) | |
| G06F 3/048 | (2013.01) | |
| G06F 3/041 | (2006.01) | |
| G06F 3/0488 | (2013.01) | |
| G06F 3/0354 | (2013.01) | |

(52) U.S. Cl.
CPC ........... *G06F 3/048* (2013.01); *G06F 3/03545* (2013.01); *G06F 3/041* (2013.01); *G06F 3/04883* (2013.01); *G06F 2203/04803* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,760,773 | A * | 6/1998 | Berman et al. | 715/808 |
| 6,249,276 | B1 * | 6/2001 | Ohno | 345/173 |
| 6,720,985 | B1 * | 4/2004 | Lapstun et al. | 715/863 |
| 8,205,157 | B2 * | 6/2012 | Van Os et al. | 715/702 |
| 2003/0107607 | A1 * | 6/2003 | Nguyen | 345/863 |
| 2003/0128195 | A1 * | 7/2003 | Banerjee | G06F 3/03545 345/179 |
| 2004/0155888 | A1 * | 8/2004 | Padgitt et al. | 345/619 |
| 2005/0071761 | A1 * | 3/2005 | Kontio | 715/711 |
| 2005/0198592 | A1 * | 9/2005 | Keely et al. | 715/863 |
| 2006/0209040 | A1 * | 9/2006 | Garside et al. | 345/173 |
| 2008/0141361 | A1 * | 6/2008 | Balfanz | 726/17 |
| 2008/0282196 | A1 * | 11/2008 | Park | 715/838 |
| 2009/0000831 | A1 * | 1/2009 | Miller et al. | 178/19.01 |
| 2009/0007019 | A1 * | 1/2009 | Kobayashi et al. | 715/838 |
| 2009/0077497 | A1 * | 3/2009 | Cho et al. | 715/814 |
| 2009/0178007 | A1 * | 7/2009 | Matas et al. | 715/835 |

(Continued)

FOREIGN PATENT DOCUMENTS

| | | |
|---|---|---|
| EP | 2071436 | 6/2009 |
| JP | 2008-108233 | 5/2008 |
| WO | 2011/023225 | 3/2011 |

OTHER PUBLICATIONS

European Patent Office Application Serial No. 12150830.3, Search Report dated Sep. 1, 2014, 7 pages.

*Primary Examiner* — Hien Duong
(74) *Attorney, Agent, or Firm* — Lee, Hong, Degerman, Kang & Waimey

(57) ABSTRACT

A mobile terminal and display controlling method thereof are disclosed, by which a different function may be executed in accordance with whether a means for touching a touch-screen is a user finger or a touch pen.

21 Claims, 46 Drawing Sheets

(a)

(b)

(56) References Cited

U.S. PATENT DOCUMENTS

| | | | |
|---|---|---|---|
| 2009/0249208 A1* | 10/2009 | Song et al. | 715/721 |
| 2010/0026642 A1* | 2/2010 | Kim et al. | 345/173 |
| 2010/0095205 A1* | 4/2010 | Kinoshita | 715/702 |
| 2010/0182246 A1* | 7/2010 | Petschnigg et al. | 345/173 |
| 2010/0207901 A1* | 8/2010 | Shin | 345/173 |
| 2010/0251112 A1* | 9/2010 | Hinckley et al. | 715/702 |
| 2010/0298034 A1* | 11/2010 | Shin et al. | 455/566 |
| 2010/0306718 A1* | 12/2010 | Shim et al. | 715/863 |
| 2011/0016422 A1* | 1/2011 | Miyazawa et al. | 715/788 |
| 2011/0087983 A1* | 4/2011 | Shim | 715/769 |
| 2011/0107212 A1* | 5/2011 | Jeong | 715/702 |
| 2011/0128825 A1* | 6/2011 | Tanaka | 368/29 |
| 2011/0167369 A1* | 7/2011 | van Os | 715/769 |
| 2011/0167382 A1* | 7/2011 | van Os | 715/800 |
| 2011/0175842 A1* | 7/2011 | Miura | 345/173 |
| 2011/0175855 A1* | 7/2011 | Youn et al. | 345/179 |
| 2011/0209080 A1* | 8/2011 | Bamford et al. | 715/769 |
| 2011/0302530 A1* | 12/2011 | Harris et al. | 715/810 |
| 2011/0304556 A1* | 12/2011 | Harris et al. | 345/173 |
| 2011/0307840 A1* | 12/2011 | Harris et al. | 715/863 |
| 2011/0316888 A1* | 12/2011 | Sachs et al. | 345/667 |
| 2012/0084691 A1* | 4/2012 | Yun | 715/769 |
| 2012/0206374 A1* | 8/2012 | Chen et al. | 345/173 |
| 2012/0242603 A1* | 9/2012 | Engelhardt | G06F 3/03545 345/173 |
| 2012/0284673 A1* | 11/2012 | Lamb et al. | 715/863 |
| 2012/0304087 A1* | 11/2012 | Walkin et al. | 715/764 |
| 2012/0313865 A1* | 12/2012 | Pearce | 345/173 |

\* cited by examiner (a)  (b)

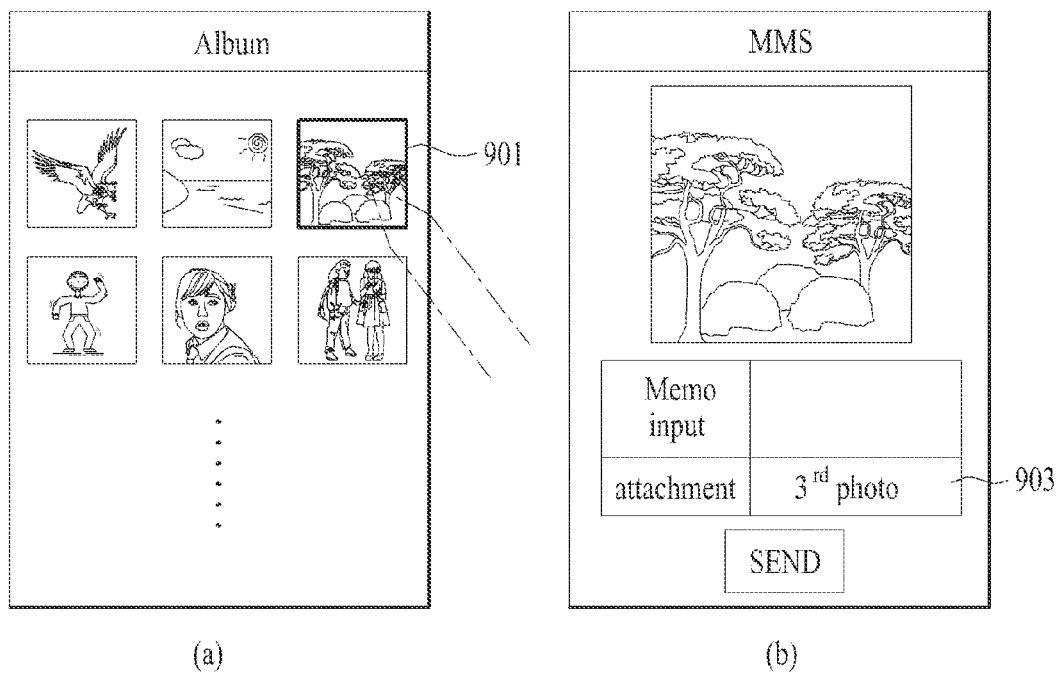
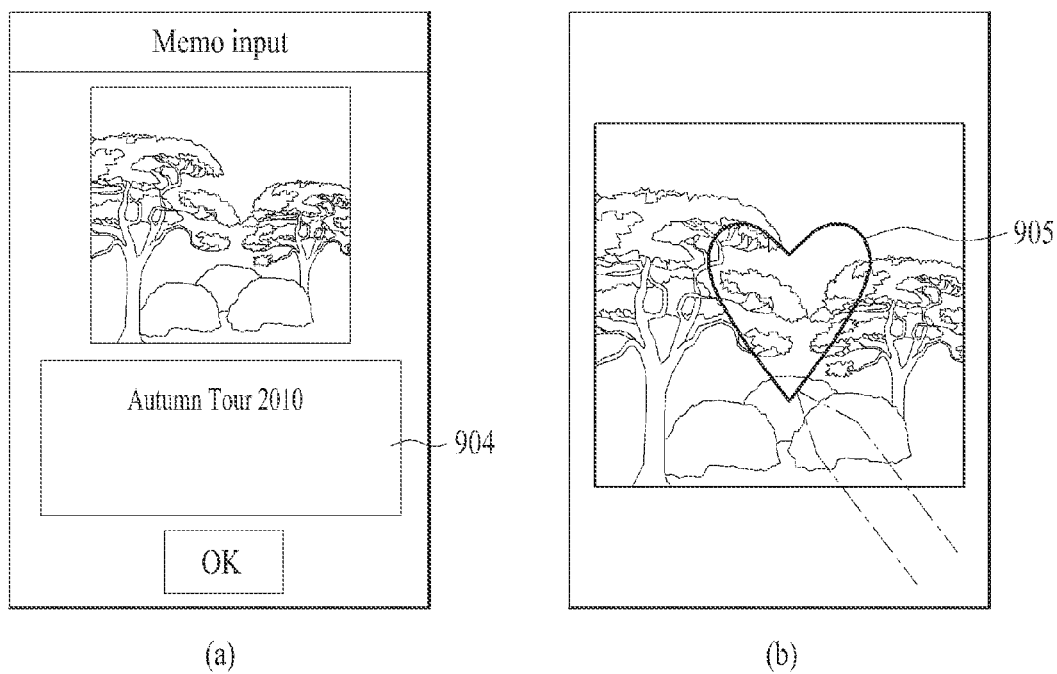

(a)

(b)

(a)

(b)

(a)

(b)

(a)

(b)

(a)

(b)

(a)

(b)

(a)

(b)

(a)

(b)

(a)  (b)

(a)  (b)

(a)　　　　　　　　　　(b)

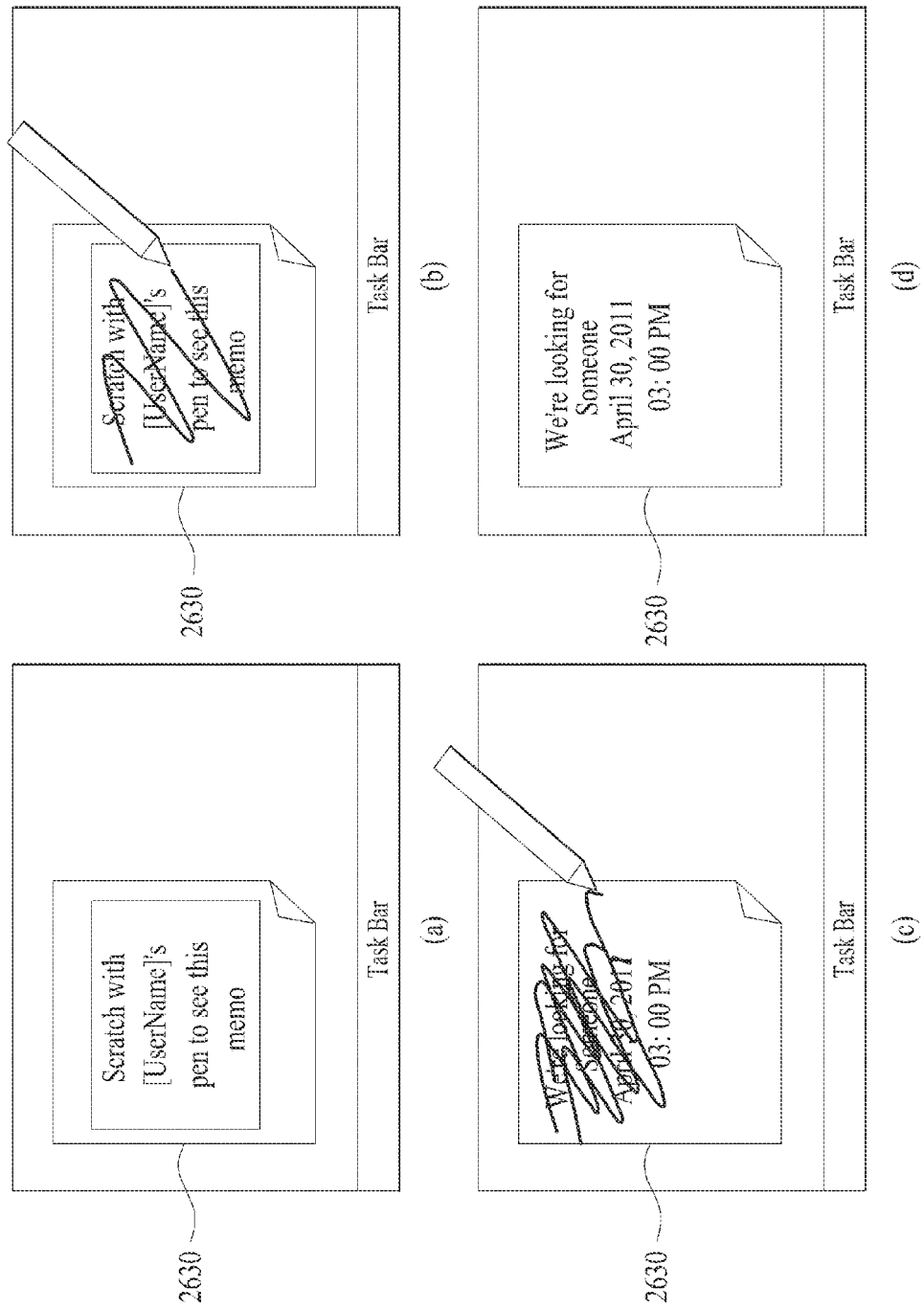

(a)
2701

2702   (b)

MOBILE TERMINAL FOR DISPLAYING FUNCTIONS AND DISPLAY CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0051453, filed on May 30, 2011, the contents of which are hereby incorporated by reference herein in its entirety.

BACKGROUND OF THE INVENTION

1. Field of the Invention

The present invention relates to a mobile terminal, and more particularly, to a mobile terminal and display controlling method thereof. Although the present invention is suitable for a wide scope of applications, it is particularly suitable for facilitating a terminal to be used in further consideration of user's convenience.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, a mobile terminal can be provided with a touchscreen and is able to receive an input of a touch to the touchscreen by a user finger or another touch means (e.g., a touch pen, etc.).

However, the related art fails in controlling a function execution in accordance with what kind of a touch means is used to touch a touchscreen. And, the related art also fails in providing a different user interface in accordance with what kind of a touch means is used to touch a touchscreen.

SUMMARY OF THE INVENTION

Accordingly, the present invention is directed to a mobile terminal and display controlling method thereof that substantially obviate one or more problems due to limitations and disadvantages of the related art.

An object of the present invention is to provide a mobile terminal and display controlling method thereof, by which a different function may be executed in accordance with whether a means for touching a touchscreen is a user finger or a touch pen.

Another object of the present invention is to provide a mobile terminal and display controlling method thereof, by which a size of an object contained in a screen may be adjusted in accordance with whether a means for touching a touchscreen is a user finger or a touch pen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to receive an input of a touch with one of a user finger and a touch pen and a controller configured to determine whether the inputted touch is the touch with the user finger or the touch with the touch pen, to control the touchscreen to display a $1^{st}$ screen in accordance with an execution of a $1^{st}$ function in case of the touch with the user finger, and to control the touchscreen to display a $2^{nd}$ screen in accordance with an execution of a $2^{nd}$ function in case of the touch with the touch pen, wherein the $1^{st}$ and $2^{nd}$ functions are executed in a same application or in $1^{st}$ and $2^{nd}$ applications associated with each other, respectively.

In another aspect of the present invention, a mobile terminal includes a touchscreen configured to receive an input of a touch with one of a user finger and a touch pen and a controller configured to determine whether the inputted touch is the touch with the user finger or the touch with the touch pen, to control a size of at least one object displayed on a screen to become equal to or greater than a predetermined reference in case of the touch with the user finger, and to control the size of the at least one object displayed on the screen to become smaller than the predetermined reference in case of the touch with the touch pen.

In another aspect of the present invention, a method of controlling a display in a mobile terminal includes the steps of receiving an input of a touch with one of a user finger and a touch pen using a touchscreen, determining whether the inputted touch is the touch with the user finger or the touch with the touch pen, displaying a $1^{st}$ screen in accordance with an execution of a $1^{st}$ function in case of the touch with the user finger, and displaying a $2^{nd}$ screen in accordance with an execution of a $2^{nd}$ function in case of the touch with the touch pen, wherein the $1^{st}$ and $2^{nd}$ functions are executed in a same application or in $1^{st}$ and $2^{nd}$ applications associated with each other, respectively.

In a further aspect of the present invention, a method of controlling a display in a mobile terminal includes the steps of receiving an input of a touch with one of a user finger and a touch pen using a touchscreen, determining whether the inputted touch is the touch with the user finger or the touch with the touch pen, controlling a size of at least one object displayed on a screen to become equal to or greater than a predetermined reference in case of the touch with the user finger, and controlling the size of the at least one object displayed on the screen to become smaller than the predetermined reference in case of the touch with the touch pen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

The above and other aspects, features, and advantages of the present invention will become more apparent upon consideration of the following description of preferred embodiments, taken in conjunction with the accompanying drawing figures. In the drawings:

FIG. 7A and FIG. 7B are diagrams of screen configuration for executing $1^{st}$ and $2^{nd}$ functions according to a schedule application;

FIGS. 9A to 9C are diagrams of screen configuration for executing $1^{st}$ and $2^{nd}$ functions according to a photo album application;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
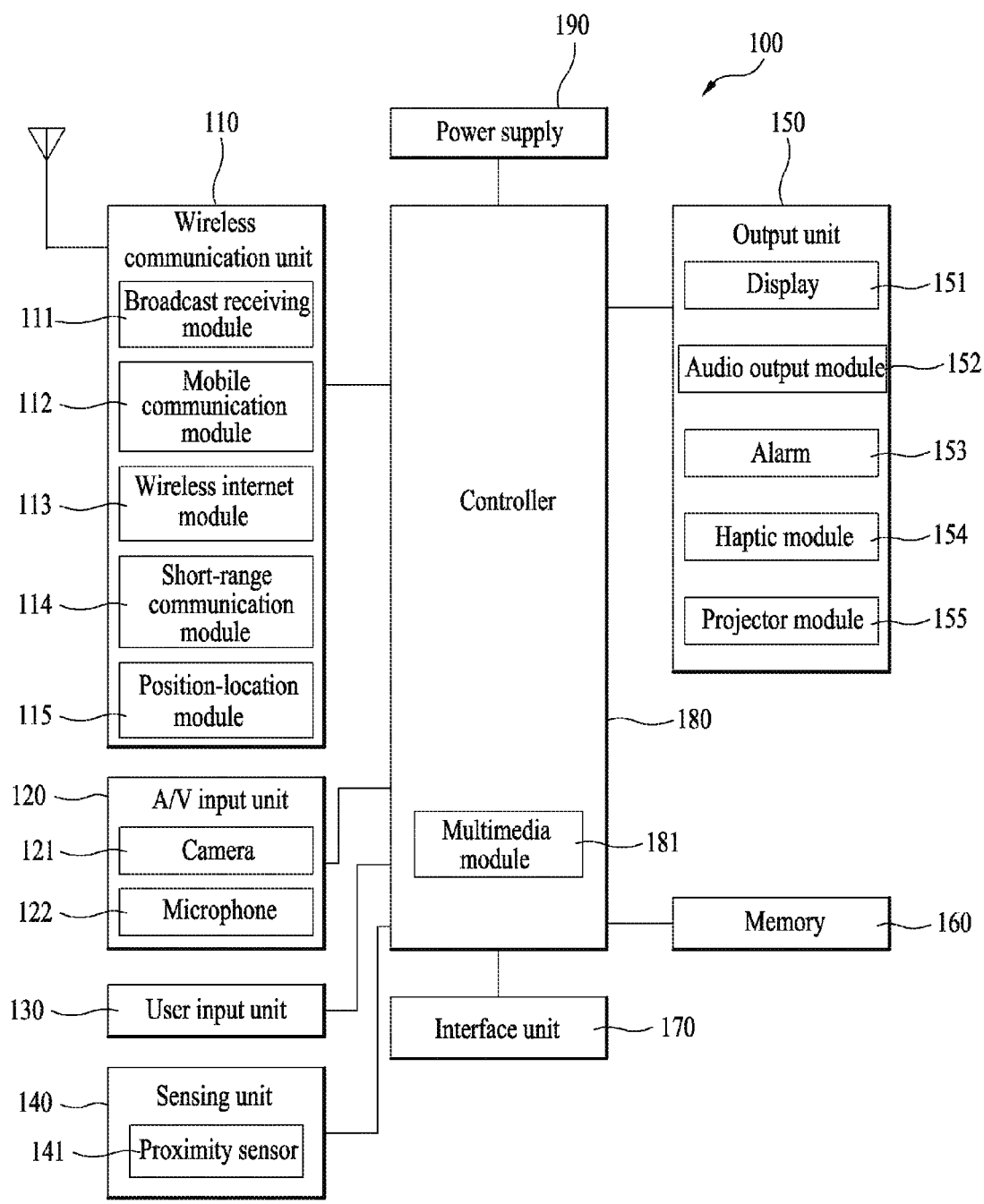
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (NV) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display.

The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
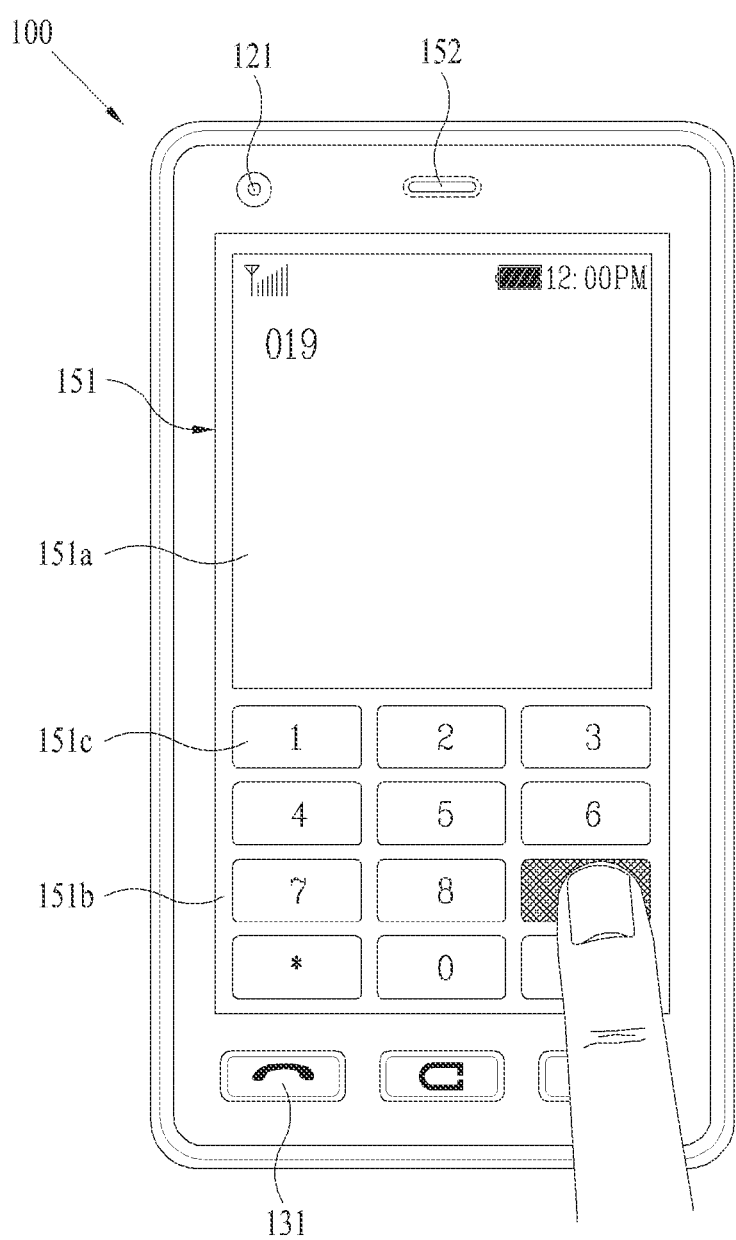
FIG. 2A and FIG. 2B are front diagrams of a mobile terminal according to one embodiment of the present invention for explaining one operational status of the mobile terminal, respectively.
Figure 2B:
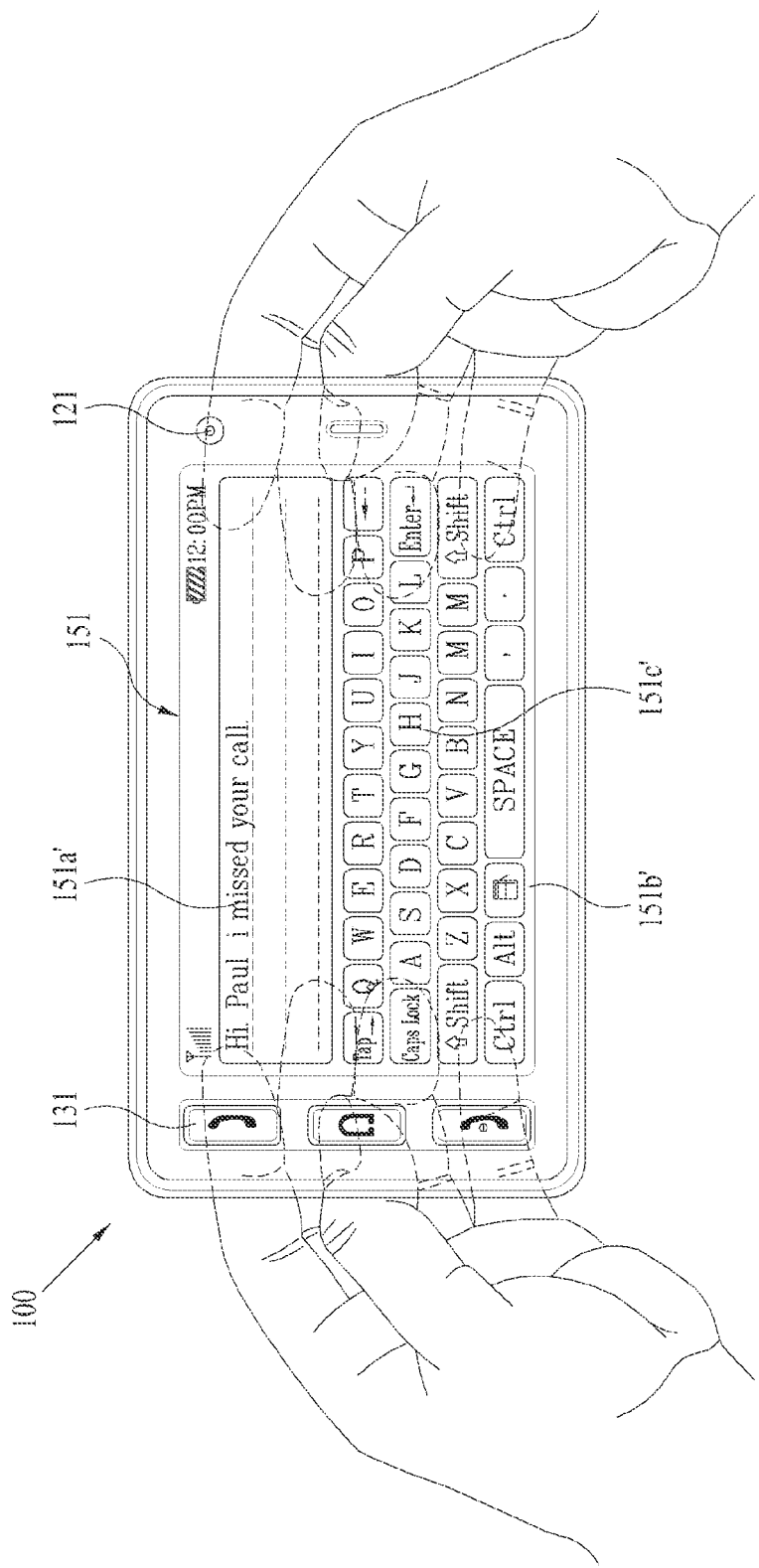

FIG. 2A and FIG. 2B are front-view diagrams of a terminal according to one embodiment of the present invention for explaining an operational state thereof.

First of all, various kinds of visual informations can be displayed on the display unit 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 2A shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151*a* and an input window 151*b* are displayed on the display unit 151. A soft key 151*c* representing a digit for inputting a phone number or the like is outputted to the input window 151*b*. If the soft key 151*c* is touched, a digit corresponding to the touched soft key is outputted to the output window 151*a*. If the first manipulating unit 131 is manipulated, a call connection for the phone number displayed on the output window 151*a* is attempted.

FIG. 2B shows that a touch applied to a soft key is inputted through a rear face of a terminal body. If FIG. 2A shows a case that the terminal body is vertically arranged (portrait), FIG. 2B shows a case that the terminal body is horizontally arranged (landscape). And, the display unit 151 can be configured to change an output picture according to the arranged direction of the terminal body.

FIG. 2B shows that a text input mode is activated in the terminal.

An output window 151*a*' and an input window 151*b*' are displayed on the display unit 151. A plurality of soft keys 151*c*' representing at least one of characters, symbols and digits can be arranged in the input window 151*b*'. The soft keys 151*c*' can be arranged in the QWERTY key formation.

If the soft keys 151*c*' are touched through the touchpad, the characters, symbols and digits corresponding to the touched soft keys are outputted to the output window 151*a*'. Thus, the touch input via the touchpad is advantageous in that the soft keys 151*c*' can be prevented from being blocked by a finger in case of touch, which is compared to the touch input via the display unit 151. In case that the display unit 151 and the touchpad are configured transparent, it is able to visually check fingers located at the backside of the terminal body. Hence, more correct touch inputs are possible.

Besides, the display unit 151 or the touchpad can be configured to receive a touch input by scroll. A user scrolls the display unit 151 or the touchpad to shift a cursor or pointer located at an entity (e.g., icon or the like) displayed on the display unit 151. Furthermore, in case that a finger is shifted on the display unit 151 or the touchpad, a path of the shifted finger can be visually displayed on the display unit 151. This may be useful in editing an image displayed on the display unit 151.

To cope with a case that both of the display unit (touchscreen) 151 and the touchpad are touched together within a predetermined time range, one function of the terminal can be executed. The above case of the simultaneous touch may correspond to a case that the terminal body is held by a user using a thumb and a first finger (clamping). The above function can include activation or deactivation for the display unit 151 or the touchpad.

The mobile terminal mentioned in this specification may include at least one of the former components shown in FIG. 1. In particular, the display module 151 may include a touchscreen. And, the touchscreen 151 shall be indicated by the same reference number 151 of the display unit 151. Of course, the touchscreen may operate as the user input unit 130 in case of receiving an input of a touch from a user.

According to the present invention, the mobile terminal 100 may receive an input of a touch to the touchscreen 151 using a user finger or a touch pen. In accordance with whether the touch is inputted using the user finger or the touch pen, the mobile terminal 100 may be able to perform an adaptive operation. For instance, a user interface (hereinafter abbreviated UI) in case of the touch with the user finger may differ from a user interface in case of the touch with the touch pen.

In the following description, a method of controlling a display in a mobile terminal in accordance with whether a touchscreen is touched with a user finger or a touch pen is explained in detail with reference to the accompanying drawings.

First of all, the following embodiment is performed in a manner of executing a function differing in accordance with whether a touch input means is a user finger or a touch pen and then displaying a different function executed screen in accordance with the executed function [cf. FIGS. 3 to 20B].

Figure 3:
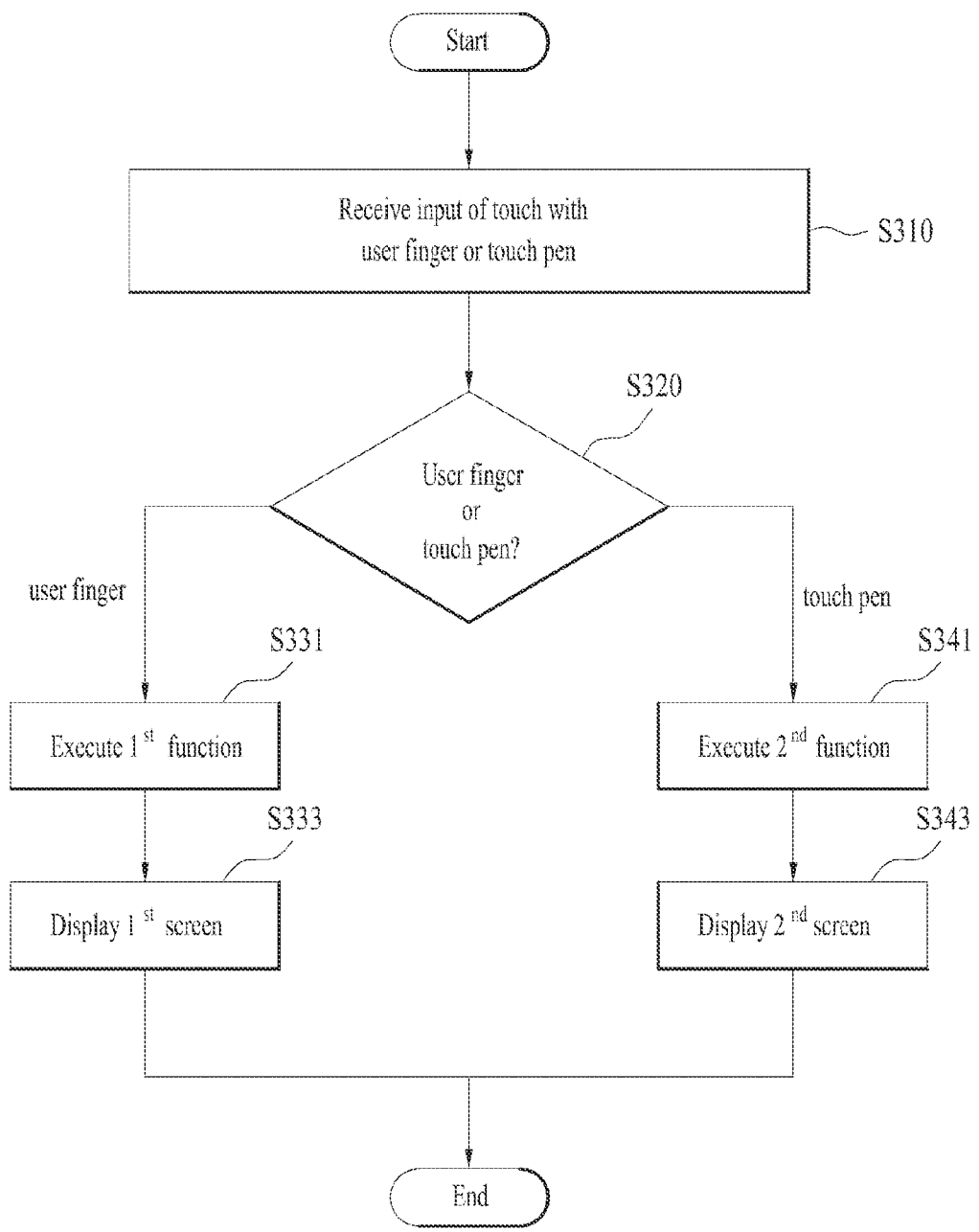
FIG. 3 is a $1^{st}$ flowchart for a method of controlling a display in a mobile terminal according to one embodiment of the present invention.

FIG. 3 is a $1^{st}$ flowchart for a method of controlling a display in a mobile terminal according to one embodiment of the present invention.

Referring to FIG. 3, the mobile terminal 100 may receive an input of a touch to a random point on the touchscreen 151 with either a user finger or a touch pen [S310].

In this case, the touch may be performed on a random point on a screen or a random point within a specific object displayed on the screen.

The touch pen may man the pen for a touch input to the touchscreen. In particular, the touch pen may be dedicatedly used for a specific terminal only in a manner being uniquely designated to the specific terminal [hereinafter named a dedicated touch pen]. Alternatively, the touch pen may be universally usable for all terminals instead of being designated to a specific terminal [hereinafter named a common touch pen]. In case that a dedicated touch pen is not designated, the mobile terminal 100 may be able to recognize a touch with a common touch pen. In particular, if the dedicated touch pen is designated, it may be able to prevent an unauthorized touch input performed on a user terminal by a stranger via a touch pen different from the dedicated touch pen to input information to the user terminal or to search the user terminal for information.

In the following description, a touch mode setting process is explained with reference to FIG. 4A and FIG. 4B.

Figure 4A:
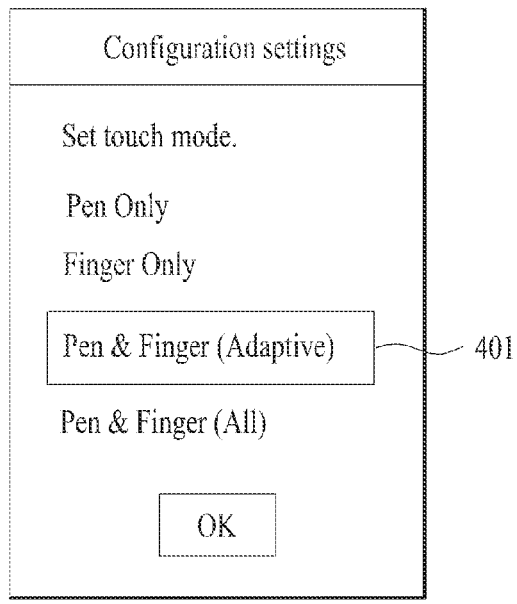
FIG. 4A and FIG. 4B are diagrams of screen configuration for setting a touch mode through a menu search according to the present invention.
Figure 4B:
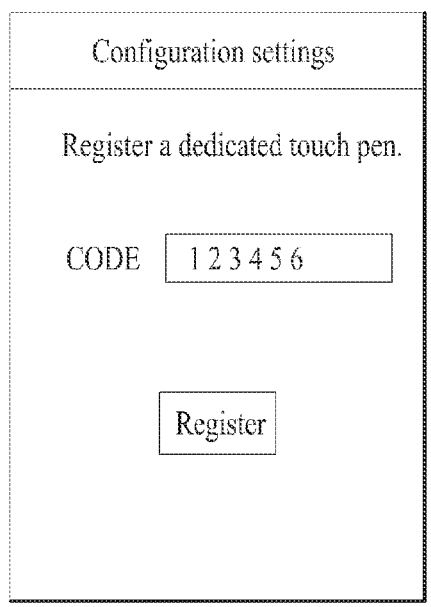

FIG. 4A and FIG. 4B are diagrams of screen configuration for setting a touch mode through a menu search according to the present invention.

Referring to FIG. 4A, the mobile terminal 100 may be able to enter a configuration setting menu for setting a touch mode via a menu search by a user. For instance, the touch mode may include one of a pen-only mode (Pen Only) for recognizing a touch with a touch pen only, a finger-only mode (Finger Only) for recognizing a touch with a user finger only, a mode {Pen & Finger (Adaptive)} for recognizing a touch with a user finger and a touch with a touch pen both and providing a UI differing in accordance with the touch with the user finger or the touch with the touch pen, a mode {Pen & Finger (All)} for recognizing a touch with a user finger and a touch with a touch pen both and providing a UI differing irrespective of the touch with the user finger or the touch with the touch pen, and the like.

In particular, in FIG. 4A, if the touch mode corresponding to the Pen & Finger (Adaptive) 401 is set, the mobile terminal 100 may be able to perform a function execution control and a display control to correspond to a touch input means of the present invention.

Referring to FIG. 4B, the mobile terminal 100 may be able to designate a dedicated touch pen. Hence, the mobile terminal 100 may be able to recognize a touch with the designated dedicated touch pen only but may not recognize a touch with other touch pens. Of course, although the dedicated touch pen is designated, the mobile terminal 100 may be able to recognize a touch with a user finger.

For instance, in order to designate a dedicated touch pen, an identification information (e.g., a code) set for the dedicated touch pen may be directly inputted to the mobile terminal 100 or a signal for a dedicated touch pen designation may be transceived between the dedicated touch pen and the mobile terminal 100. Alternatively, when the mobile terminal 100 is manufactured or sold, a dedicated touch pen of the mobile terminal 100 may be manufactured or sold by designating the corresponding dedicated touch pen. Optionally, at least two or more dedicated touch pens may be designated.

Referring now to FIG. 3, under the control of the controller 180, the mobile terminal 100 may determine whether the touch inputted in the inputting step S310 is a touch with a user finger or a touch with a touch pen [S320].

In the determining step S320, the controller 180 may be able to determine the touch with the user finger or the touch with the touch pen using at least one of a touch size, a touch pressure, an electrostatic variation attributed to a touch, a temperature variation attributed to a touch, and the like.

For instance, the controller 180 may be able to determine the touch with the user finger in one of a case that a touch size is equal to or greater than a predetermined reference, a case that a touch pressure is equal to or greater than a predetermined reference, a case that a temperature variation attributed to a touch is equal to or greater than a predetermined reference, and a case that an electrostatic variation attributed to a touch lies within a rage of the electrostatic variation attributed to the finger touch. For another instance, the controller 180 may be able to determine the touch with the touch pen in one of a case that a touch size is smaller than a predetermined reference, a case that a touch pressure is smaller than a predetermined reference, a case that a temperature variation attributed to a touch is smaller than a predetermined reference, and a case that an electrostatic variation attributed to a touch lies within a rage of the electrostatic variation attributed to the pen touch.

In the determining step S320, the mobile terminal 100 may receive a prescribed signal from the touch pen using the wireless communication unit 110. Thereafter, the mobile terminal 100 may be able to determine that a signal received after the reception of the prescribed signal from the touch pen is the touch with the touch pen under the control of the controller 180.

In particular, if a user presses a prescribed button (or a key) provided to the touch pen, the touch pen may be able to transmit a signal, which indicates that a touch with the touch pen will be inputted to the touchscreen 151, to the mobile terminal 100. Having received the signal from the touch pen, the mobile terminal 100 may set a paring with the touch pen. Thereafter, the mobile terminal 100 may determine a touch, which is inputted after the pairing setup, as a touch with the paired touch pen.

The mobile terminal 100 may be further provided with a $1^{st}$ key (or a $1^{st}$ key zone) corresponding to the finger touch and a $2^{nd}$ key (or a $2^{nd}$ key zone) corresponding to the pen touch. The mobile terminal 100 may determine a touch, which is inputted after selection of the $1^{st}$ key, as a touch with a user finger. And, the mobile terminal 100 may determine a touch, which is inputted after selection of the $2^{nd}$ key, as a touch with a touch pen. Moreover, the $1^{st}$ and $2^{nd}$ keys can be provided as a toggle key.

In the determining step S320, if the dedicated touch pen is designated, the mobile terminal 100 may determine whether the inputted touch is a touch with the dedicated touch pen or a touch with the common touch pen.

In the determining step S320, the controller 180 may compare an identification information of the touch pen contained in the signal received from the touch pen and a previously saved identification information of the dedicated touch pen (cf. the dedicated pen designating process shown in FIG. 4B). As a result of the comparison, if the both of the identification informations match each other, the controller 180 may set a pairing and may be then able to determine that a touch inputted later is the touch with the dedicated touch pen.

In the determining step S320, the controller 180 may enable a prescribed password to be inputted before a touch with the touch pen is performed. If the inputted password matches a preset password, the controller 180 may allow the touch with the touch pen and may be also able to determine that a touch inputted later is the touch with the dedicated touch pen.

If the touchscreen 151 of the mobile terminal 100 is provided with a touch panel capable of recognizing a touch with a dedicated touch pen only, the controller 180 may not be able to recognize a touch with another pen except the dedicated touch pen at all in the determining step S320. Of course, the controller 180 may be basically able to recognize a touch with a user finger.

Moreover, while a dedicated touch pen is designated, if a touch with a common touch pen is inputted, the mobile terminal 100 may not recognize the touch itself or may enable the inputted touch to operate like the touch with the user finger by recognizing the touch.

In case of determining that the inputted touch is the touch with the user finger in the determining step S320, the mobile terminal 100 may execute a $1^{st}$ function [S331] and may display a $1^{st}$ screen in accordance with the $1^{st}$ function execution on the touchscreen 151 [S333], under the control of the controller 180.

In case of determining that the inputted touch is the touch with the touch pen in the determining step S320, the mobile terminal 100 may execute a $2^{nd}$ function [S341] and may display a $2^{nd}$ screen in accordance with the $2^{nd}$ function execution on the touchscreen 151 [S343], under the control of the controller 180.

In doing so, both of the $1^{st}$ and $2^{nd}$ functions may be executed in the same application. Alternatively, the $1^{st}$ function and the $2^{nd}$ function may be executed by $1^{st}$ application and a $2^{nd}$ application associated with each other, respectively. For instance, in case that the same application is a message application, the $1^{st}$ function and the $2^{nd}$ function may include a message display function and a message writing function, respectively. For another instance, in case that the $1^{st}$ application and the $2^{nd}$ application include a phonebook application and a message application, respectively, the $1^{st}$ function and the $2^{nd}$ function may include a counterpart information display function executed in the phonebook application and a message writing function executed in the message application, respectively.

In particular, the $1^{st}$ function may include an information display function and the $2^{nd}$ function may include an information input function. In more particular, the information display function may include a photo display function, a message display function and a counterpart information display function. And, the information input function may include a photo editing function, a message writing function and a counterpart information editing function.

The $1^{st}$ function may include a basic function and the $2^{nd}$ function may include a touch pen dedicated function. In more particular, the basic function may include a function performed if a touch input with a user finger is recognized as a general user input. And, the touch pen dedicated function may include a function of enabling a touch input for a function control to be inputted by a touch pen only. Moreover, the touch pen dedicated function may be designated by a user in direct or may be randomly designated by the controller 180 with reference to a property per function.

Furthermore, whether a corresponding function is the touch pen dedicated function for each function may be included as a default.

In case of receiving an input of a touch with a touch pen in the course of displaying the 1$^{st}$ screen, the mobile terminal 100 stops the execution of the 1$^{st}$ function and may be able to execute the 2$^{nd}$ screen by executing the 2$^{nd}$ function. Alternatively, in case of receiving an input of a touch with a user finger in the course of displaying the 2$^{nd}$ screen, the mobile terminal 100 stops the execution of the 2$^{nd}$ function and may be able to execute the 1$^{st}$ screen by executing the 1$^{st}$ function.

In the following description, a process for executing a 1$^{st}$ or 2$^{nd}$ function per application is explained with reference to the accompanying drawings.

Figure 5A:
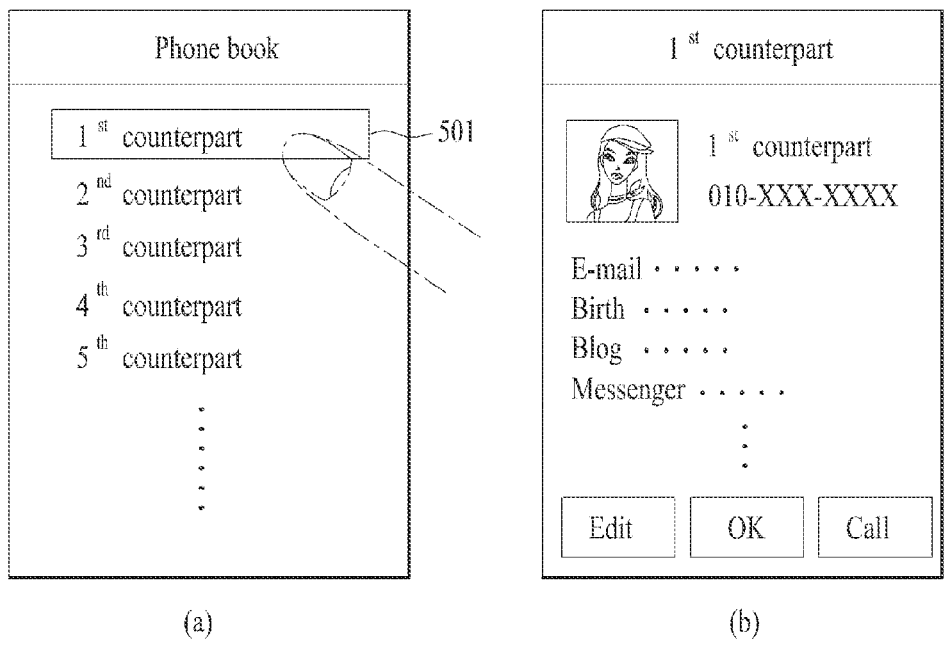
FIG. 5A and FIG. 5B are diagrams of screen configuration for executing $1^{st}$ and $2^{nd}$ functions according to a phonebook application.
Figure 5B:
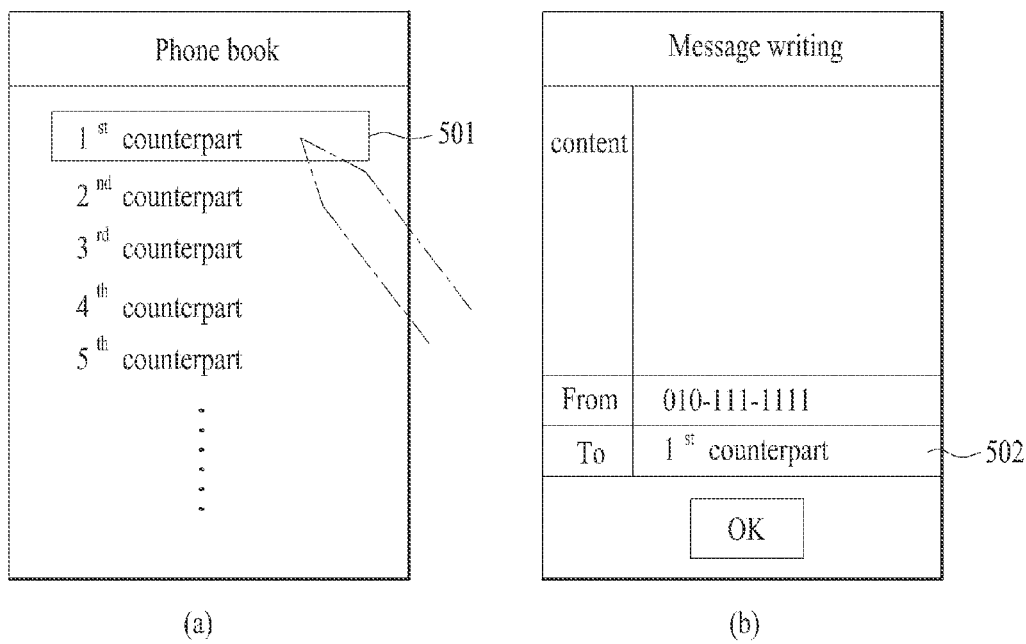

FIG. 5A and FIG. 5B are diagrams of screen configuration for executing 1$^{st}$ and 2$^{nd}$ functions according to a phonebook application.

Referring to FIG. 5A (a) and FIG. 5B (a), if a phonebook application is executed, the mobile terminal 100 may display a counterpart list containing at least one counterpart. In this case, the at least one counterpart contained in the counterpart list may include a counterpart of which information (e.g., phone number, name, photo, email address, etc.) is saved in the memory 160 in association with the phonebook application.

The counterpart list display according to the execution of the phonebook application is shown in the drawing. Yet, any application (e.g., a call application for a recent call log, a message application for a message transceived list, a messenger application for a chat counterpart list, etc.) capable of providing a counterpart list may be substituted for the phonebook application.

Referring to FIG. 5A (b), in case of receiving an input of a touch with a user finger to a 1$^{st}$ counterpart 501 shown in FIG. 5A (a), the mobile terminal 100 may provide a counterpart information on the 1$^{st}$ counterpart 501 [Execution of a counterpart information providing function of a phonebook application].

Referring to FIG. 5B (b), in case of receiving an input of a touch with a touch pen to a 1$^{st}$ counterpart 501 shown in FIG. 5B (a), the mobile terminal 100 may display a message writing window having the 1$^{st}$ counterpart 501 set as a reception counterpart 502 [Execution of a message writing/sending function of a message application]. As well as the message writing/sending function, such a data transmission function having the reception counterpart set to the 1$^{st}$ counterpart 501 as an email writing/sending function, an SMS writing/sending function, an IMS chatting function and the like may be variously executed.

Meanwhile, in case of receiving an input of a touch with a touch pen to a 1$^{st}$ counterpart 501 in FIG. 5B (a), the mobile terminal 100 may display a window for editing a counterpart information on the 1$^{st}$ counterpart 501 [Execution of a counterpart information editing function of a phonebook application] [not shown in the drawing].

Moreover, in case of receiving an input of a touch with a touch pen to a 1$^{st}$ counterpart 501 in FIG. 5B (a), the mobile terminal 100 may display a window (e.g., IME (Input Method Editor)) for receiving an input of a handwriting in direct instead of or together with a virtual keypad [not shown in the drawing].

Figure 6A:
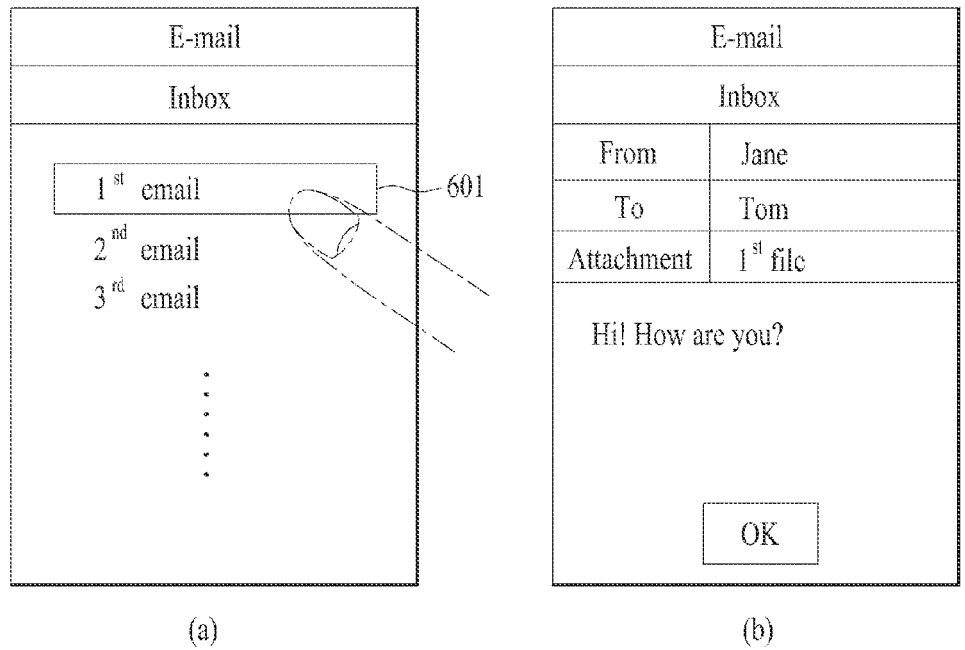
FIG. 6A and FIG. 6B are diagrams of screen configuration for executing $1^{st}$ and $2^{nd}$ functions according to an email application.
Figure 6B:
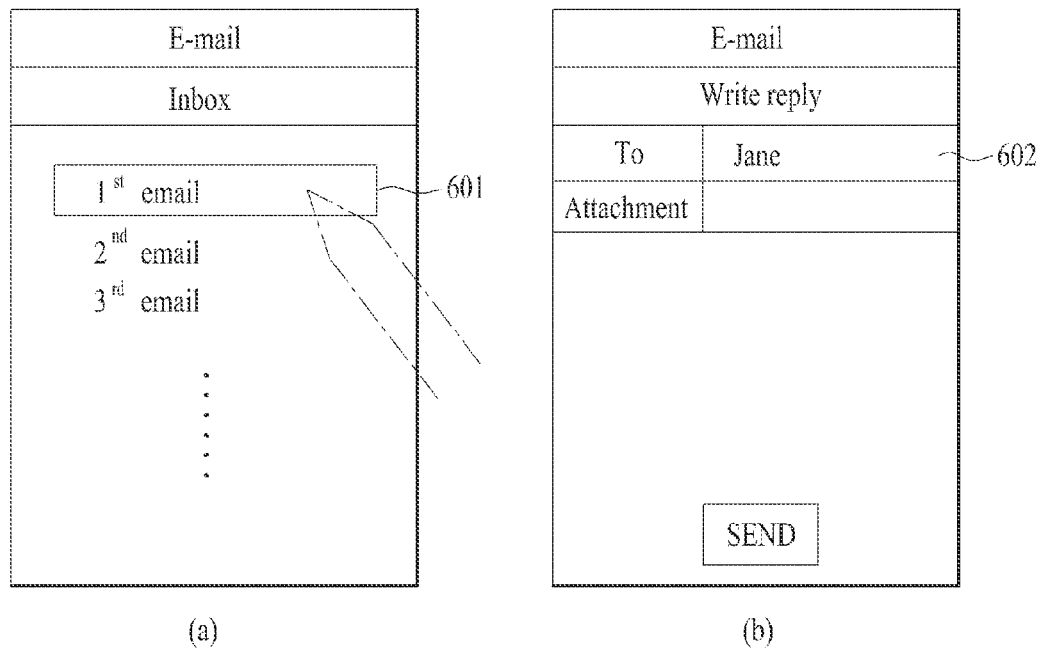

FIG. 6A and FIG. 6B are diagrams of screen configuration for executing 1$^{st}$ and 2$^{nd}$ functions according to an email application.

Referring to FIG. 6A (a) and FIG. 6B (a), if an email application is executed, the mobile terminal 100 may display an email list containing at least one transmitted or received email.

The email list according to the execution of the email application is described with reference to the drawing for example, which may be applicable to a message list according to an execution of a message application.

Referring to FIG. 6A (b), in case of receiving an input of a touch with a user finger to a 1$^{st}$ email 601 shown in FIG. 6A (a), the mobile terminal 100 may display a detail information (e.g., transmission/reception counterpart information, attachment file, contents, etc.) of the 1$^{st}$ email 601 [Execution of an email content providing function of an email application].

Referring to FIG. 6B (b), in case of receiving an input of a touch with a touch pen to a 1$^{st}$ email 601 shown in FIG. 6B (a), assuming that the 1$^{st}$ email 601 is a received email, the mobile terminal 100 may display an email writing window (or a reply email writing window) having a transmission counterpart of the 1$^{st}$ email 601 set as a reception counterpart 602 [Execution of an email writing/sending function of an email application].

Meanwhile, in case of receiving an input of a touch with a touch pen to a 1$^{st}$ email 601 in FIG. 6B (a), the mobile terminal 100 may display a window (e.g., IME (Input Method Editor)) for receiving an input of a handwriting in direct instead of or together with a virtual keypad [not shown in the drawing].

Figures 7A, 7B:
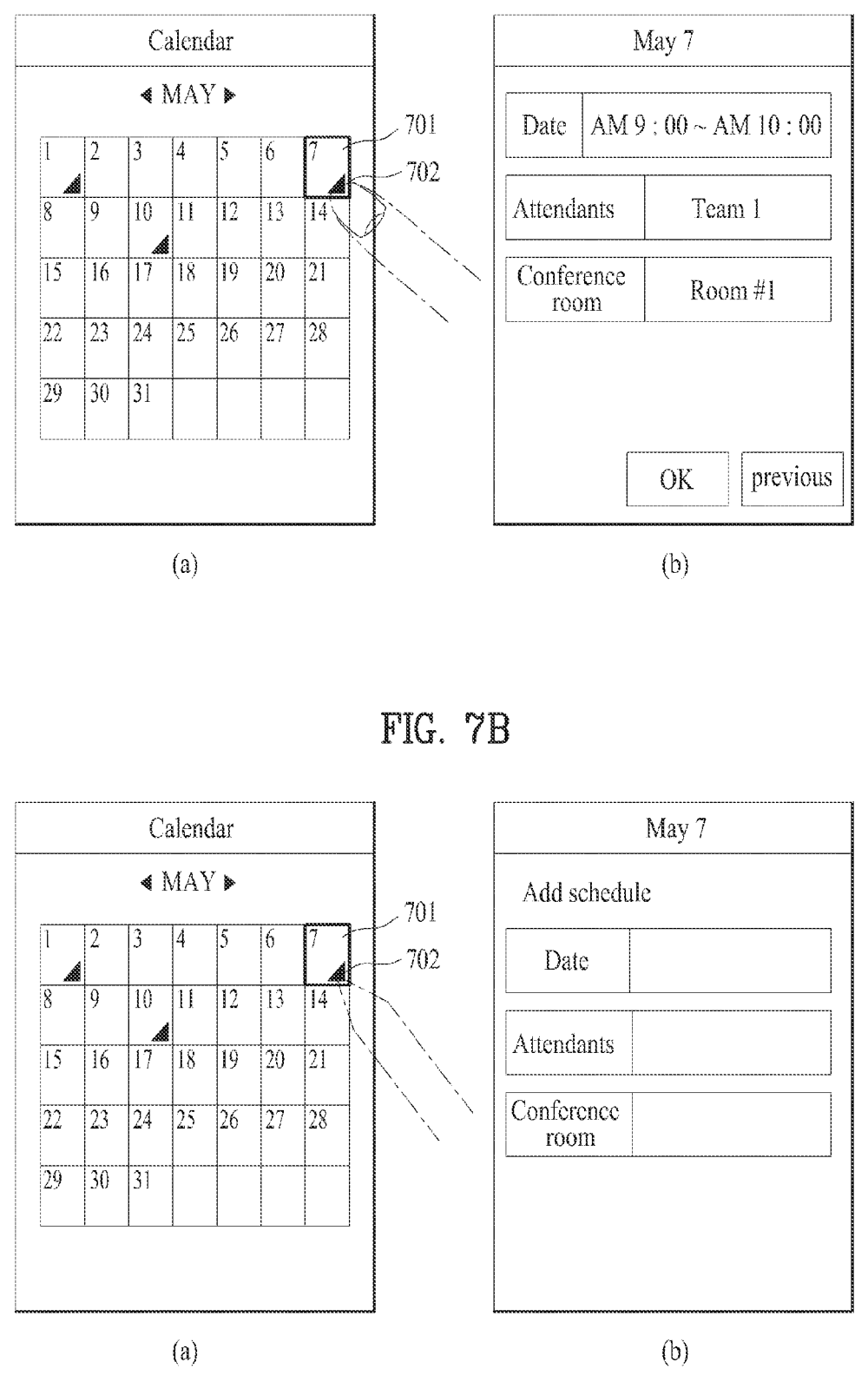

FIG. 7A and FIG. 7B are diagrams of screen configuration for executing 1$^{st}$ and 2$^{nd}$ functions according to a schedule application.

Referring to FIG. 7A (a) and FIG. 7B (a), if a schedule application is executed, the mobile terminal 100 may display a calendar having at least one schedule marked on a corresponding date. Of course, the at least one schedule may be displayed as a list.

Referring to FIG. 7A (b), in case of receiving an input of a touch with a user finger to 'May 7' 701 or a specific schedule 702 corresponding to the 'May 7' 701 in FIG. 7A (a), the mobile terminal 100 may provide a detail information on the specific schedule 702 [Execution of a schedule information providing function of an schedule application].

Referring to FIG. 7B (b), in case of receiving an input of a touch with a touch pen to 'May 7' 701 shown in FIG. 7B (a), the mobile terminal 100 may display a schedule input window for adding a new schedule to the 'May 7' [Execution of a schedule adding function of a schedule application].

Meanwhile, in case of receiving an input of a touch with a touch pen to a specific schedule 702 corresponding to 'May 7' in FIG. 7B (a), the mobile terminal 100 may display a window (e.g., IME (Input Method Editor)) for receiving an input of a handwriting in direct instead of or together with a virtual keypad [not shown in the drawing].

Figure 8A:
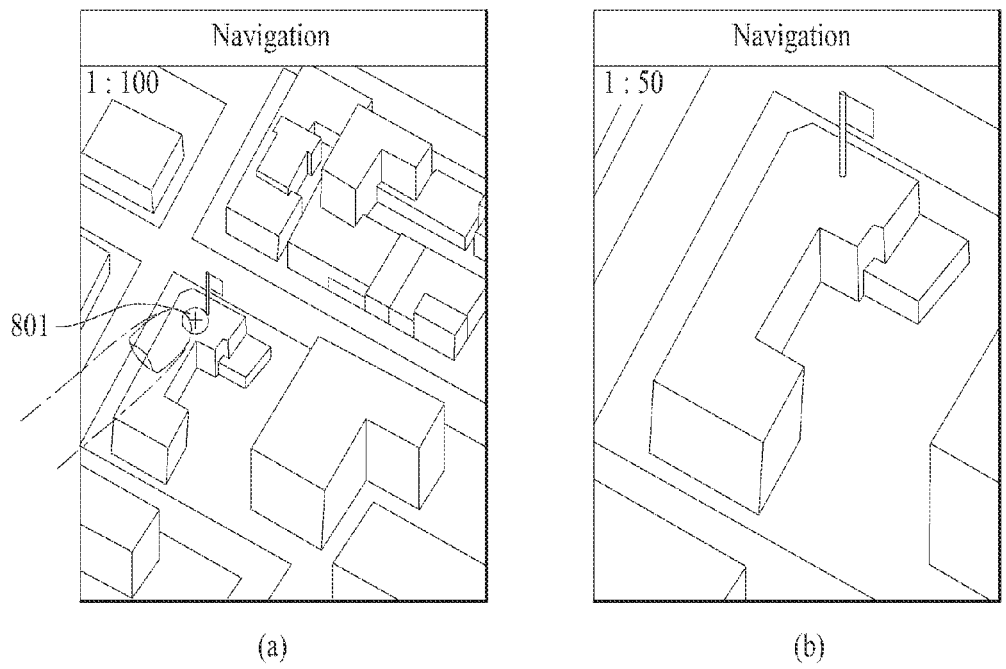
FIGS. 8A to 8C are diagrams of screen configuration for executing $1^{st}$ and $2^{nd}$ functions according to a map application.
Figure 8B:
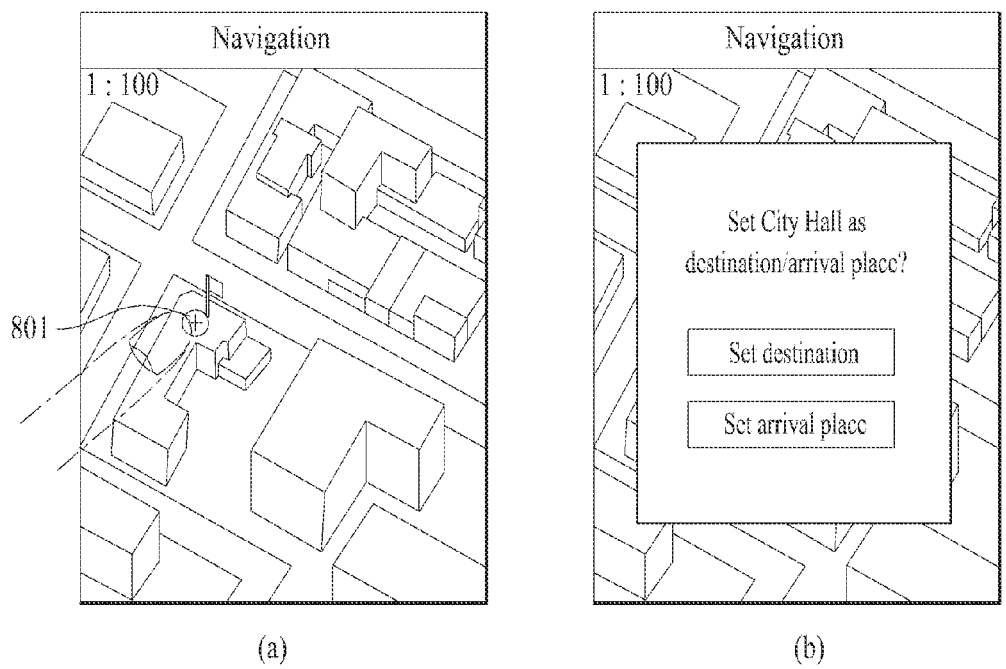
Figure 8C:
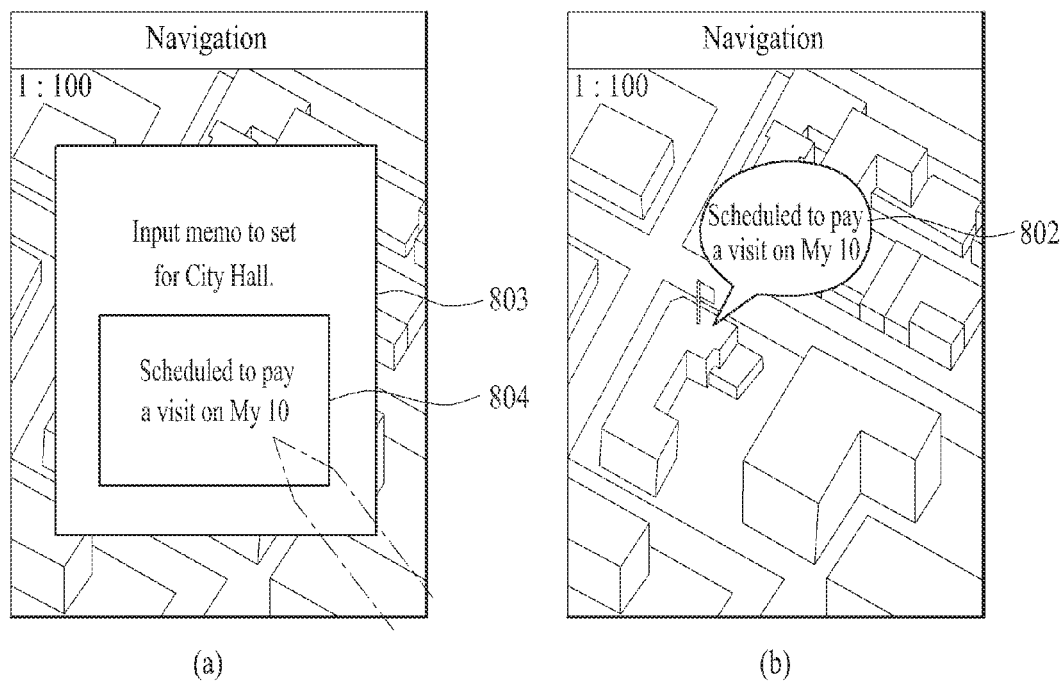

FIGS. 8A to 8C are diagrams of screen configuration for executing 1$^{st}$ and 2$^{nd}$ functions according to a map application. For clarity and convenience of the following description, assume that a map image is displayed on the touchscreen 151.

Referring to FIG. 8A, in case of receiving an input of a touch with a user finger to a specific point 801 on a map image [FIG. 8A (a)], the mobile terminal 100 may enlarge and display the map image centering on the specific point 801 [Execution of an enlarged view function of a map application] [FIG. 8A (b)].

Referring to FIG. 8B, in case of receiving an input of a touch with a touch pen to a specific point 801 [FIG. 8B (a)], the mobile terminal 100 may display a window for querying whether to set a place corresponding to the specific point 801 as a destination or an arrival point [Execution of a place setting function of a map application] [FIG. 8B (b)]. Hence, if a user selects the destination or the arrival point, the mobile terminal 100 may set the place corresponding to the specific point 801 as the destination or the arrival point.

Referring to FIG. 8C, in case of receiving an input of a touch with a touch pen to a specific point 801 on a map image [FIG. 8B (a)], the mobile terminal 100 may display a window 803 for receiving an input of a memo to be set for a place corresponding to the specific point 801 [Execution of a memo input function of a map application [FIG. 8C (a)]. In particular, a window 804 for receiving an input of a handwriting from a user in direction may be included in the window 803. The mobile terminal 100 may set the inputted memo (e.g., scheduled to pay a visit on May 10) for the place corresponding to the specific point 801 and may then display the set memo 802 for the specific point 801 on the map image [FIG. 8C (b)].

Figure 9A:
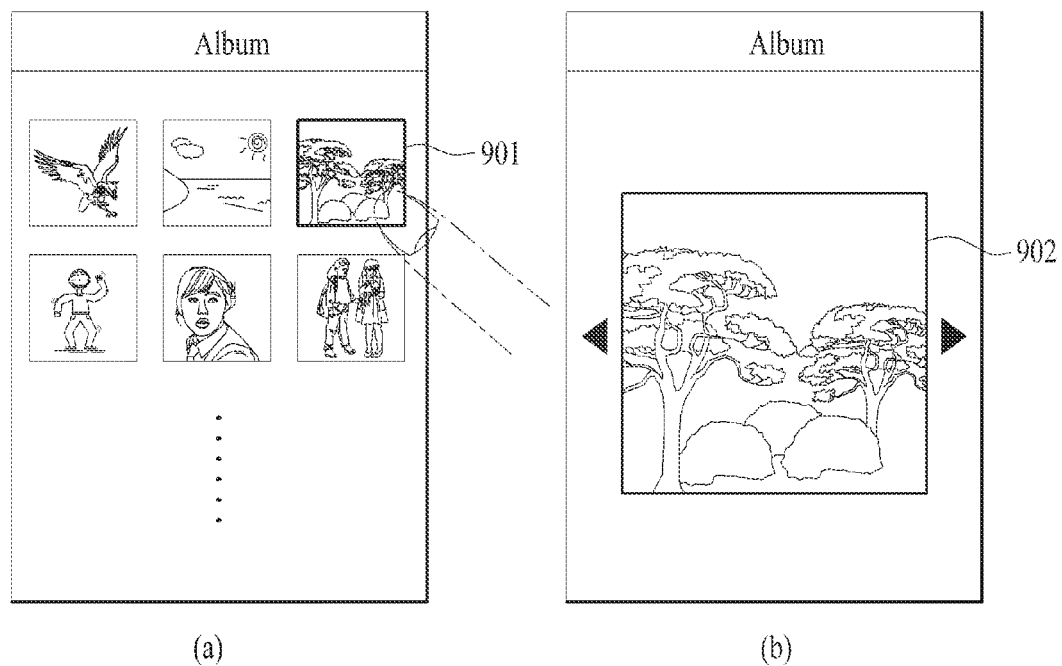

FIGS. 9A to 9C are diagrams of screen configuration for executing $1^{st}$ and $2^{nd}$ functions according to a photo album application.

Referring to FIG. 9A (a) and FIG. 9A (b), the mobile terminal 100 may display an image list containing at least one image. In this case, the image list may be displayed in a thumbnail format and may contain still pictures and videos.

Referring to FIG. 9A (b), in case of receiving an input of a touch with a user finger to a specific image 901 in the image list, the mobile terminal 100 may enlarge and display the specific image 902 on a whole screen [Execution of a view function of a photo album application]. Moreover, in case of receiving an input of a touch with a user finger to a random point in the specific image 902, the mobile terminal 100 may enlarge the specific image 902 centering on the touched random point [Execution of an enlarged view function of a photo album application].

Referring to FIG. 9B (b), in case of receiving an input of a touch with a touch pen to a specific image 901 in the image list, the mobile terminal 100 may display a window for writing a multimedia message having the specific image 901 attached thereto as an attachment file 903 [Execution of a message writing/sending function of a message application]. Moreover, any scheme (e.g., email, etc.) of sending data to a counterpart terminal as well as the multimedia message may be non-limited by its name.

Referring to FIG. 9C, in case of receiving an input of a touch with a touch pen to a specific image 901 in the image list, the mobile terminal 100 may set a memo, which may be inputted using the touch pen via a window 904 for receiving an input of a memo to be set for the specific image 901, for the specific image 901 [Execution of a memo input function of a photo album application] [FIG. 9C (a)] or may enable a drawing 905 to be directly drawn on the specific image 905 in addition [Execution of an image editing function of a photo album application] [FIG. 9C (b)].

FIGS. 10A to 11B are diagrams of screen configuration for executing $1^{st}$ and $2^{nd}$ functions according to a web browsing application.

Figure 10A:
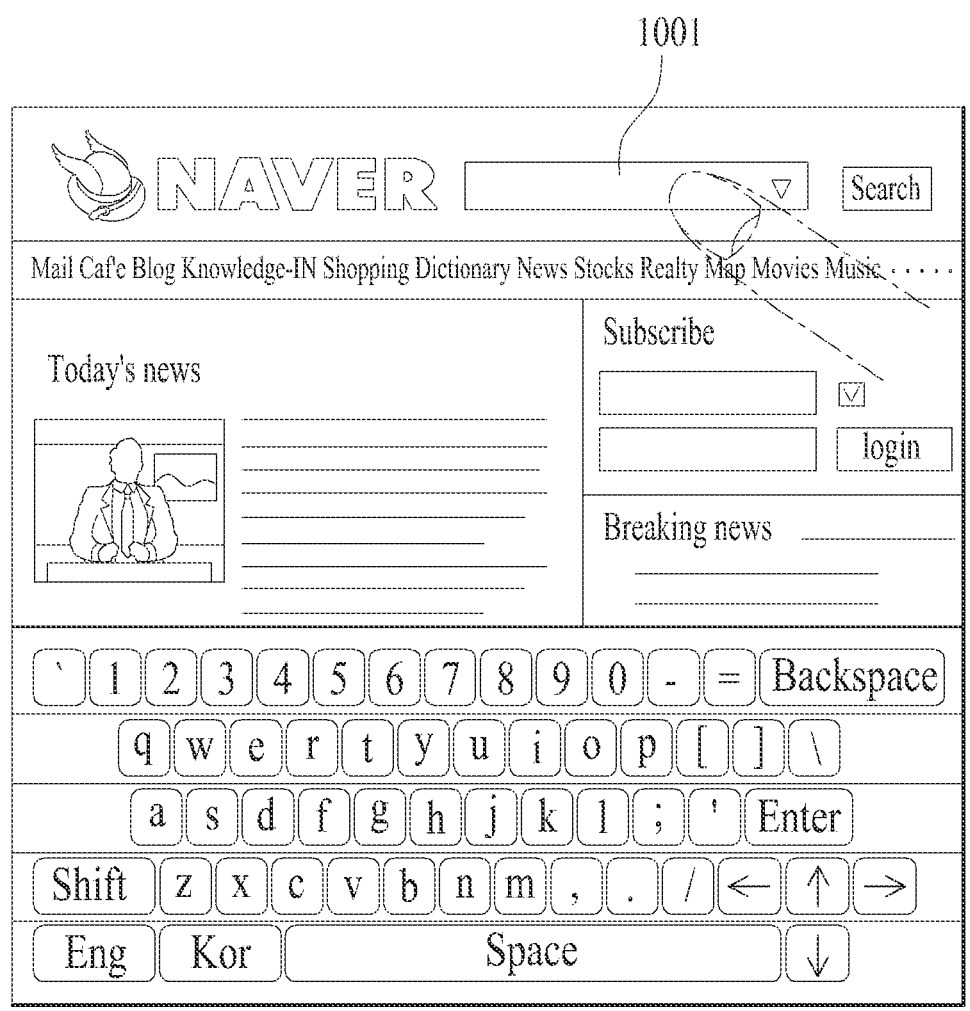
FIGS. 10A to 11B are diagrams of screen configuration for executing $1^{st}$ and $2^{nd}$ functions according to a web browsing application.
Figure 10B:
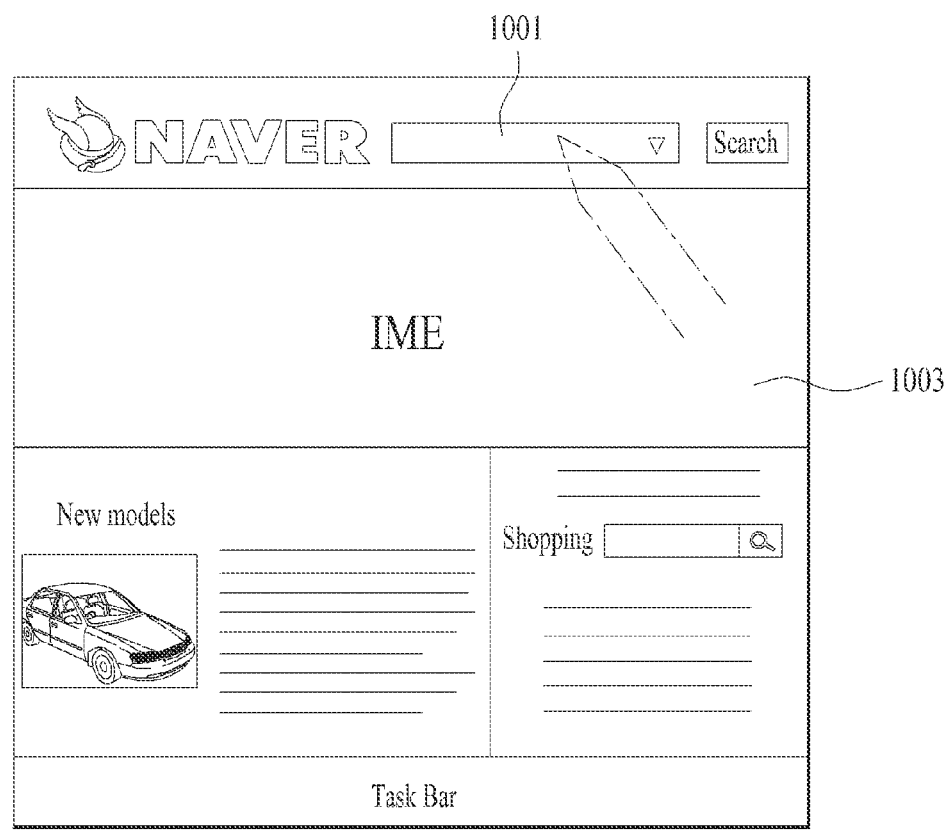

FIG. 10A and FIG. 10B show an embodiment while a webpage provided by a specific website is displayed in accordance with an execution of a web browsing application.

Referring to FIG. 10A, in case of receiving an input of a touch with a user finger to a search work input window 1001 contained in a webpage, the mobile terminal 100 may display a virtual keypad 1002.

Referring to FIG. 10B, in case of receiving an input of a touch with a touch pen to the search word input window 1001 contained in the webpage, the mobile terminal 100 may display a window for receiving a handwriting in direct using the touch pen. For instance, the window 1003 may be displayable right below the input window 1001.

The mobile terminal 100 may recognize a touch with a user finger to the virtual keypad 1002 shown in FIG. 10A only. If a touch with a touch pen is inputted, the mobile terminal 100 may set the state shown in FIG. 10B. Moreover, the mobile terminal 100 may recognize a touch with a touch pen to the window 1003 shown in FIG. 10B only. If a touch with a user finger is inputted, the mobile terminal 100 may set the state shown in FIG. 10A.

Figure 11A:
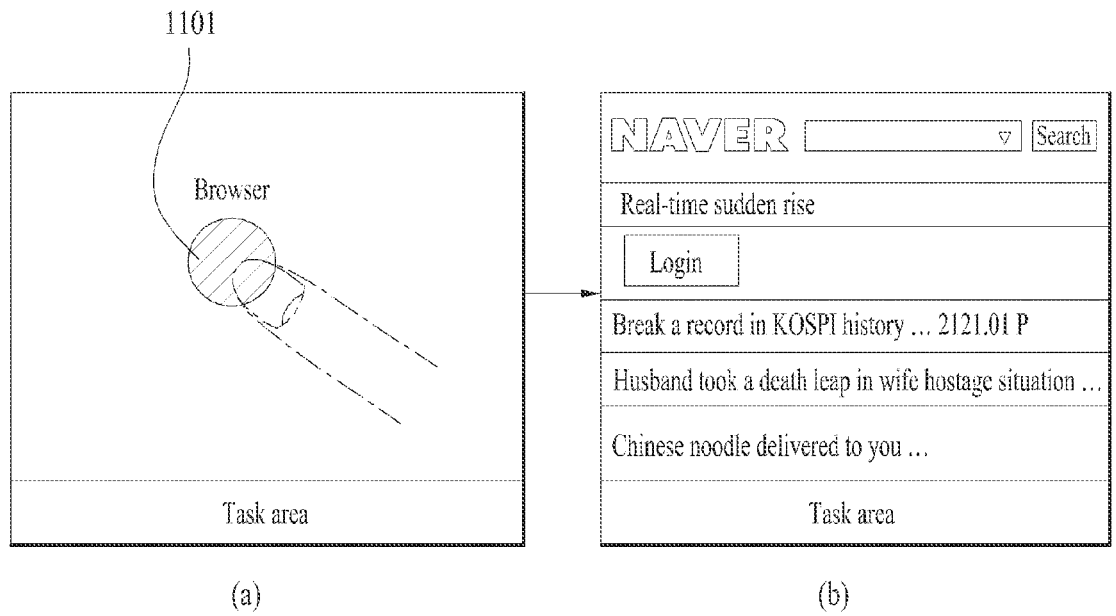
Figure 11B:
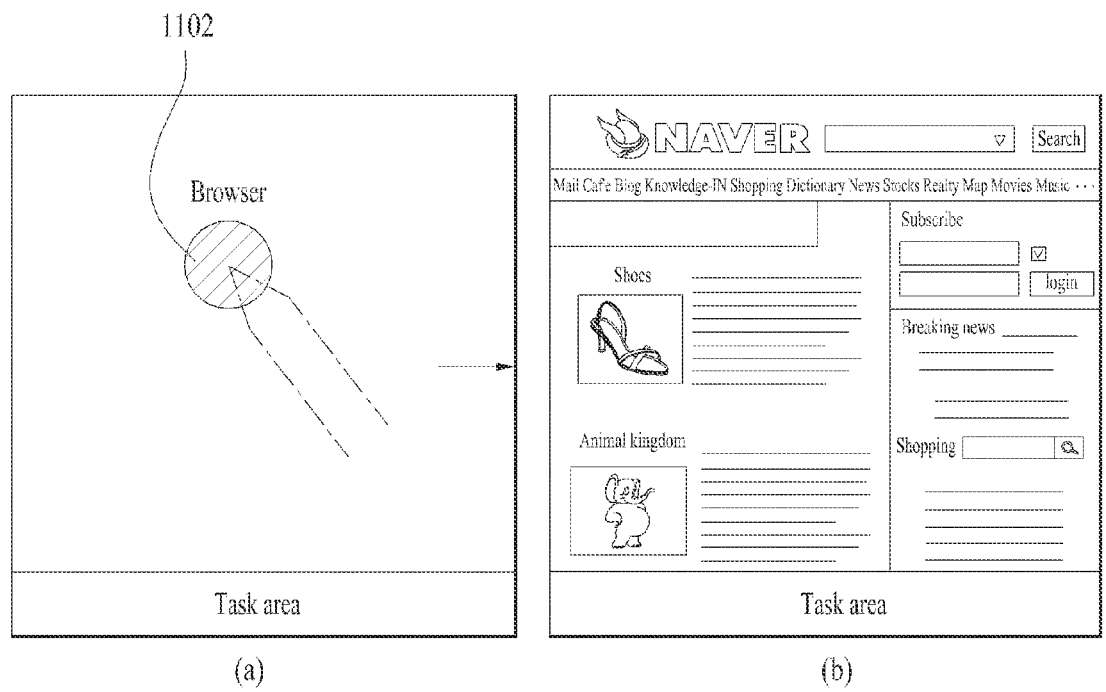

FIG. 11A and FIG. 11B show an embodiment in accordance with whether an indicator (hereinafter named a web browser indicator) indicating a web browsing application is touched with a user finger or a touch pen to an indicator.

Referring to FIG. 11A, in case of receiving an input of a touch with a user finger to a web browser indicator 1101 [FIG. 11A (a)], the mobile terminal 100 may display a mobile version of a webpage despite accessing a website indicated by the web browser indictor 1101 [FIG. 11A (b)]. This is to secure a wider touch region in consideration that a user may touch the touch region using a finger.

Referring to FIG. 11B, in case of receiving an input of a touch with a touch pen to a web browser indicator 1101 [FIG. 11B (a)], the mobile terminal 100 may display a PC version (or a full browsing version) of a webpage by accessing a website indicated by the web browser indictor 1101 [FIG. 11B (b)]. This is because a wider touch region is not necessary in consideration that a user may touch the touch region using a touch pen.

Moreover, in case of receiving an input of a touch with a touch pen in FIG. 11A (b), the mobile terminal 100 may enter the state shown in FIG. 11B (b) [Providing a UI useful for a touch input with a touch pen]. On the contrary, in case of receiving an input of a touch with a user finger in FIG. 11B (b), the mobile terminal 100 may enter the state shown in FIG. 11A (b) [Providing a UI useful for a touch input with a user finger].

FIGS. 12A to 12D are diagrams of screen configuration for executing $1^{st}$ and $2^{nd}$ functions according to an SNS application.

Figure 12A:
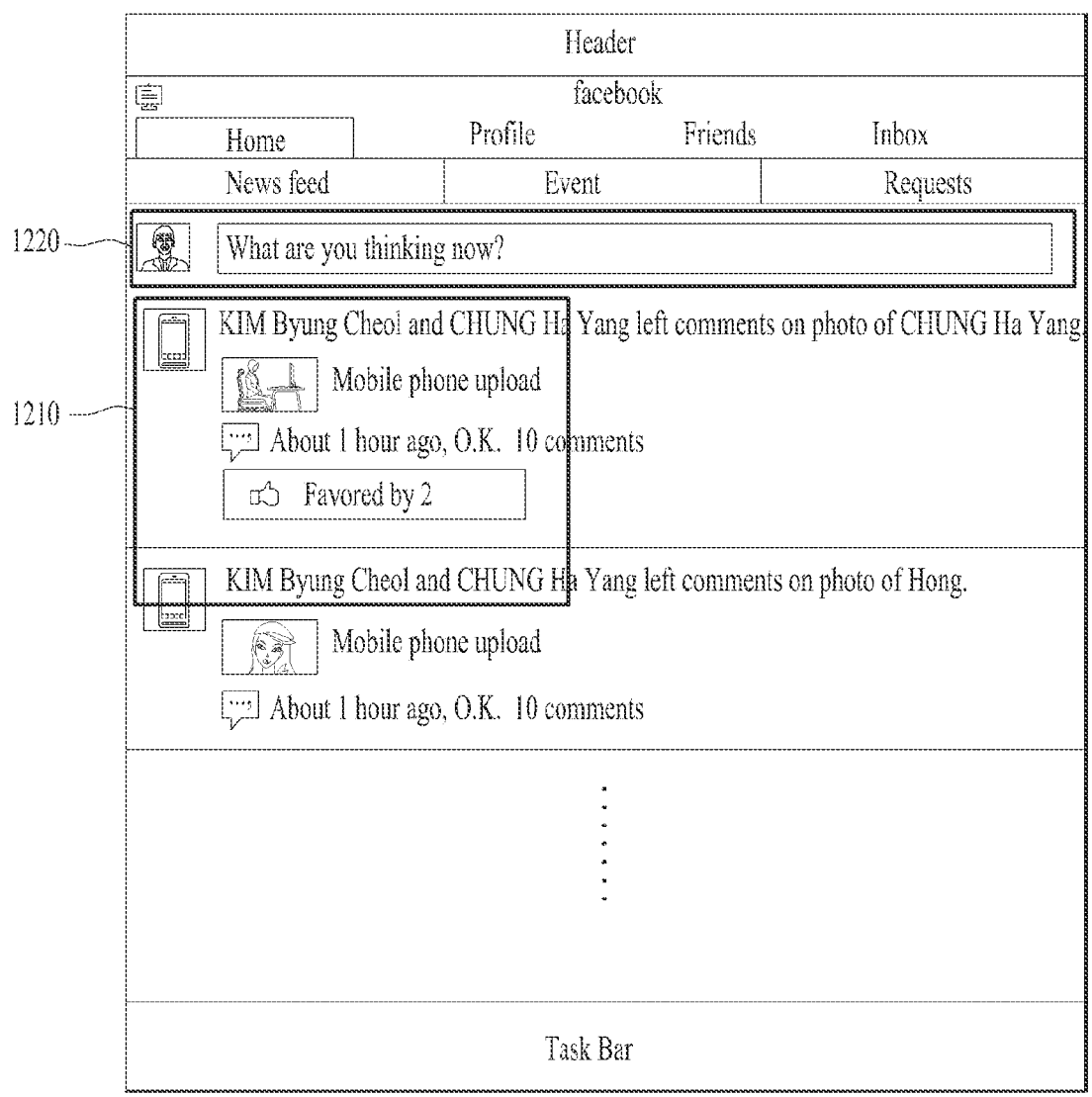
FIGS. 12A to 12E are diagrams of screen configuration for executing $1^{st}$ and $2^{nd}$ functions according to an SNS application.

Referring to FIG. 12A, if an SNS (social networking service) application is executed, the mobile terminal 100 may access a specific SNS site and may be able to display data (text or image) transmitted from a plurality of counterparts. In particular, an ID, name (or nickname) and/or the like of a specific counterpart may be displayed on a $1^{st}$ region 1210, while a chat input window may be displayed on a $2^{nd}$ region 1220.

Figure 12B:
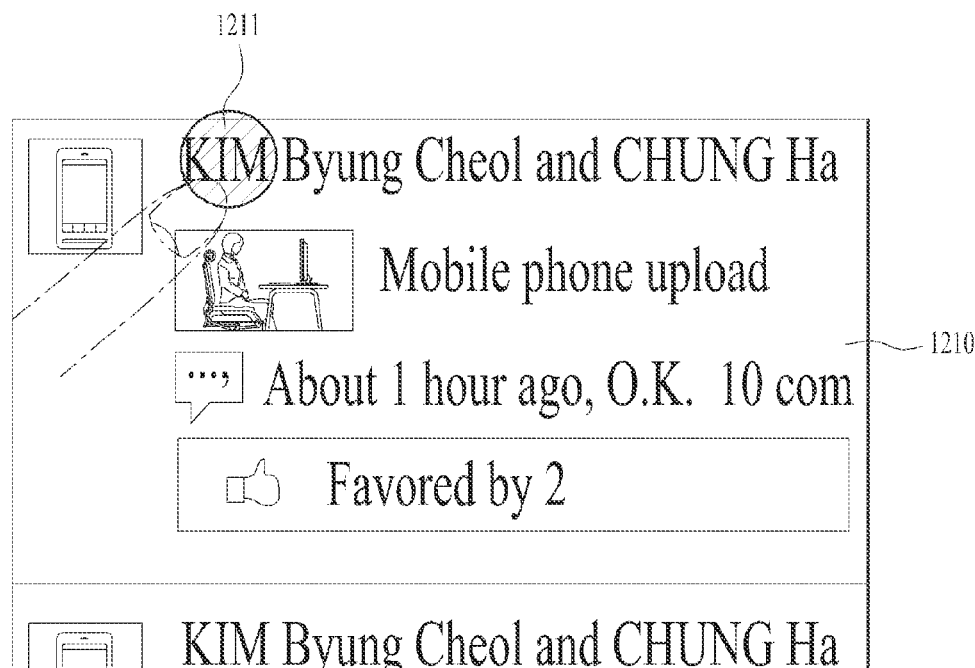
Figure 12B:
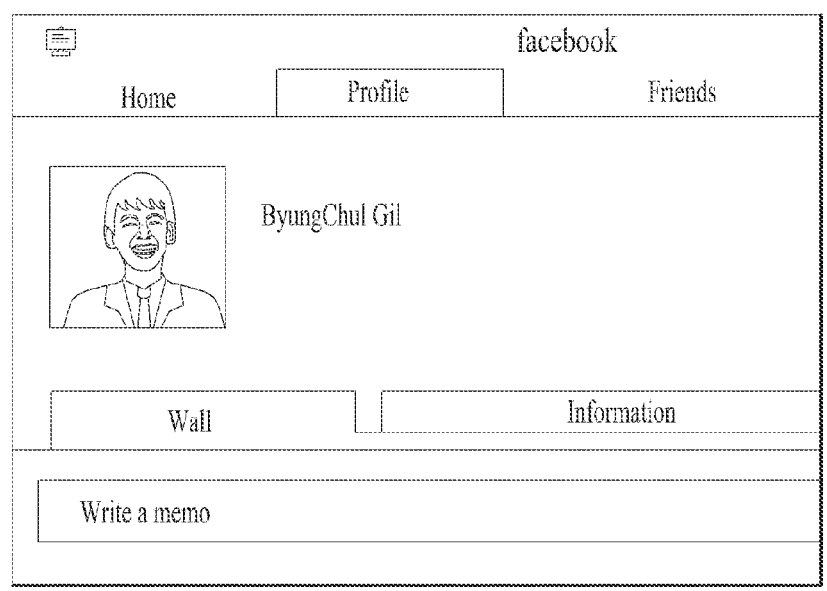
Figure 12C:
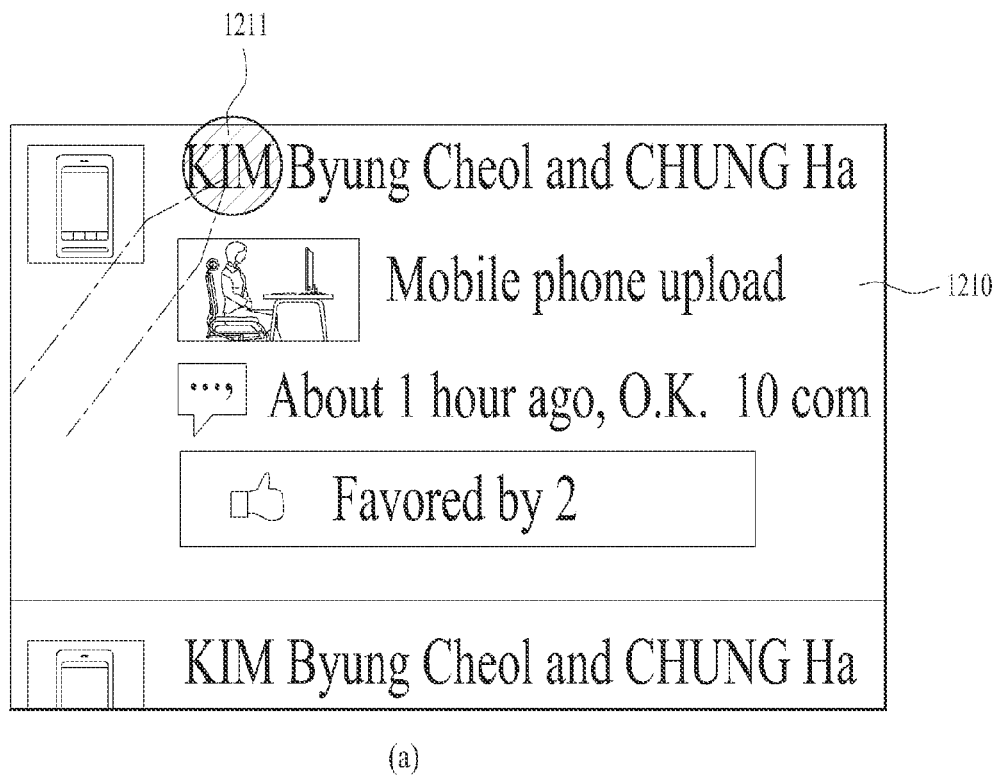
Figure 12C:
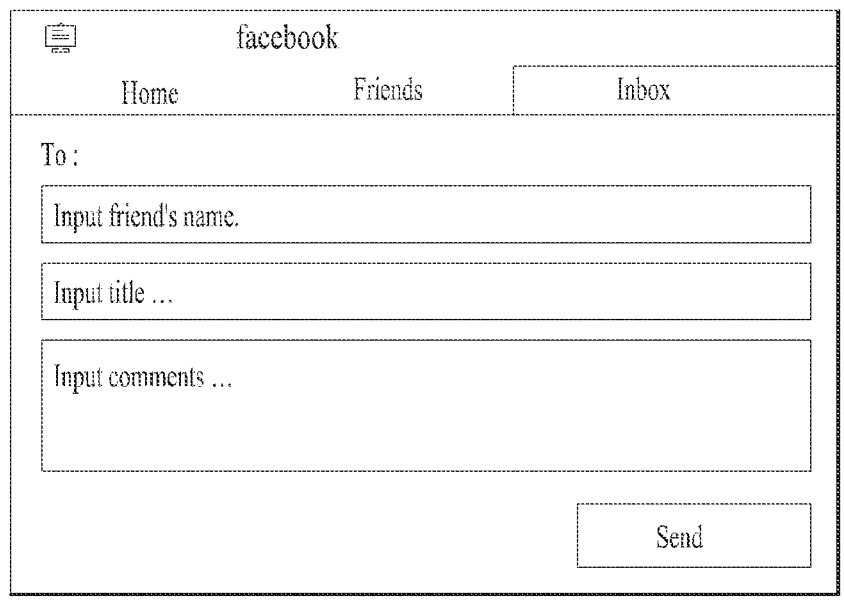

Referring to FIG. 12B, if a touch with a user finger is inputted to a specific ID 1211 displayed on the $1^{st}$ region 1210 shown in FIG. 12A [FIG. 12B (a)], the mobile terminal 100 may display a detailed information (or profile) on a specific counterpart matching the specific ID 1211 [FIG. 12B (b)]. Meanwhile, referring to FIG. 12C, if a touch with a touch pen is inputted to a specific ID 1211 displayed on the $2^{nd}$ region 1220 shown in FIG. 12A [FIG. 12C (a)], the mobile terminal 100 may display an input window for inputting a message (or a text) to be uploaded to the specific ID 1211 [FIG. 12C (b)].

Figure 12D:
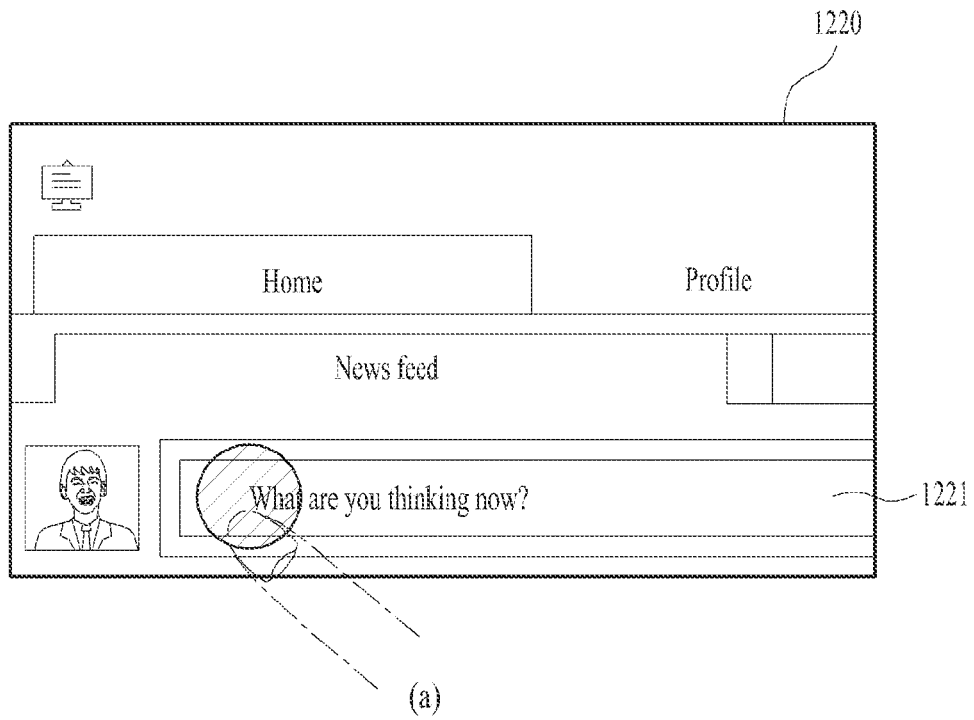
Figure 12D:
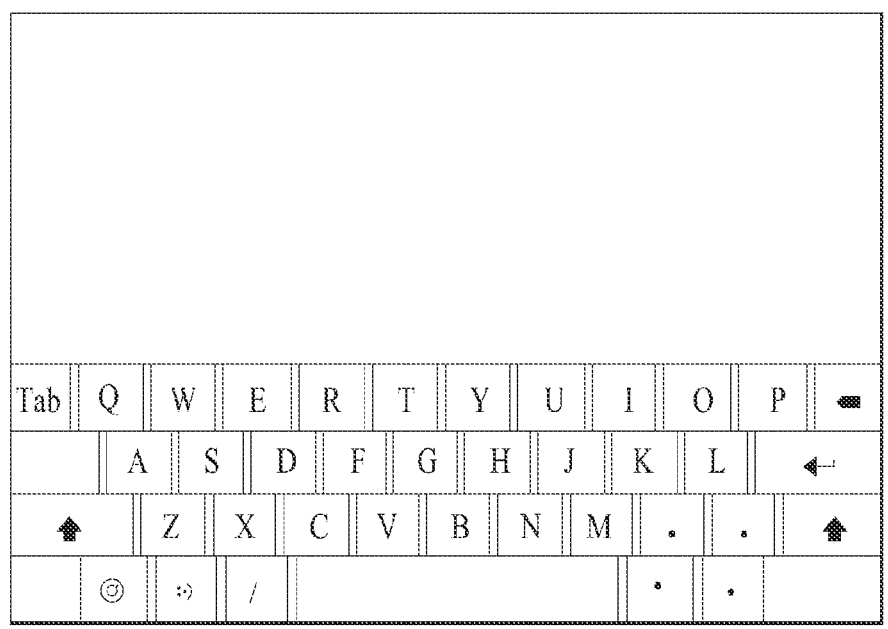
Figure 12E:
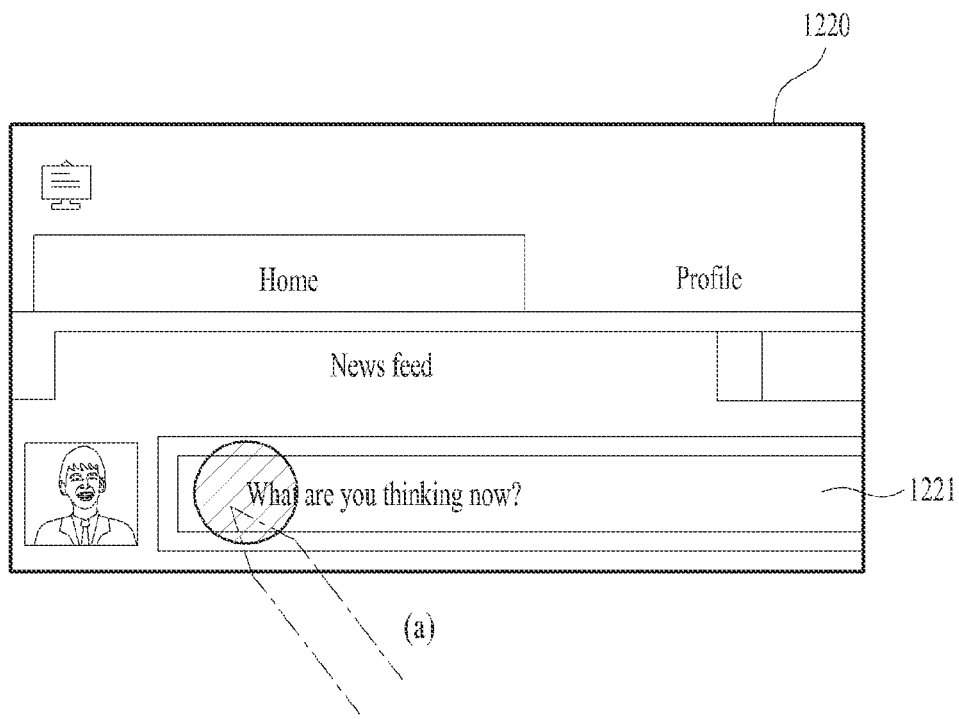
Figure 12E:
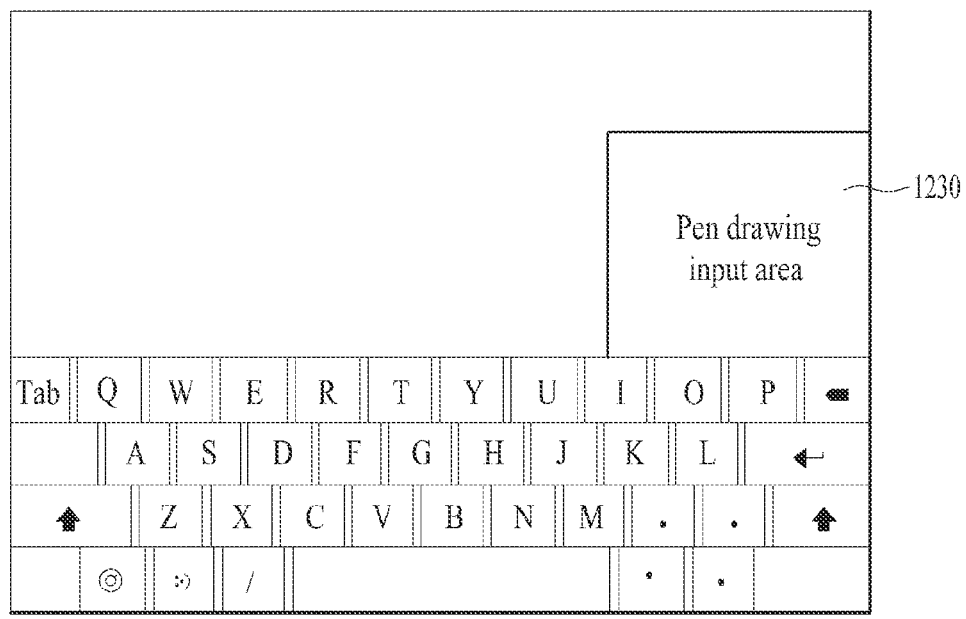

Referring to FIG. 12D, in case of receiving an input of a touch with a user finger to the chat input window 1221 displayed on the $2^{nd}$ region 1210 shown in FIG. 12A [FIG. 12D (a)], the mobile terminal 100 may display a virtual keypad [FIG. 12D (b)]. Meanwhile, in case of receiving an input of a touch with a touch pen to the chat input window 1221 displayed on the $2^{nd}$ region 1210 shown in FIG. 12A [FIG. 12E (a)], the mobile terminal 100 may display pen drawing input window 1230 together with a virtual keypad [FIG. 12E (b)]. Hence, a user may be able to draw a picture on the pen drawing input window 1230 using the touch pen. The drawn picture may be uploaded to the corresponding SNS site.

Figure 13A:
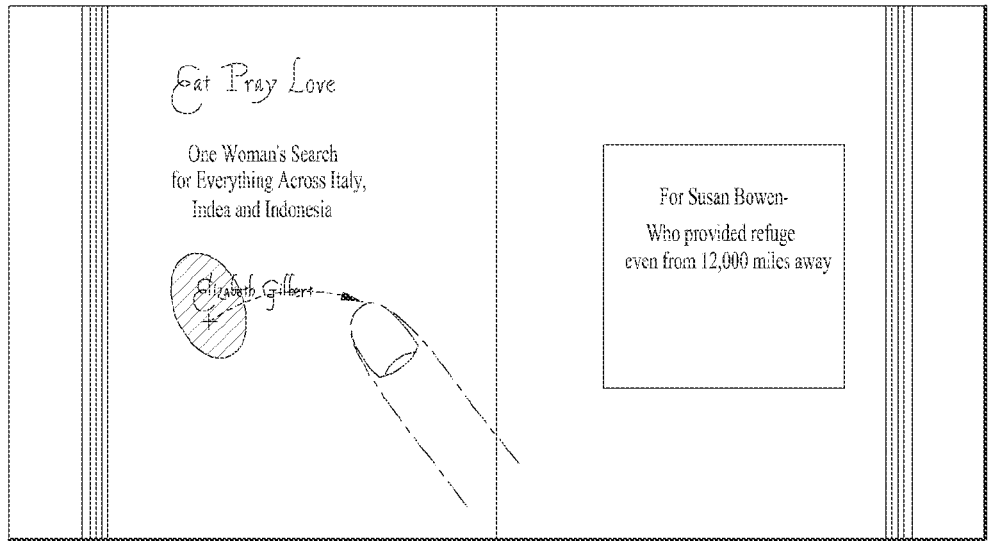
FIG. 13A and FIG. 13B are diagrams of screen configuration for executing $1^{st}$ and $2^{nd}$ functions according to an ebook application.
Figure 13A:
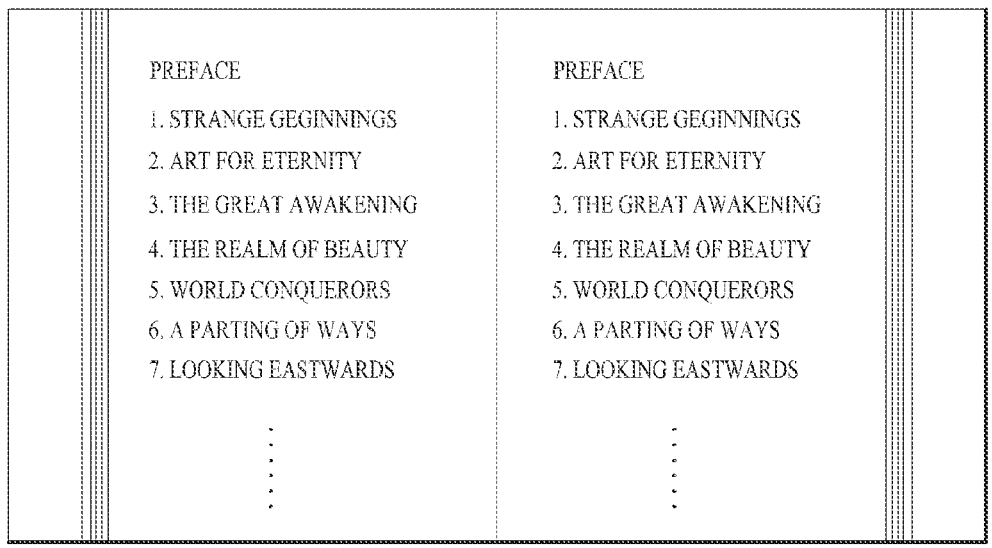
Figure 13B:
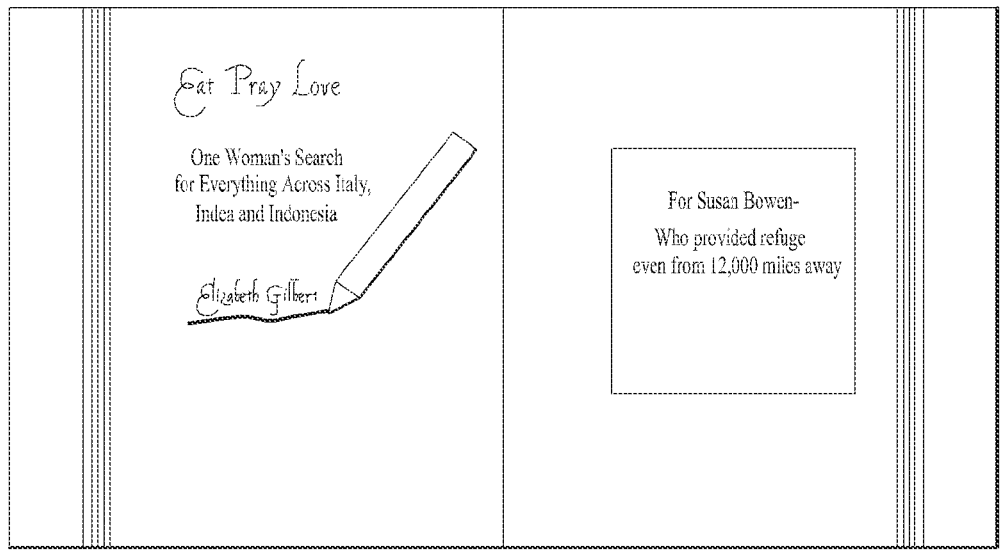

FIG. 13A and FIG. 13B are diagrams of screen configuration for executing $1^{st}$ and $2^{nd}$ functions according to an ebook application. For clarity and convenience of the following description, a $1^{st}$ function may include a page turning function and a $2^{nd}$ function may include a line drawing function.

Referring to FIG. 13A, if an ebook application is executed, the mobile terminal 100 may display a specific page of a specific ebook [FIG. 13A (a)]. In case of receiving an input of a touch & drag action with a user finger to the specific page, the mobile terminal 100 may perform a page turning operation [FIG. 13A (b)]. In doing so, the number of the turned pages may vary in accordance with at least one of a drag distance, a drag speed, a drag direction, a drag count and the like.

Referring to FIG. 13B, in case of receiving an input of a touch & drag action with a touch pen to a specific page, the mobile terminal 100 may perform a line drawing operation in accordance with a touch pen motion.

Figure 14A:
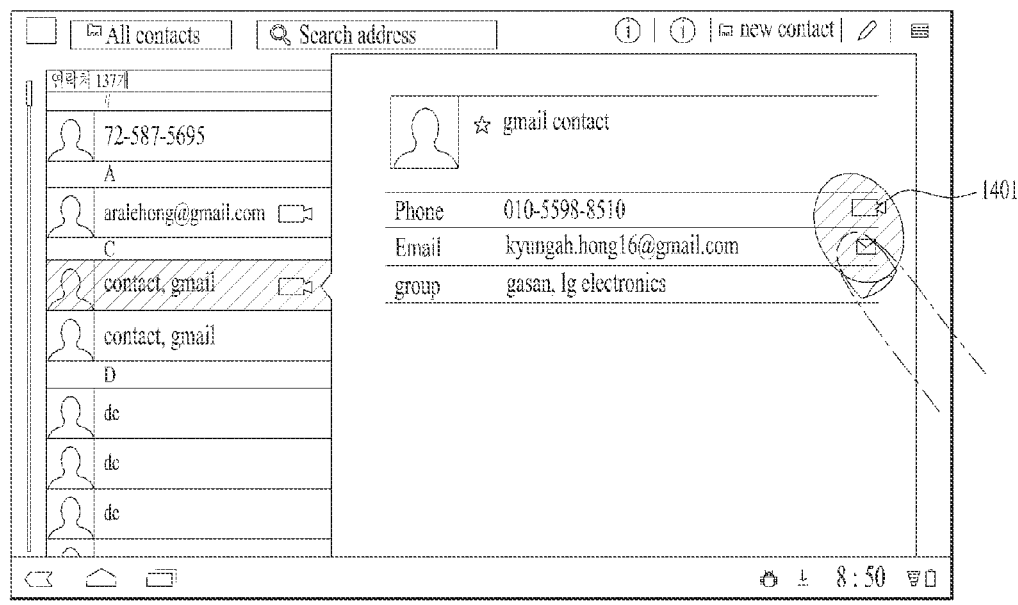
FIG. 14A and FIG. 14B are diagrams of screen configuration for executing $1^{st}$ and $2^{nd}$ functions according to a video call application.
Figure 14A:
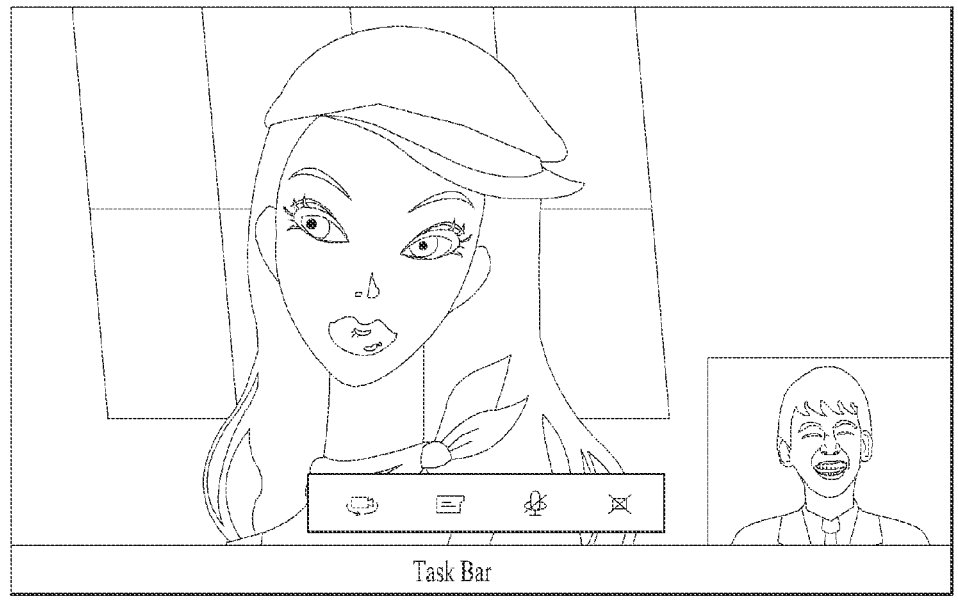
Figure 14B:
Figure 14B:
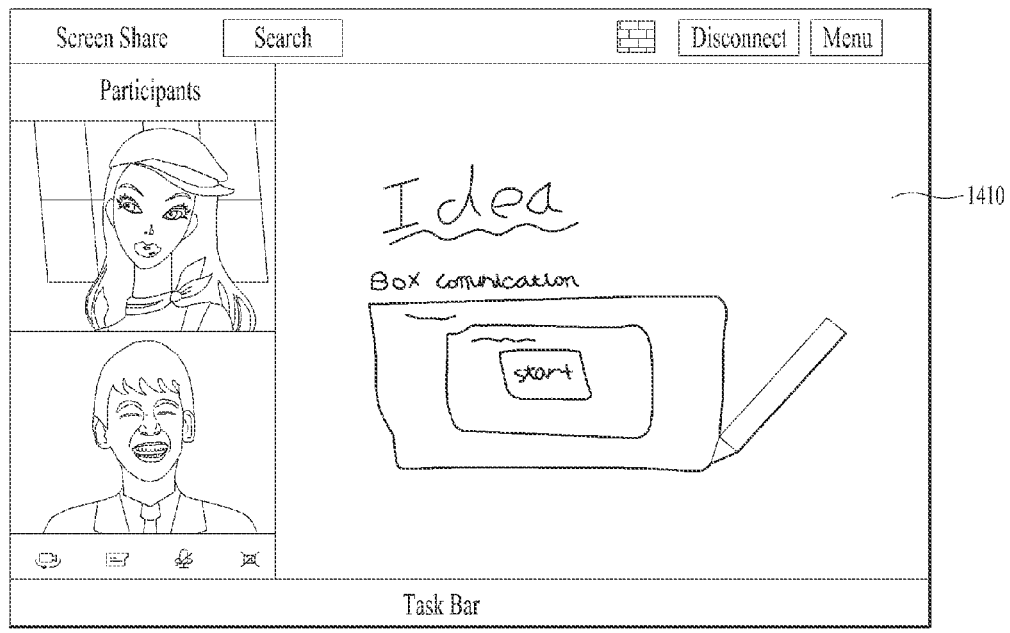

FIG. 14A and FIG. 14B are diagrams of screen configuration for executing $1^{st}$ and $2^{nd}$ functions according to a video call application. For clarity and convenience of the following description, a $1^{st}$ function may include a general video call function (i.e., example of a basic function) and a $2^{nd}$ function may include a memo sharing function in addition to the video cal function.

Referring to FIG. 14A, if an information display region of a specific counterpart is touched with a user finger for a video cal with the specific counterpart or a video call key zone 1402 is touched with a user finger after completion of finding a specific counterpart information [FIG. 14A (a)], the mobile terminal 100 may perform the video call with the specific counterpart and may display a user screen (i.e., my screen) and a counterpart screen on a $1^{st}$ region and a $2^{nd}$ region of the screen, respectively [FIG. 14A (b)].

Referring to FIG. 14B, in case of receiving an input of a touch with a touch pen to a random point of the screen in the state shown in FIG. 14A (b), the state shown in FIG. 14B (b) may be configured. Moreover, in case of receiving an input of a touch with a user finger to a random point of the screen in the state shown in FIG. 14B (b), the state shown in FIG. 14A (b) may be configured.

Meanwhile, positions and sizes of $1^{st}$ to $3^{rd}$ regions may be adjustable in accordance with a user selection or may be designated as default [not shown in the drawings].

Figure 15A:
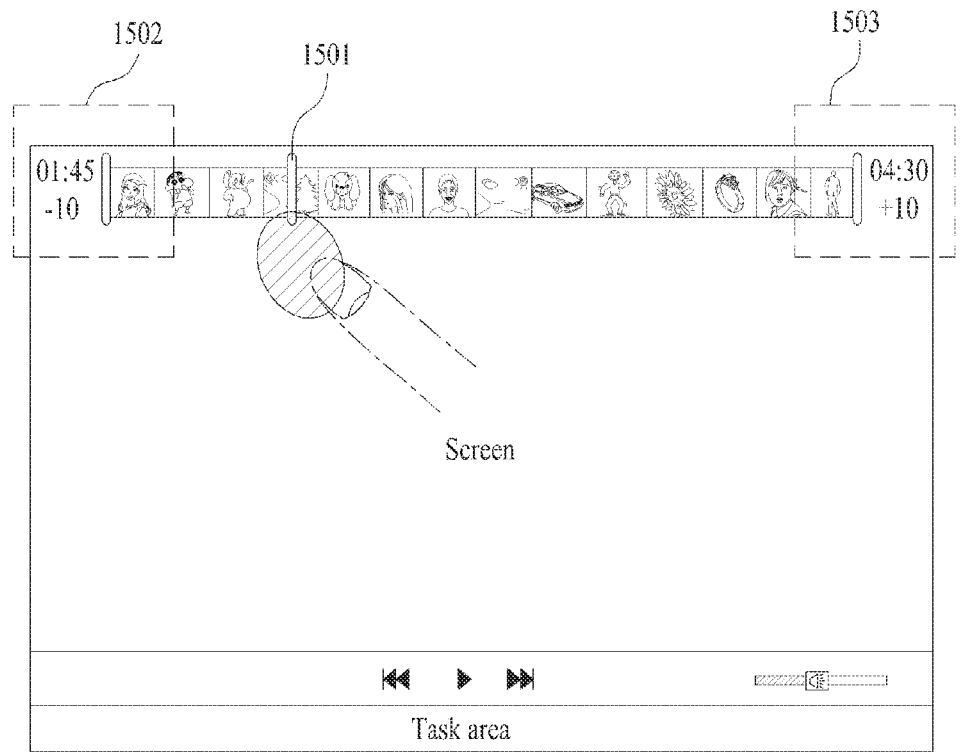
FIG. 15A and FIG. 15B are diagrams of screen configuration for executing $1^{st}$ and $2^{nd}$ functions according to a video play application.
Figure 15B:
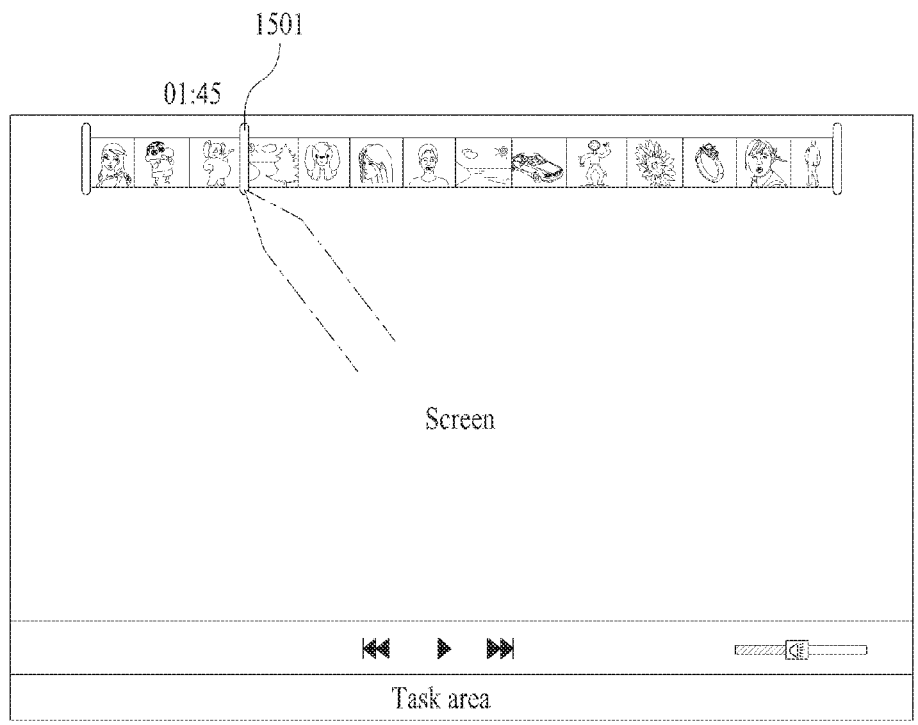

FIG. 15A and FIG. 15B are diagrams of screen configuration for executing $1^{st}$ and $2^{nd}$ functions according to a video play application. For clarity and convenience of the following description, a $1^{st}$ function may include a fine play point adjusting function and a $2^{nd}$ function may include a play point selecting function.

Referring to FIG. 15A, while a specific video is being played in accordance with an execution of a video play application, if a touch with a user finger is inputted to a specific point 1501 in a play status indication bar, the mobile terminal 100 may display a first region 1502 and a $2^{nd}$ region 1503 for shifting a play point back and forth by a predetermined time (e.g., 10 seconds) with reference to a specific play point corresponding to the specific point 1502. In this case, the predetermined time may be set as a default or may be set by a user.

Hence, if the $1^{st}$ region 1502 is touched with a user finger, the mobile terminal 100 may play the specific video from a play point behind the specific play point by the predetermined time. Moreover, if the $2^{nd}$ region 1503 is touched with a user finger, the mobile terminal 100 may play the specific video from a play point after the specific play point by the predetermined time. Of course, if the specific point 1501 is touched again with a user finger, the mobile terminal 100 may play the specific video from the specific play point.

Referring to FIG. 15B, while a specific video is being played in accordance with an execution of a video play application, if a touch with a touch pen is inputted to a specific point 1501 in a play status indication bar, the mobile terminal 100 may play the specific video from a specific play point. In this case, the play status indication bar may indicate an extent of a currently played part in the whole specific video. For instance, a total length of the play status indication bar may indicate a total play time of the specific video and a currently played point in the play status indication bar may be identifiably displayed. Moreover, on the play status indication bar, images respectively corresponding to a plurality of play points in the total play time of the specific video may be displayed. Hence, the specific point 1501 may be included in a specific one of a plurality of the images displayed on the play status indication bar. And, the specific play point may include a play point corresponding to the specific image.

Figure 16A:
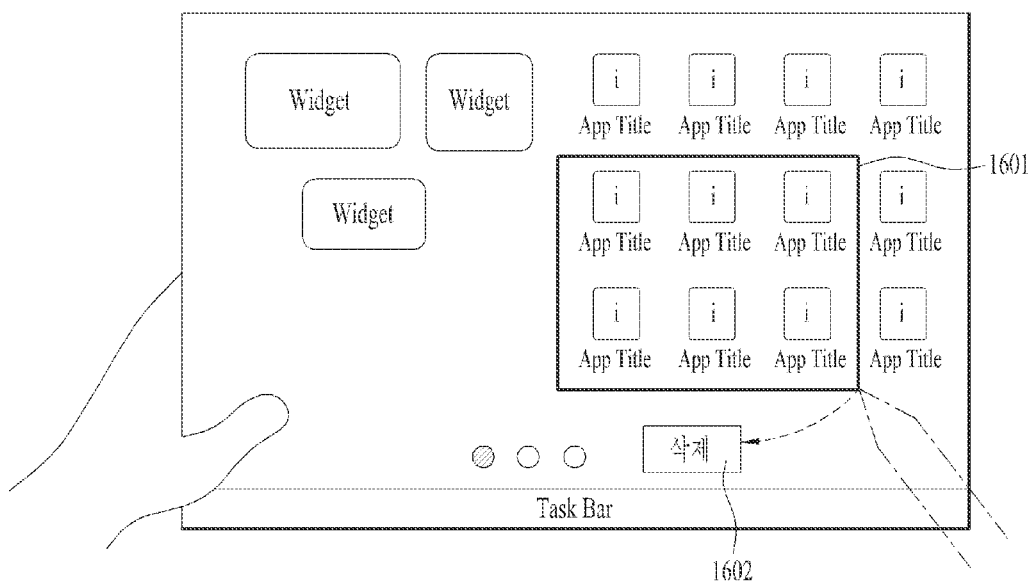
FIG. 16A and FIG. 16B are diagrams of screen configuration for executing $1^{st}$ and $2^{nd}$ functions according to an application indicator editing.
Figure 16B:
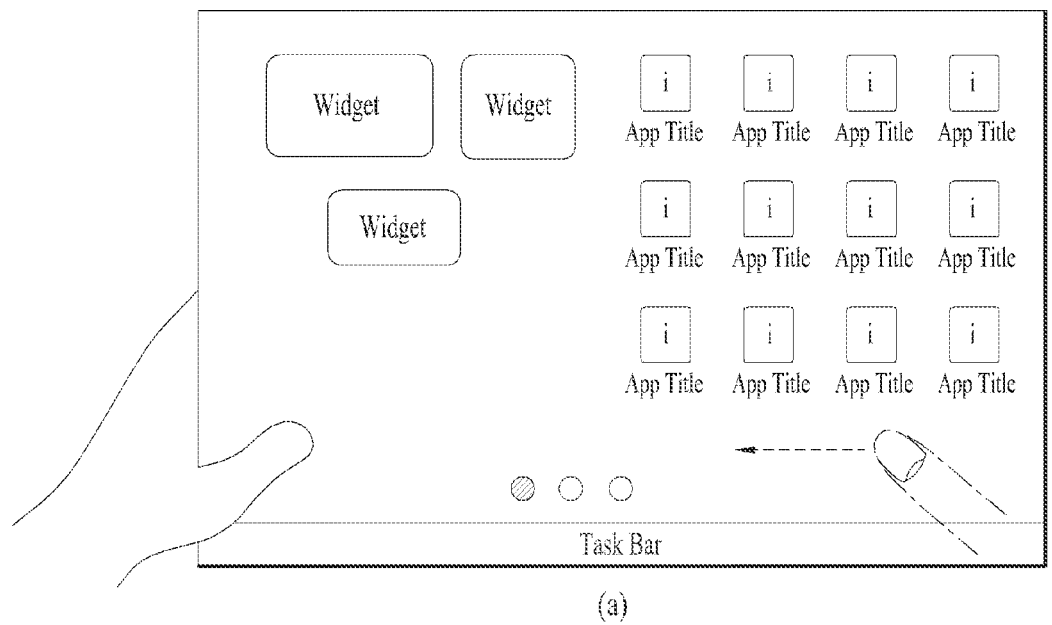
Figure 16B:
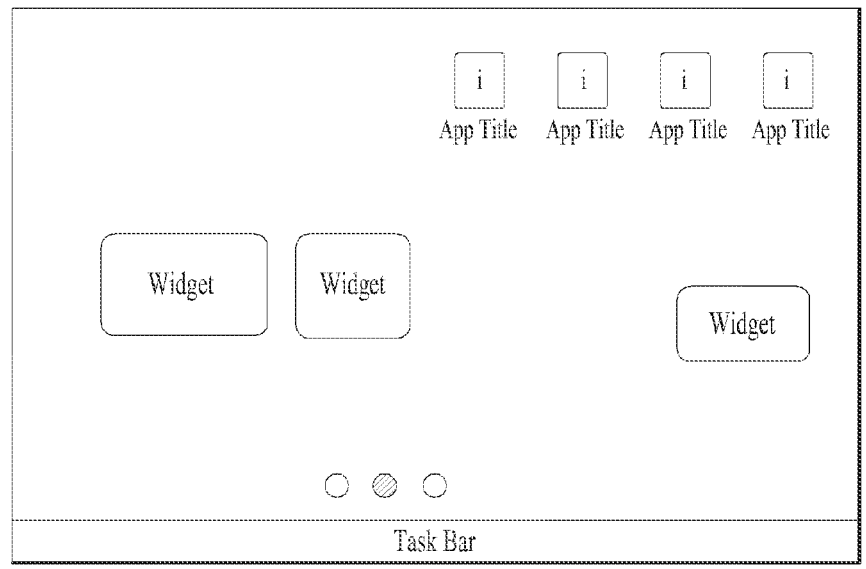

FIG. 16A and FIG. 16B are diagrams of screen configuration for executing $1^{st}$ and $2^{nd}$ functions according to an application indicator editing. For clarity and convenience of the following description, a $1^{st}$ function may include a page turning function and a $2^{nd}$ function may include a screen editing function. Moreover, a widget indicator may be included in an application indicator.

Referring to FIG. 16A, after an application indicator editing mode has been entered, in case of receiving an input of a touch & drag action with a touch pen, the mobile terminal 100 may group a plurality of application indicators to correspond to the touch & drag action and may be able to perform deletion, shift, copy or the like on a plurality of the grouped application indicators. In this case, the grouping by the touch & drag action may include a grouping of a plurality of application indicators contained in a looped plane generated by a touch & drag action or a grouping of a plurality of applications touched by a touch & drag action.

For instance, in case of receiving an input of a touch & drag action to a zone 'delete' 1602 or a touch action on the zone 'delete' 1602 after completion of the grouping, the mobile terminal 100 may be able to delete a plurality of the grouped application indicators.

Referring to FIG. 16B, after an application indicator editing mode has been entered, in case of receiving an input of a touch & drag action with a user finger [FIG. 16B (a)], the mobile terminal 100 may perform a page turning operation to correspond to the touch & drag action [FIG. 16B (b)]. In doing so, the number of the turned pages may vary in accordance with at least one of a drag distance, a drag speed, a drag count and the like.

Of course, in case of receiving an input of a touch & drag action with a touch pen in FIG. 16B, the mobile terminal 100 may enter the state shown in FIG. 16A. On the contrary, in case of receiving an input of a touch & drag action with a user finger in FIG. 16A, the mobile terminal 100 may enter the state shown in FIG. 16B.

Figure 17A:
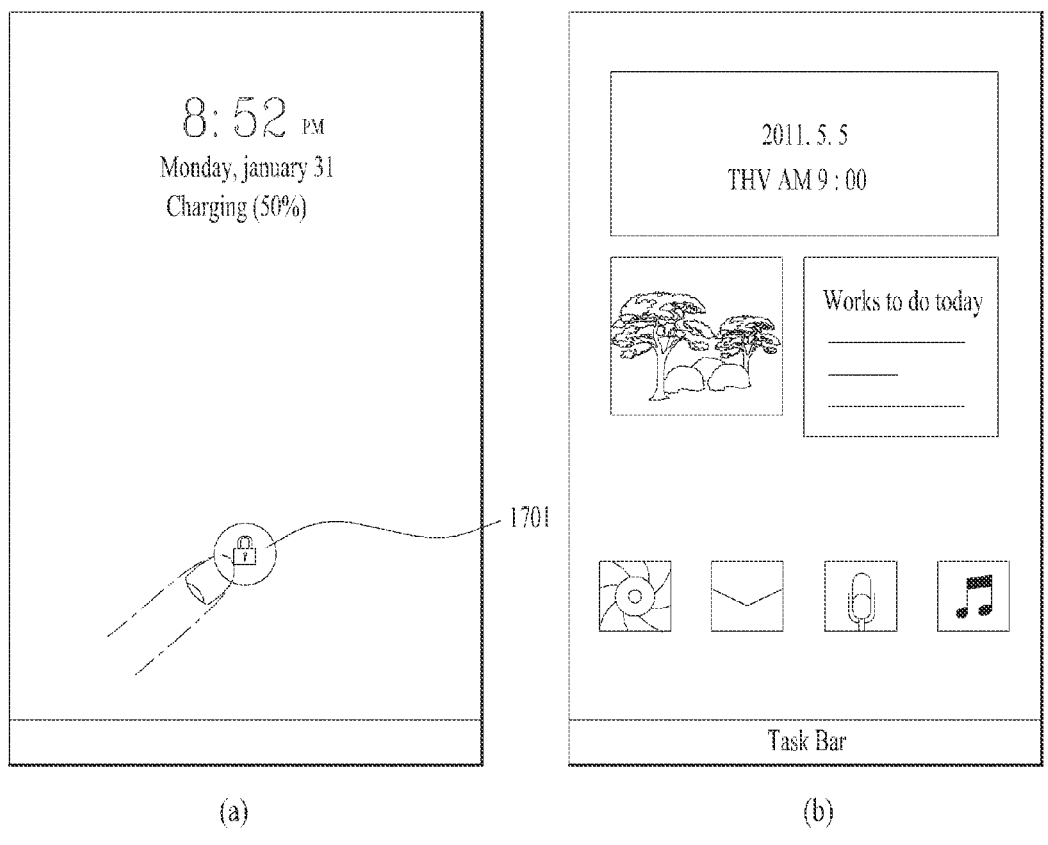
FIGS. 17A to 17C are diagrams of screen configuration for executing $1^{st}$ and $2^{nd}$ functions according to a home screen display.
Figure 17B:
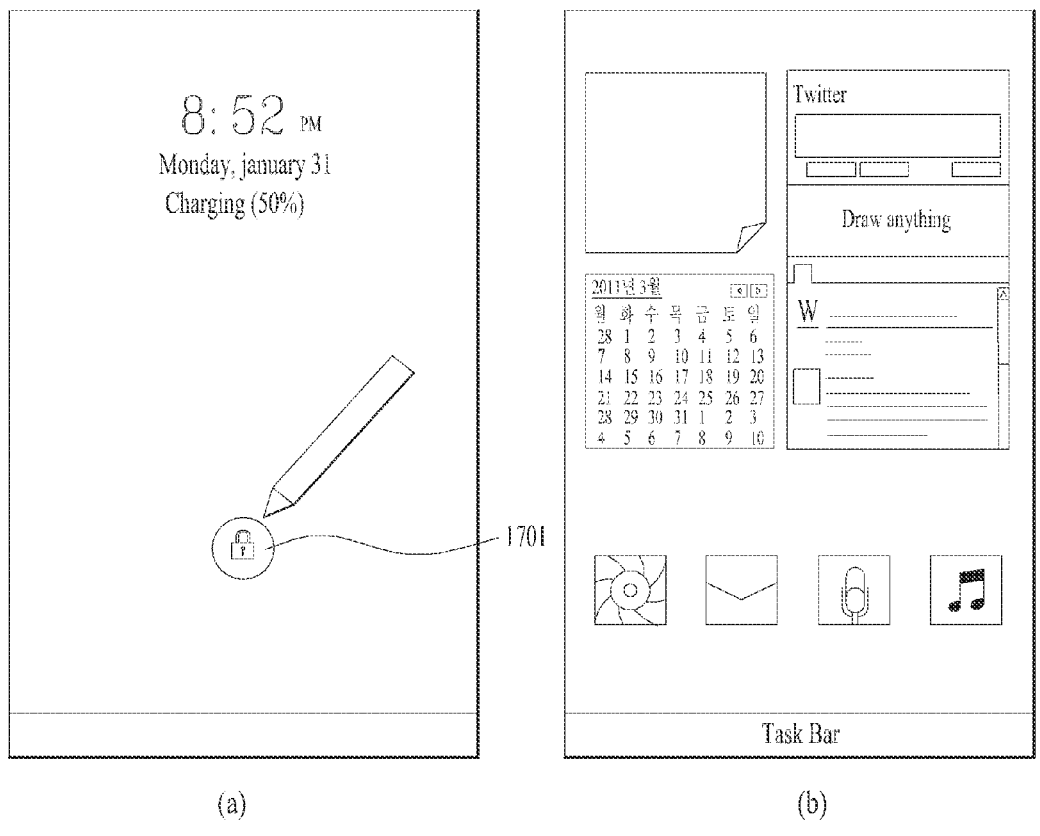
Figure 17C:
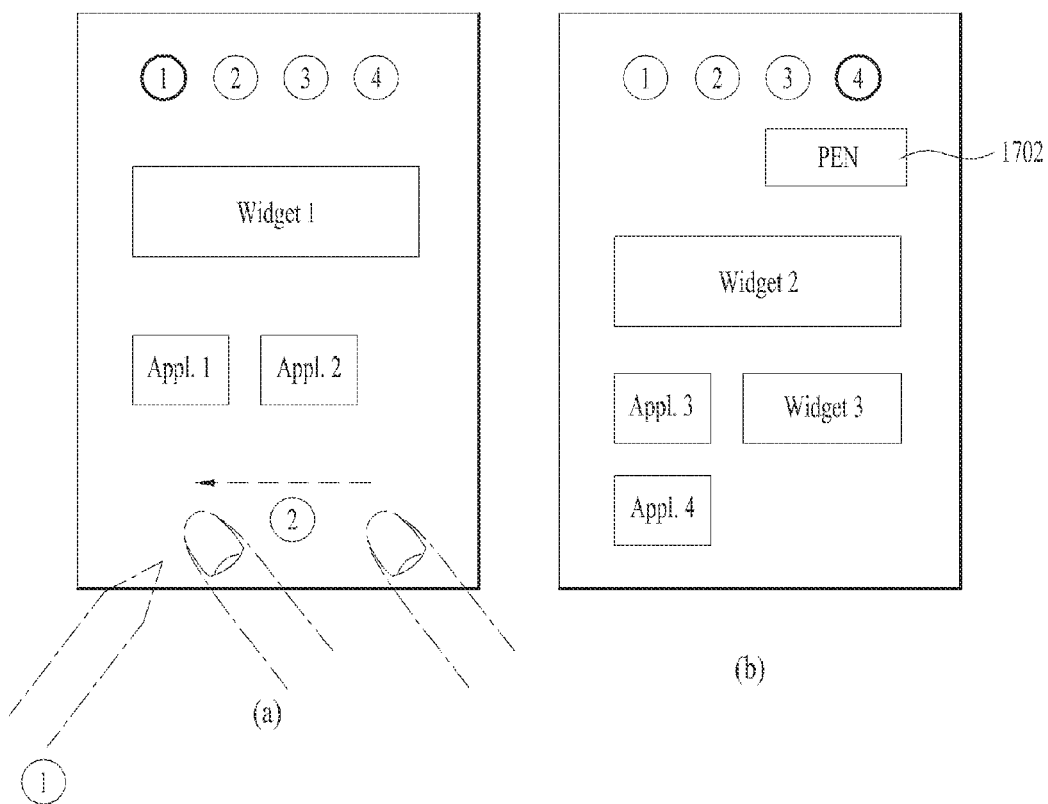

FIGS. 17A to 17C are diagrams of screen configuration for executing $1^{st}$ and $2^{nd}$ functions according to a home screen display. For clarity and convenience of the following description, a $1^{st}$ function may include a general home screen display and a $2^{nd}$ function may include a touch pen dedicated home screen.

Referring to FIG. 17A, if a touch action corresponding to an unlock command is inputted using a user finger in a screen locked state [FIG. 17A (a)], the mobile terminal 100 may be able to display a general home screen [FIG. 17A (b)]. Alternatively, the mobile terminal 100 may display a screen displayed last before the screen lock.

Referring to FIG. 17B, if a touch action corresponding to an unlock command is inputted in a screen locked state using a touch pen [FIG. 17B (a)], the mobile terminal 100 may be able to display a touch pen dedicated home screen [FIG. 17B (b)]. For instance, the touch pen dedicated home screen may include an indicator of an application or widget (hereinafter named a touch pen dedicated application or a touch pen dedicated widget), of which operation is designated to be controlled by a touch action with a touch pen, and may contain data (e.g., specific image, specific memo, specific schedule, specific web screen, etc.) of the touch pen dedicated application or the touch pen dedicated widget.

The touch pen dedicated application or the touch pen dedicated widget may be designated by a user or may be automatically designated in consideration of application property. Occasionally, the operation of the touch pen dedicated application or widget may be controllable by a user finger.

In this case, the touch action corresponding to the unlock command may include a touch to a key zone 1701 for receiving an input of the unlock command or a touch having a touch pattern corresponding to an unlocking.

If a touch with a touch pen is inputted to a random point on the screen in the state shown in FIG. 17A (b), the mobile terminal 100 may enter the state shown in FIG. 17B (b). On the other hand, if a touch with a user finger is inputted to a random point on the screen in the state shown in FIG. 17B (b), the mobile terminal 100 may enter the state shown in FIG. 17A (b).

Referring to FIG. 17C, the mobile terminal 100 may include a touch pen dedicated screen (cf. the aforesaid touch pen dedicated home screen) among a plurality of screens. If a touch with a touch pen is inputted to a random point of the screen [ ① ] or a touch & drag action (by a user finger or a touch pen) for turning a page to the touch pen dedicated screen [ ② ] [FIG. 17C (a)], the mobile terminal 100 may be able to display the touch pen dedicated screen [FIG. 17C (b)]. In doing so, an indicator 1702 indicating a presence of the touch pen dedicated screen may be displayed on a prescribed region of the screen.

The mobile terminal 100 may be able to display a touch pen dedicated screen only if a touch & drag action for a page turning is inputted by a touch pen. If a touch & drag action for a page turning is inputted by a user finger, the mobile terminal 100 may be able to perform a paging turning operation among the rest of the screens except the touch pen dedicated screen.

According to the present invention, in case of receiving an input of a touch with a touch pen to a random point on a screen in a screen locked state or an input of a signal for requesting a temporary unlocking from a touch pen, the mobile terminal 100 may limitedly activate the touchscreen 151 to receive an input of a touch with the touch pen only under the control of the controller 180. This may be possible because a touch with a user finger and a touch with a touch pen may be identifiable from each other [cf. the former description of the step S320]. In this case, the touch pen may include a dedicated touch pen set to be dedicated to the mobile terminal 100. Hence, in case of receiving a touch with a different touch pen except the dedicated touch pen or a temporary unlock signal from the different touch pen, the mobile terminal 100 may not be able to limitedly activate the touchscreen 151.

Therefore, the mobile terminal 100 may display an indicator of at least one application or at least one widget, which is set to be controllable by a touch pen input only, and may be then able to receive an input of a touch to the displayed at least one application indicator or the displayed at least one widget, using the touchscreen 151.

So to speak, the touchscreen 151 may be able to receive an input of a touch with a touch pen only and may be able to display an indicator of an application or a widget, which is specialized for or dedicated to the touch pen only. Hence, in order to normally cancel the screen locked state, a screen unlock command should be separately inputted.

Moreover, in case of receiving an input of a touch with a touch pen to a prescribed indicator or widget displayed in a temporary screen unlocked state, the mobile terminal 100 may execute the corresponding application or widget.

This may be described with reference to the accompanying drawings as follows.

Figure 18A:
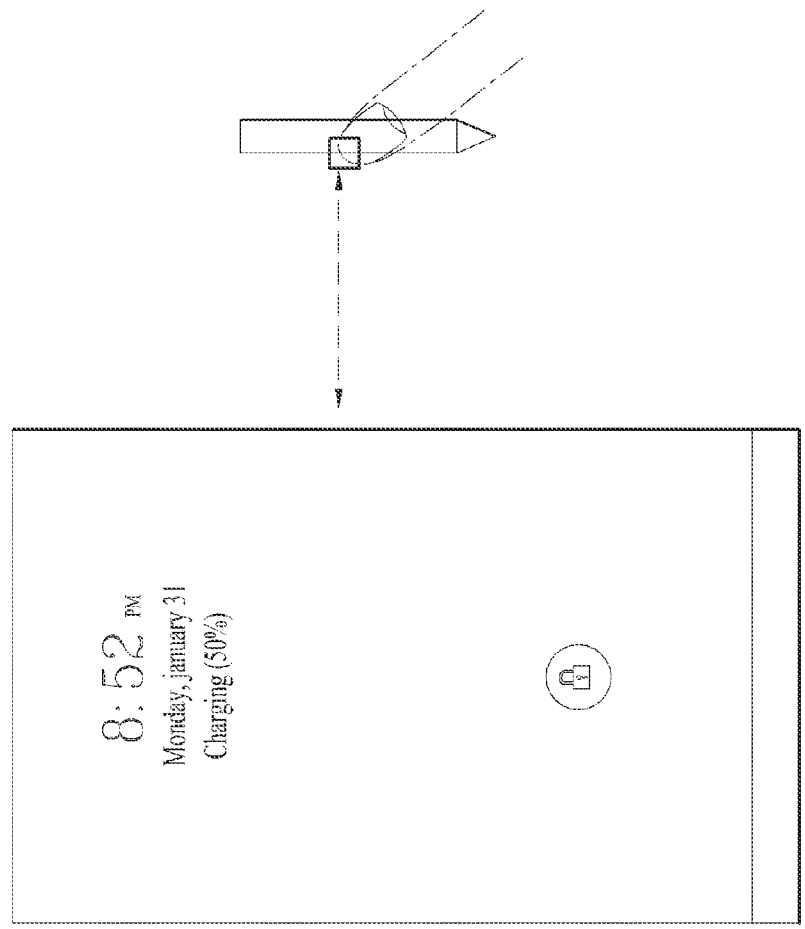
FIGS. 18A to 18C are diagrams for displaying a touch pen dedicated home screen in a screen locked state.
Figure 18A:
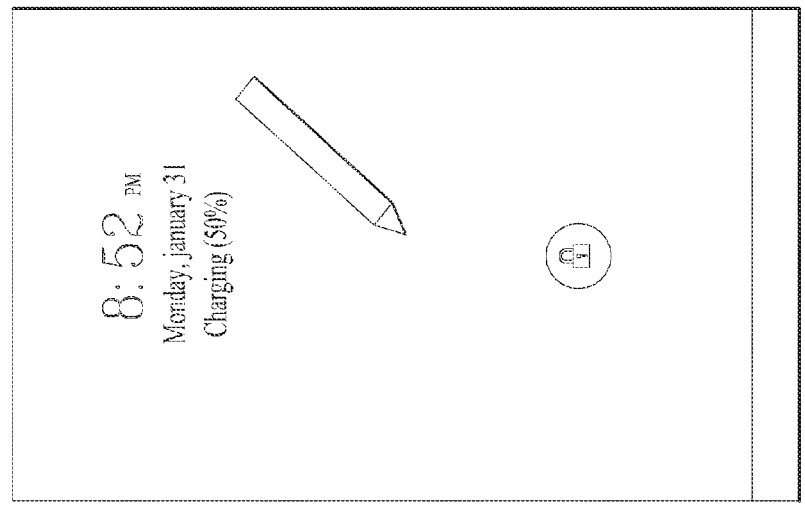
Figure 18B:
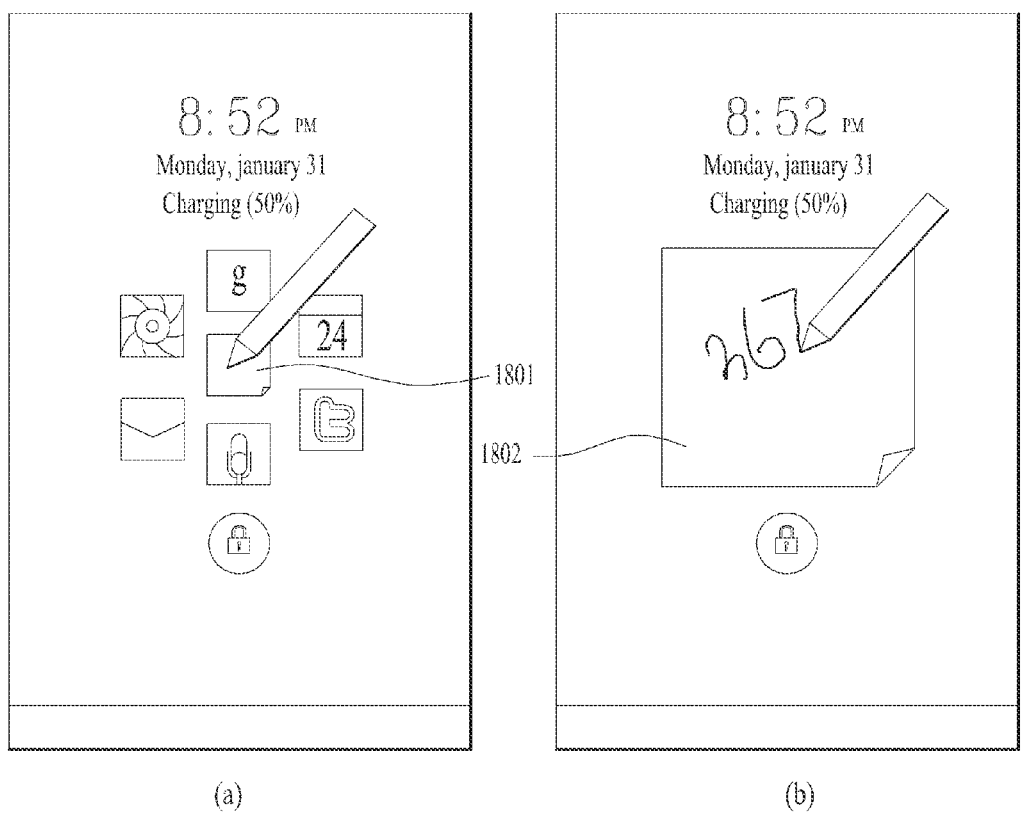
Figure 18C:
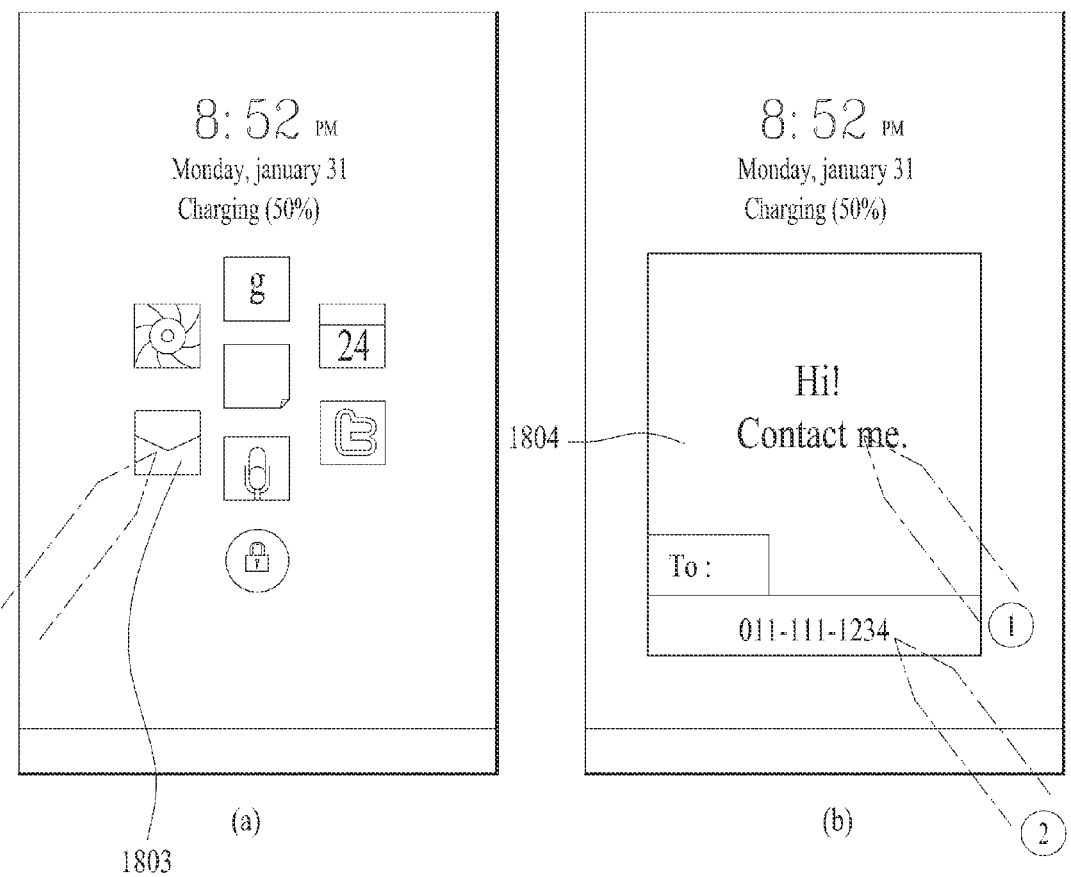

FIGS. 18A to 18C are diagrams for displaying a touch pen dedicated home screen in a screen locked state. For clarity and convenience of the following description, an indicator of an application or a widget, which is dedicated to a touch pen, may be displayed. And, a state capable of receiving an input of a touch with a touch pen shall be named a temporary screen unlocked state.

Referring to FIG. 18A, in order to set a temporary screen unlocked state, the mobile terminal 100 may receive an input of a touch with a touch pen to a random point on a screen [FIG. 18A (a)] or may receive a temporary unlock signal from a touch pen [FIG. 18A (b)]. In this case, since a touch with a touch pen to a screen lock zone may be able to set a normal screen unlocked state, assume that the random point is not the screen lock zone.

Referring to FIG. 18B, as the temporary screen unlocked state is set, the mobile terminal 100 may display an indicator of an application or a widget, which is dedicated to the touch pen [FIG. 18B (a)]. In case of receiving an input of a touch with a touch pen to an indicator 1801 of a memo application, the mobile terminal 100 may be able to display a memo window 1802 by activating the memo application [FIG. 18B (b)]. Hence, a user may be able to input a memo to the memo window 1802 using the touch pen.

Referring to FIG. 18C, in case of receiving an input of a touch with a touch pen to an indicator 1803 of a message application among application indicators displayed in the temporary screen unlocked state [FIG. 18C (a)], the mobile terminal 100 may display a message input window 1804 and may then receive a message content written via the touch pen on the displayed message input window 1804 [FIG. 18C (b)].

In case of activating an application or widget dedicated to a touch pen displayed in a temporary screen unlocked state, the mobile terminal 100 may be able to limitedly activate the corresponding application or widget under the control of the controller 180. For instance, in case of a memo application, a memo input may be allowed only (i.e., a memo search or a memo deletion is not allowed). For instance, in case of a camera application, a camera photographing may be allowed only (i.e., a taken photo search or a taken photo editing is not allowed). For instance, in case of a schedule application, a schedule addition may be allowed only (i.e., a schedule search or a schedule editing is not allowed).

According to the present invention, in case of receiving an input of a display command for displaying a touch pen dedicated application in the course of displaying a $2^{nd}$ screen in accordance with a $2^{nd}$ function execution, the mobile terminal 100 may display an executed screen of the touch pen dedicated application or an indicator of the corresponding executed screen on a prescribed region of a screen by maintaining the $2^{nd}$ screen display under the control of the controller 180.

As mentioned in the foregoing description, the $2^{nd}$ screen may include a screen displayed in case of receiving an input of a touch with a touch pen. The $2^{nd}$ screen may provide a user interface suitable for the touch pen or may include an executed screen of a function suitable for the touch pen.

For instance, a display command for displaying a touch pen dedicated application may be inputted by one of a touch to a function key or a function key zone related to the touch pen, a selection of a corresponding menu item, an input of a corresponding terminal motion, a corresponding voice input and the like.

This may be described in detail with reference to FIG. 19A and FIG. 19B as follows.

Figure 19A:
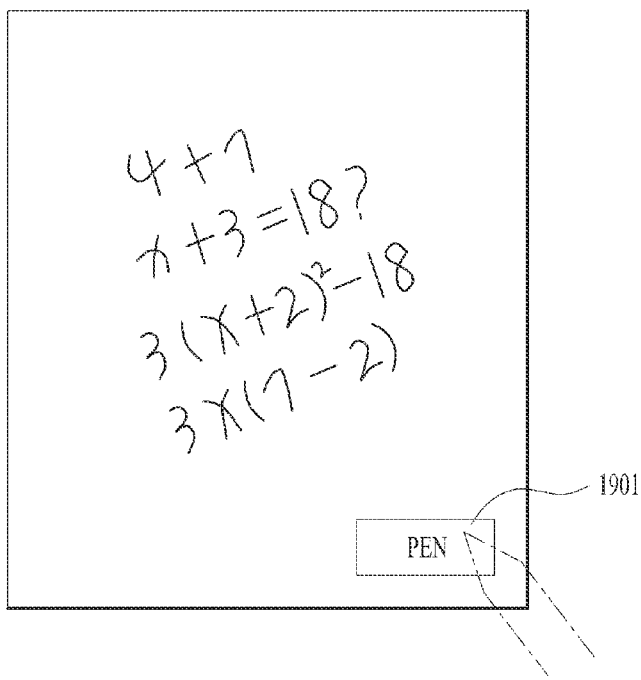
FIGS. 19A to 20B are diagrams of screen configuration for an embodiment specialized for a touch input by a touch pen.

Referring to FIG. 19A, while a memo input screen in accordance with an execution of a memo application is displayed as a $2^{nd}$ screen, the mobile terminal 100 may be able to receive an input of a touch with a touch pen to a function key zone (PEN) 1901 related to the touch pen.

Figure 19B:
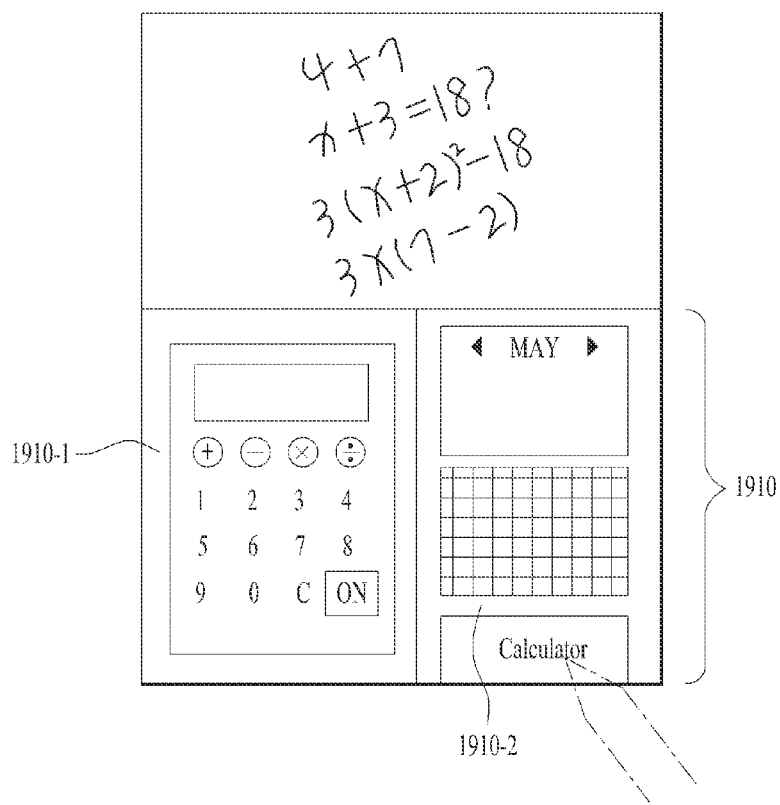

Referring to FIG. 19B, the mobile terminal 100 may partition the screen into a $1^{st}$ region and a $2^{nd}$ region. The mobile terminal 100 may display indicators of touch pen dedicated applications on the $2^{nd}$ region 1910 by keeping displaying the $2^{nd}$ screen on the $1^{st}$ region.

Moreover, in case of receiving an input of a touch with a touch pen to an indicator (calculator) of a calculator application among the displayed indicators, the mobile terminal 100 may display an executed screen of the calculator application on the $2^{nd}$ region 1910. Alternatively, the mobile terminal 100 may partition the $2^{nd}$ region 1910 into a 2-1 region 1910-1 and a 202 region 1910-2, may display an executed screen of the calculator application on the 2-1 region 1910-1, and may display indicators of the touch pen dedicated applications on the 2-2 region 1910-2.

According to the present invention, while a handwriting input is performed via a touch pen in a $2^{nd}$ screen display state, in case of receiving a touch action performed in a manner of covering a prescribed portion of a $2^{nd}$ screen with a palm, the mobile terminal 100 may dim the prescribed portion covered with the palm or may process the prescribed portion not to be seen, under the control of the controller 180.

This may be described with reference to FIG. 20A and FIG. 20B as follows.

Figure 20A:
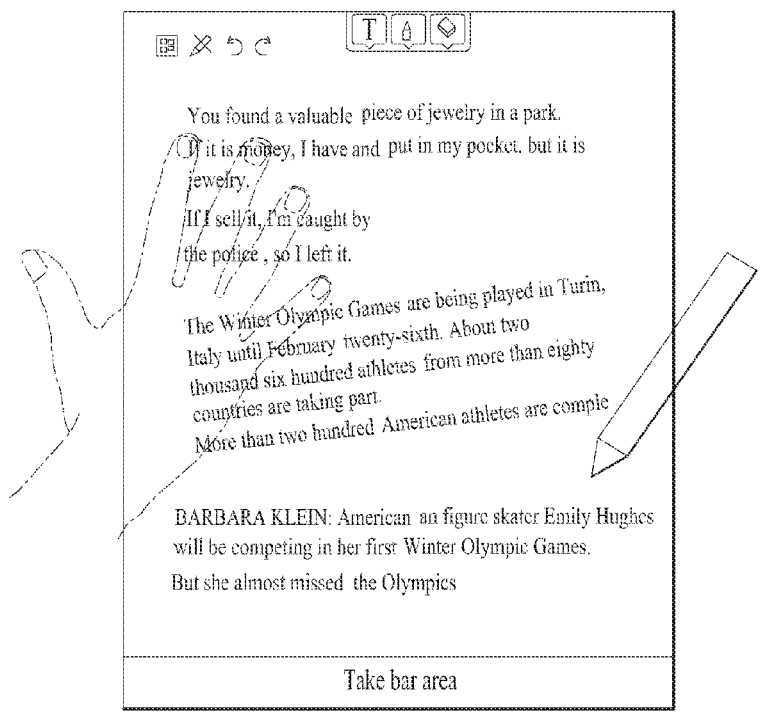

Referring to FIG. 20A, if a memo input function is performed as a $2^{nd}$ function, the mobile terminal 100 may display a $2^{nd}$ screen containing a memo content inputted via a touch pen.

Figure 20B:
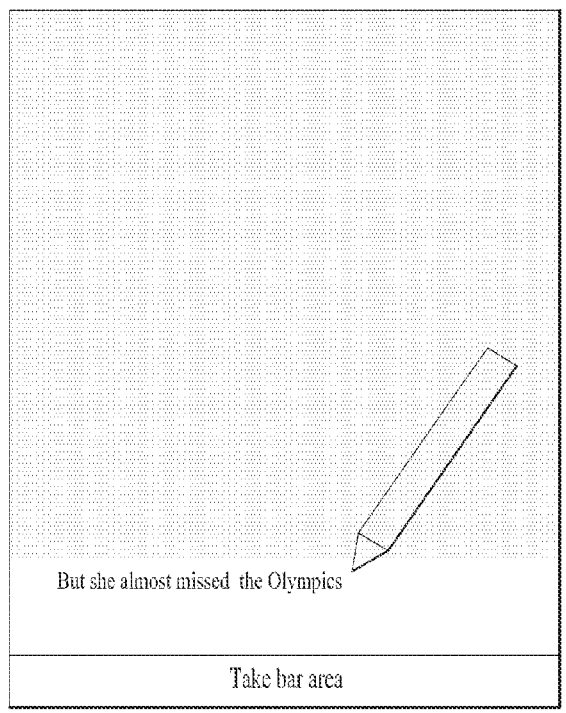

Referring to FIG. 20B, in case that a prescribed portion of the $2^{nd}$ screen is covered by a palm touch, the mobile terminal 100 may a memo content of the prescribed portion covered with the palm or may process the prescribed portion not to be seen. Moreover, if the touch with the palm is removed, the memo content of the prescribed portion may be displayed by returning to an original state.

In the following description, an embodiment for adjusting an object size displayed on a screen in accordance with whether a touch input means is a user finger or a touch pen is explained [refer to FIGS. 21 to 28B].

Figure 21:
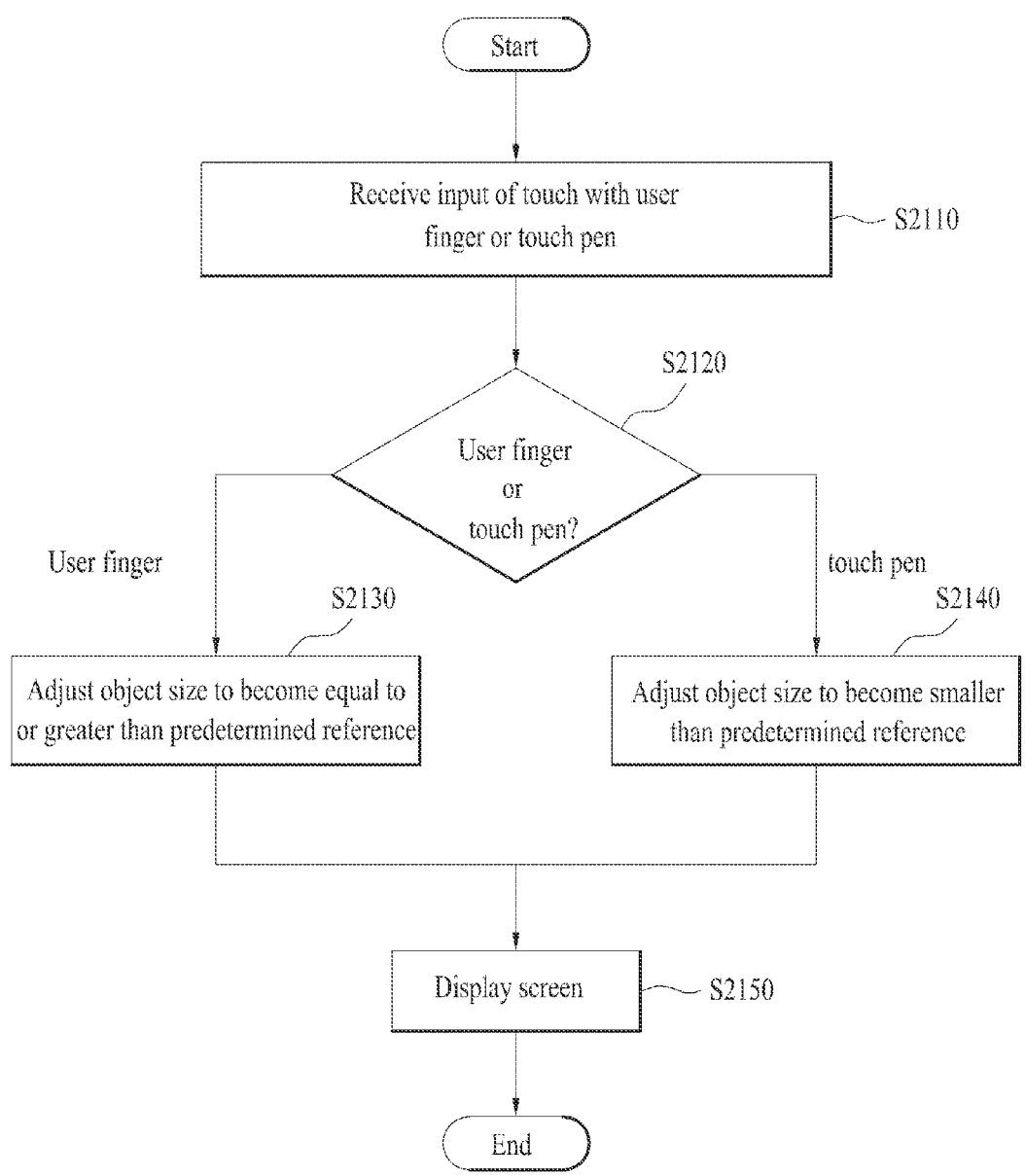
FIG. 21 is a $2^{nd}$ flowchart for a method of controlling a display in a mobile terminal according to one embodiment of the present invention.

FIG. 21 is a $2^{nd}$ flowchart for a method of controlling a display in a mobile terminal according to one embodiment of the present invention.

Referring to FIG. 21, the mobile terminal 100 may receive an input of a touch with a user finger or a touch pen to a random point on the touchscreen 151 [S2110].

As the touch inputting step S2110 is identical to the former touch inputting step S310 shown in FIG. 3, detail of the latter touch inputting step S2110 may refer to the description of the former touch inputting step S310.

The mobile terminal 100 may determine whether the touch inputted in the inputting step S2110 is a touch with a user finger or a touch with a touch pen under the control of the controller 180 [S2120].

As the determining step S2120 is identical to the former determining step S320 shown in FIG. 3, detail of the latter determining step S2120 may refer to the description of the former determining step S320.

If the touch inputted in the inputting step S2110 is determined as the touch with the user finger in the determining step S2120, the mobile terminal 100 may control a size of at least one object displayed on the screen to become equal to or greater than a predetermined reference under the control of the controller 180 [S2130].

Alternatively, if the touch inputted in the inputting step S2110 is determined as the touch with the touch pen in the determining step S2120, the mobile terminal 100 may control a size of at least one object displayed on the screen to become smaller than a predetermined reference under the control of the controller 180 [S2140].

In the controlling step S2130 or S2140, the mobile terminal 100 may be able to determine the size of the at least one object based on object size information saved in the memory 160 or object size information provided by an external server. For instance, the object size information may include object size information for a touch with a user finger and object size information for a touch with a touch pen.

While at least one application indicator is displayed, the mobile terminal 100 may receive an input of a touch with either a user finger or a touch pen [S2110]. The mobile terminal 100 may control a size of the at least one application indicator to become equal to or greater than a predetermined reference in case of the touch with the user finger [S2130]. Alternatively, the mobile terminal 100 may control a size of the at least one application indicator to become smaller than a predetermined reference in case of the touch with the touch pen [S2140].

In the controlling step S2130 or S2140, the mobile terminal 100 may control the number of objects displayed in case of the touch with the touch pen to become greater than the number of objects displayed in case of the touch with the user finger under the control of the controller 180. This reflects an effect that the number of objects is relatively decremented if a size of an object increases in case of the touch with the user finger.

The mobile terminal 100 may display a screen containing the at least one object having the size adjusted in the controlling step S2130 or S2140 using the touch screen 151 under the control of the controller 180 [S2150].

The displaying step S2150 is described in detail with reference to the accompanying drawings as follows.

Figure 22A:
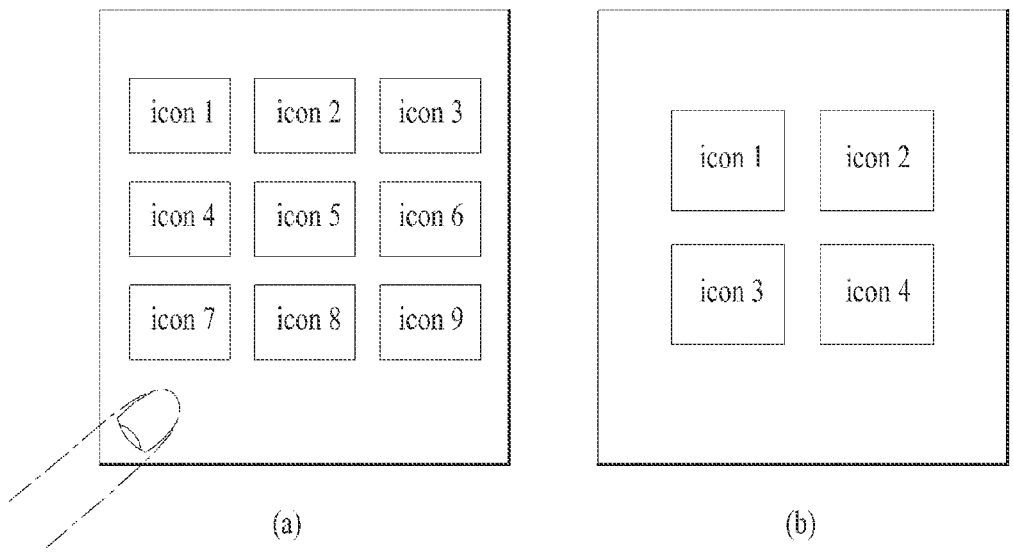
FIG. 22A and FIG. 22B are diagrams of screen configuration for adjusting sizes and the number of application indicators in accordance with a touch input means in a home screen display mode.
Figure 22B:
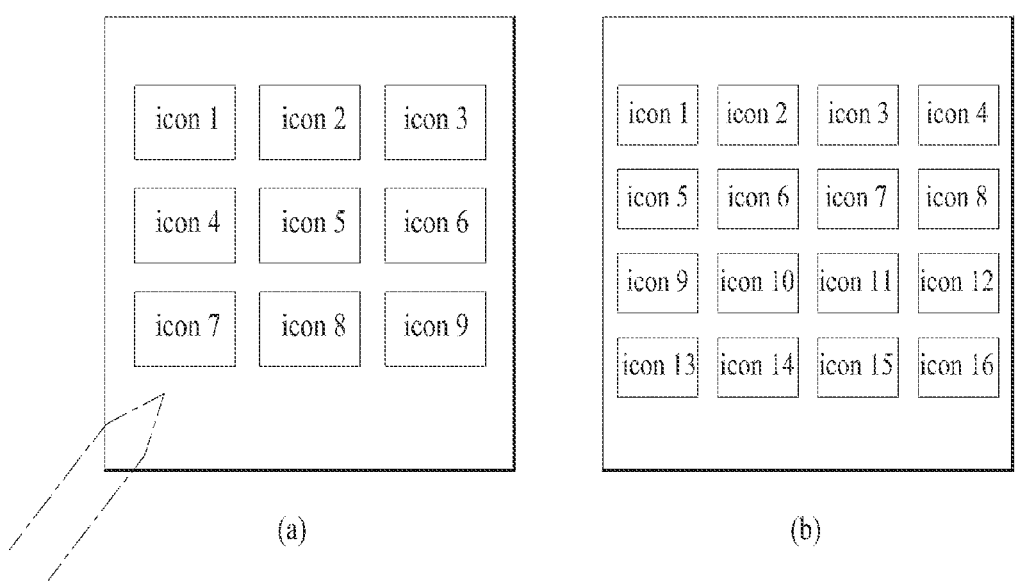

FIG. 22A and FIG. 22B are diagrams of screen configuration for adjusting sizes and the number of application indicators in accordance with a touch input means in a home screen display mode. For clarity and convenience of the following description, assume that 9 application indicators are displayed before a touch with a user finger or a touch pen.

Referring to FIG. 22A, while $1^{st}$ to $9^{th}$ application indicators (i.e., total 9 application indicators) are displayed, in case of receiving an input of a touch with a user finger to a random point within the screen [FIG. 22A (a)], the mobile terminal 100 may be able to adjust a size of each of the $1^{st}$ to $4^{th}$ application indicators to become equal to or greater than a predetermined reference while displaying the $1^{st}$ to $4^{th}$ application indicators (i.e., total 4 application indicators) [FIG. 22A(b)]. This reflects the following effect. First of all, if the touch with the user finger is inputted, a size of the application indicator increases over the predetermined reference. Secondly, the number of the application indicators is relatively decremented.

Referring to FIG. 22B, while $1^{st}$ to $9^{th}$ application indicators (i.e., total 9 application indicators) are displayed, in case of receiving an input of a touch with a touch pen to a random point within the screen [FIG. 22B (a)], the mobile terminal 100 may display $1^{st}$ to $16^{th}$ application indicators (i.e., total 16 application indicators) and may be also able to adjust a size of each of the $1^{st}$ to $16^{th}$ application indicators to become smaller than a predetermined reference while displaying the $1^{st}$ to $16^{th}$ application indicators (i.e., total 16 application indicators) [FIG. 22B (b)]. This reflects the following effect. First of all, if the touch with the touch pen is inputted, a size of the application indicator decreases smaller than the predetermined reference. Secondly, the number of the application indicators is relatively incremented.

Moreover, in case of receiving an input of a touch with a touch pen in the state shown in FIG. 22A (b), the mobile terminal 100 may enter the state shown in FIG. 22B (b). On the other hand, in case of receiving an input of a touch with a user finger in the state shown in FIG. 22B (b), the mobile terminal 100 may enter the state shown in FIG. 22A (b).

Figure 23A:
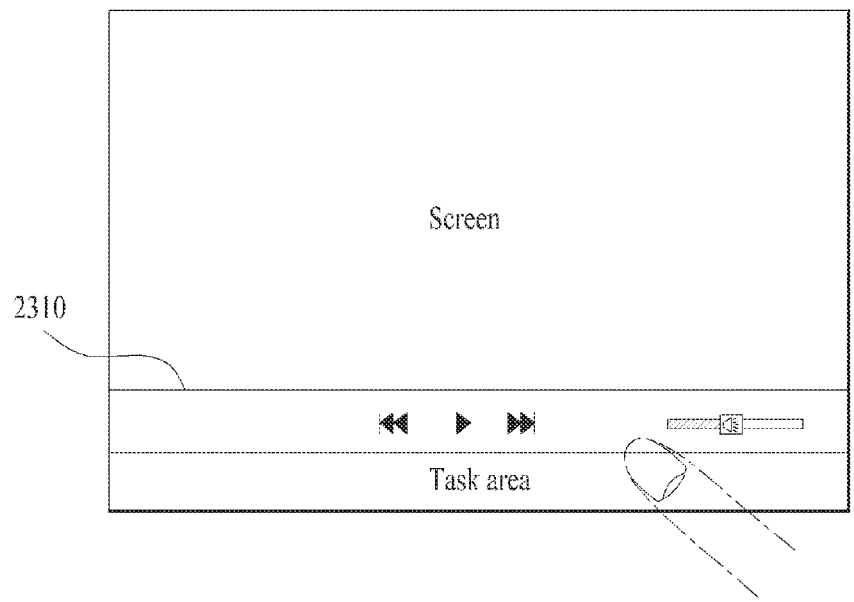
FIG. 23A and FIG. 23B are diagrams of screen configuration for adjusting a size of a control region in accordance with a touch input means for a control region in a video play mode.
Figure 23B:
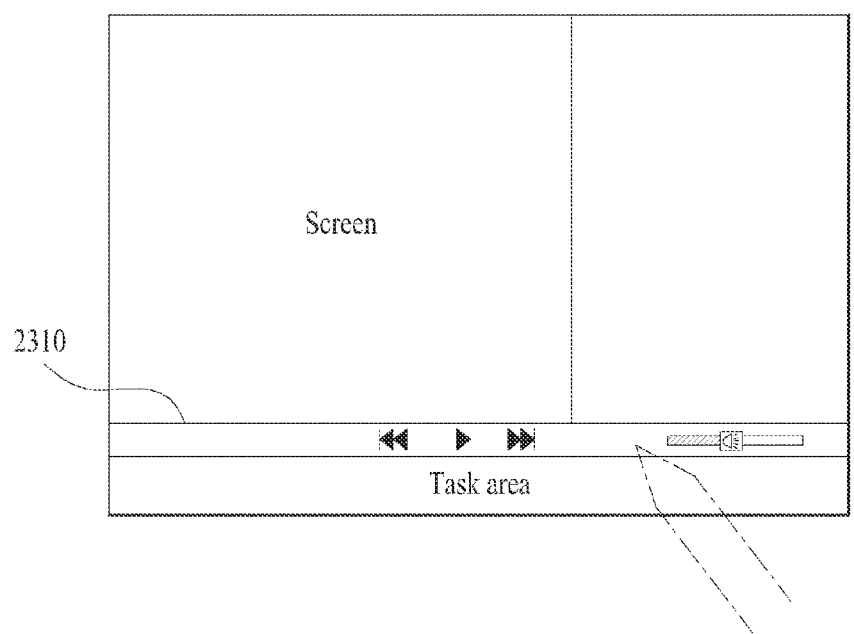

FIG. 23A and FIG. 23B are diagrams of screen configuration for adjusting a size of a control region in accordance with a touch input means for a control region in a video play mode.

Referring to FIG. 23A, if a control region displayed on a bottom of a screen in a video play mode is touched with a user finger, the mobile terminal 100 may display the control region in a manner of enlarging the control region over a predetermined size. Since it is highly probable that each key contained in the control region may be touched with a user finger having a relatively big touch size, a size of the control region is enlarged.

Referring to FIG. 23B, if a control region displayed on a bottom of a screen in a video play mode is touched with a touch pen, the mobile terminal 100 may display the control region in a manner of reducing the control region below a predetermined size. Since it is highly probable that each key contained in the control region may be touched with a touch pen having a relatively small touch size, a size of the control region is reduced. Moreover, the mobile terminal 100 may display a window for receiving an input of a memo written with a touch pen on a prescribed region of the screen as well as reduces the control region to have a size smaller than a predetermined reference.

Moreover, in case of receiving an input of a touch with a touch pen in the state shown in FIG. 23A, the mobile terminal 100 may enter the state shown in FIG. 23B. On the other hand, in case of receiving an input of a touch with a user finger in the state shown in FIG. 23B, the mobile terminal 100 may enter the state shown in FIG. 23A.

Figure 24A:
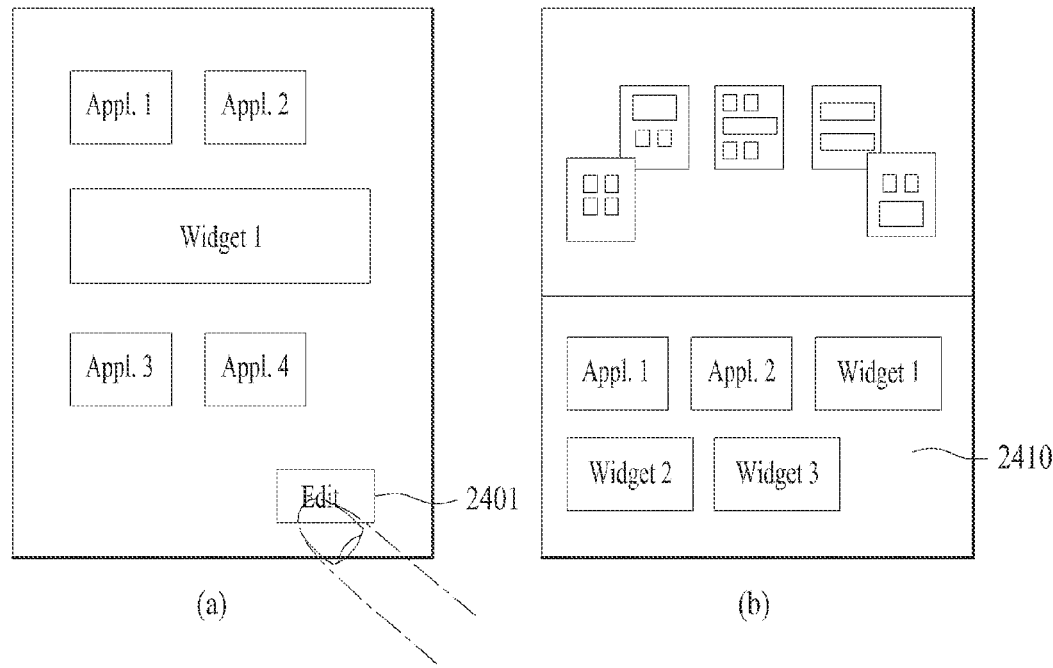
FIG. 24A and FIG. 24B are diagrams of screen configuration for adjusting sizes and number of application indicators belonging to an editing target candidate group in accordance with a touch input means in an application indicator editing mode.
Figure 24B:
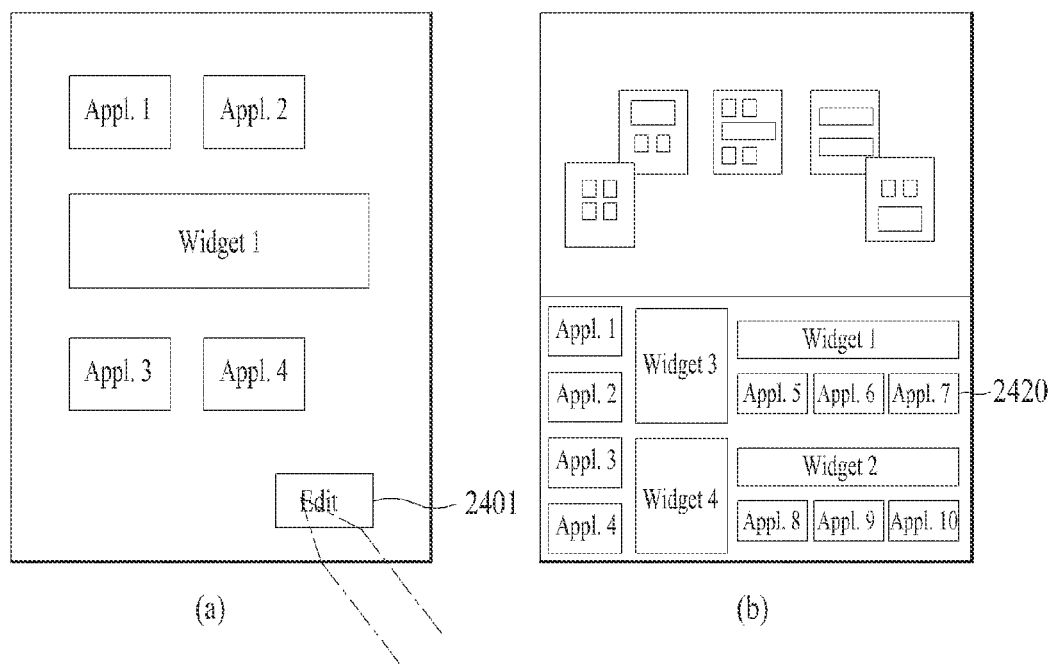

FIG. 24A and FIG. 24B are diagrams of screen configuration for adjusting sizes and number of application indicators belonging to an editing target candidate group in accordance with a touch input means in an application indicator editing mode.

Referring to FIG. 24A, in case of receiving an input of a touch with a user finer to an editing key zone 2401 provided to a screen [FIG. 24A (a)], the mobile terminal 100 may partition the screen into a plurality of regions including a $1^{st}$ region and a $2^{nd}$ region and may then display a plurality of page miniatures indicating a plurality of editable pages on the $1^{st}$ region. And, the mobile terminal 100 may display application indicators added to or deleted from a prescribed one of a plurality of pages on the $2^{nd}$ region 2410 in a size equal to or greater than a predetermined reference [FIG. 24A (b)].

Referring to FIG. 24B, in case of receiving an input of a touch with a touch pen to an editing key zone 2401 provided to a screen [FIG. 24B (a)], the mobile terminal 100 may partition the screen into a plurality of regions including a $1^{st}$ region and a $2^{nd}$ region and may then display a plurality of page miniatures indicating a plurality of editable pages on the $1^{st}$ region. And, the mobile terminal 100 may display application indicators added to or deleted from a prescribed one of a plurality of pages on the $2^{nd}$ region 2420 in a size smaller than a predetermined reference [FIG. 24B (b)].

The number of the application indicators displayed on the $2^{nd}$ region 2410 shown in FIG. 24A may be smaller than that of the application indicators displayed on the $2^{nd}$ region 2420 shown in FIG. 24. In consideration that a size of an application displayed on the former $2^{nd}$ region 2410 is greater than that of an application displayed on the latter $2^{nd}$ region 2420, the number of the application indicators displayed on the former $2^{nd}$ region 2410 is adjusted to be smaller than that of the application indicators displayed on the latter $2^{nd}$ region 2420.

According to the present invention, in case of having a dedicated touch pen, the mobile terminal 100 may be able to perform various control operations by identifying a touch with a dedicated touch pen and a touch with a user finger or a different touch pen from each other.

This is described in detail with reference to the accompanying drawings as follows. FIGS. 25A to 28B are diagrams of screen configuration for an embodiment specialized for a touch input by a dedicated touch pen.

Figure 25A:
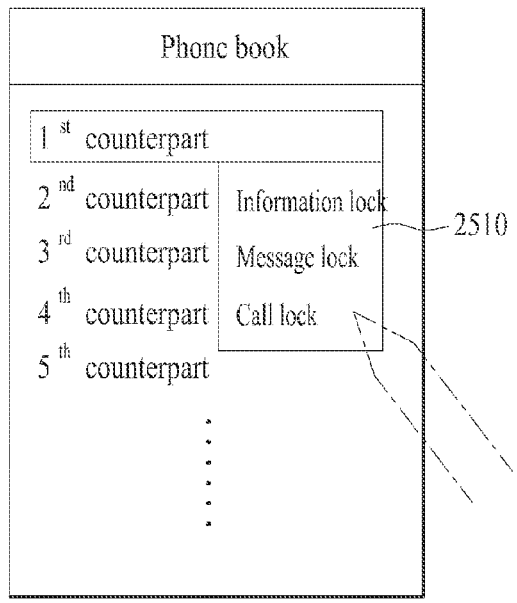
FIGS. 25A to 28B are diagrams of screen configuration for an embodiment specialized for a touch input by a dedicated touch pen.
Figure 25B:
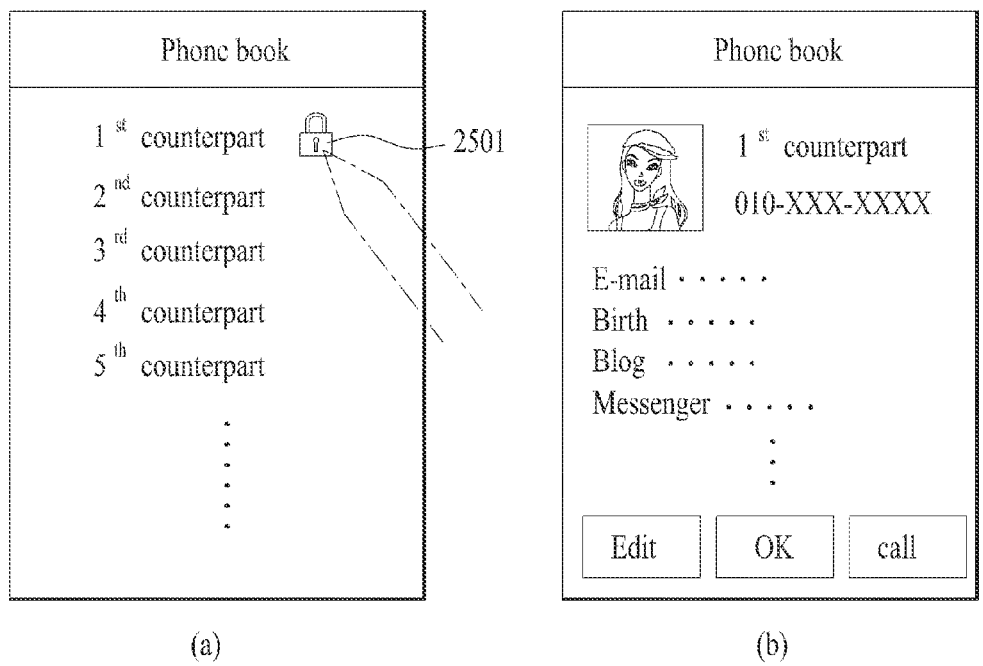
Figure 25C:
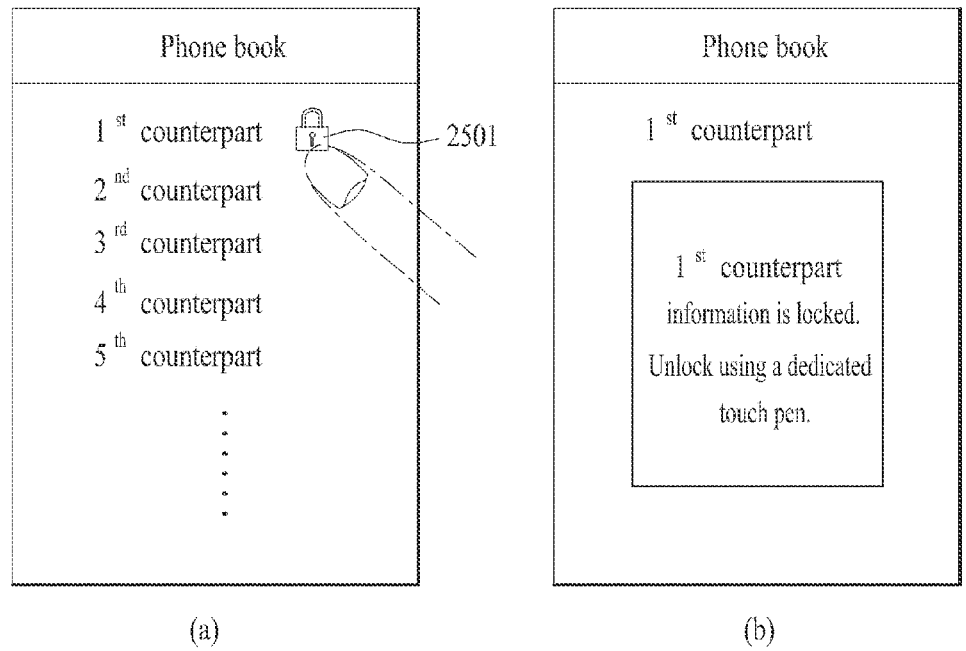
Figure 25D:
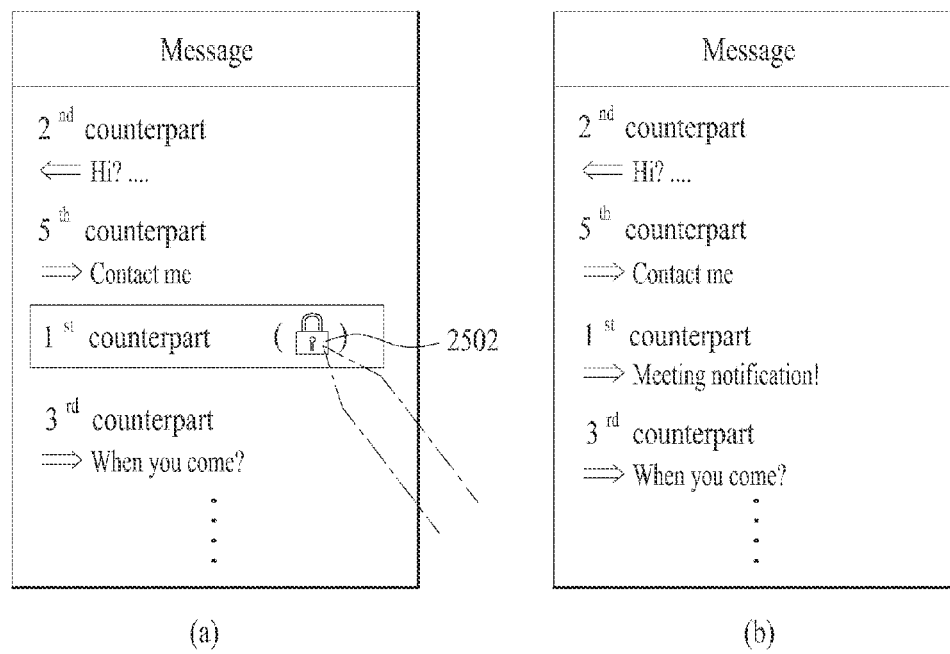
Figure 25E:
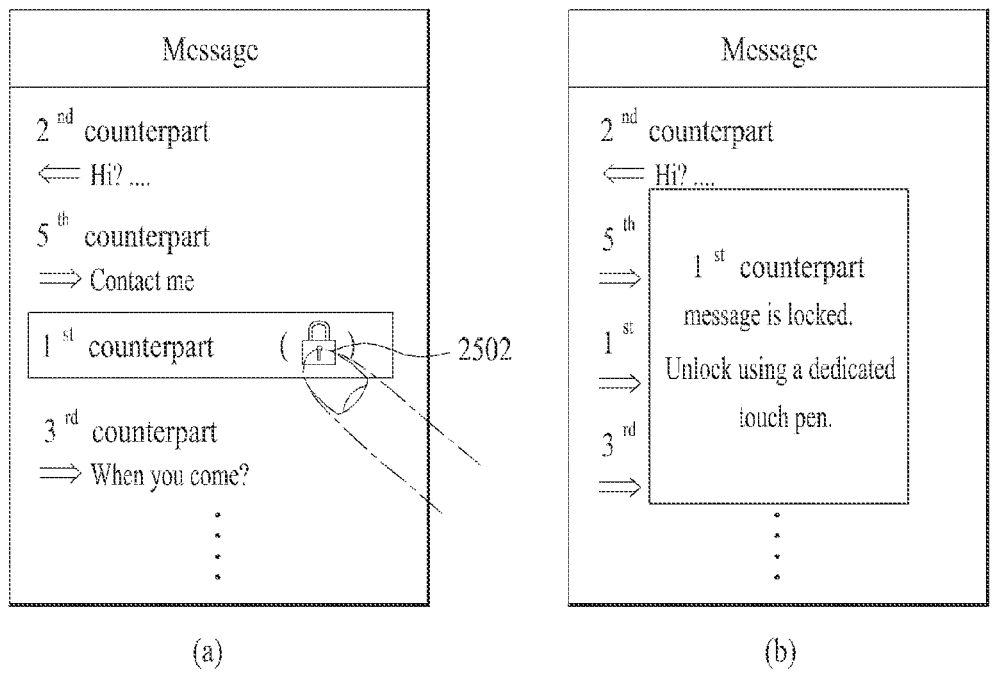

FIGS. 25A to 25C show that an information lock for a specific counterpart is cancelled by a dedicated touch pen. And, FIG. 25D and FIG. 25E show that a message lock for a specific counterpart is cancelled by a dedicated touch pen.

Referring to FIG. 25A, the mobile terminal 100 may set at least one of information lock, message lock and call lock for a specific one of a plurality of counterparts of which information (e.g., phone number, name, nickname, image, etc.) is saved in the mobile terminal 100.

Referring to FIG. 25B, while an information lock is set for a $1^{st}$ counterpart (i.e., an indicator 2501 to indicate that the $1^{st}$ counterpart is in an information locked state), in case of receiving an input of a touch with a dedicated touch pen to the $1^{st}$ counterpart [FIG. 25B (a)], the mobile terminal 100 may cancel the information locked state and may display information on the $1^{st}$ counterpart [FIG. 25B (b)].

Referring to FIG. 25C, in case of receiving an input of a touch with a user finger or a different touch pen to a 1st counterpart for which an information lock is set [FIG. 25C (a)], the mobile terminal 100 may announce that the information lock is set for the 1st counterpart and may output a text indicating that the information lock can be cancelled via a dedicated touch pen [FIG. 25C (b)].

Referring to FIG. 25D, while a message lock is set for a 1st counterpart (i.e., an indicator 2502 to indicate that the 1st counterpart is in a message locked state), in case of receiving an input of a touch with a dedicated touch pen to the 1st counterpart displayed on a message list [FIG. 25D (a)], the mobile terminal 100 may cancel the message locked state and may display messages exchanged with the 1st counterpart [FIG. 25D (b)].

Referring to FIG. 25E, in case of receiving an input of a touch with a user finger or a different touch pen to a 1st counterpart for which a message lock is set on the message list [FIG. 25E (a)], the mobile terminal 100 may announce that the message lock is set for the 1st counterpart and may output a text indicating that the message lock can be cancelled via a dedicated touch pen [FIG. 25E (b)].

Figure 26A:
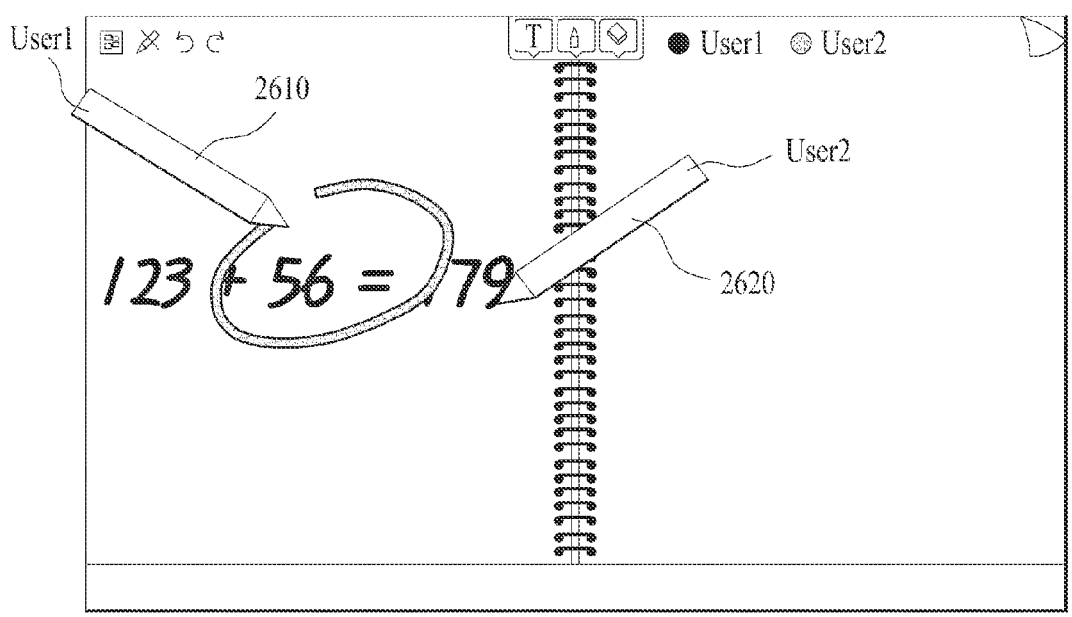

FIG. 26A and FIG. 26B show another embodiment for identifying a touch input by a dedicated touch pen.

Referring to FIG. 26A, the mobile terminal 100 may receive an input of a 1st touch with a dedicated touch pen 2610 and an input of a 2nd touch with a different touch pen 2620. And, the mobile terminal 100 may set a color 2601 of a memo content by the touch with the dedicated touch pen to differ from a color 2602 of a memo content by the touch with the different touch pen 2620.

Referring to FIG. 26B, while a lock is set for a specific memo, if a touch action by a dedicated touch pen is necessary to cancel the lock of the specific memo, the mobile terminal 100 may display a locked specific memo 2630 [FIG. 26B (a)] and may receive an input of a touch action by a dedicated touch pen on the specific memo 2630 [FIG. 26B (b)].

If the mobile terminal 100 determines that the touch action by the dedicated touch pen is inputted to at least one predetermined portion of the specific memo 2630, the mobile terminal 100 may display a memo content of the specific memo 2630 [FIG. 26B (c), FIG. 26B (d)].

Figure 27A:
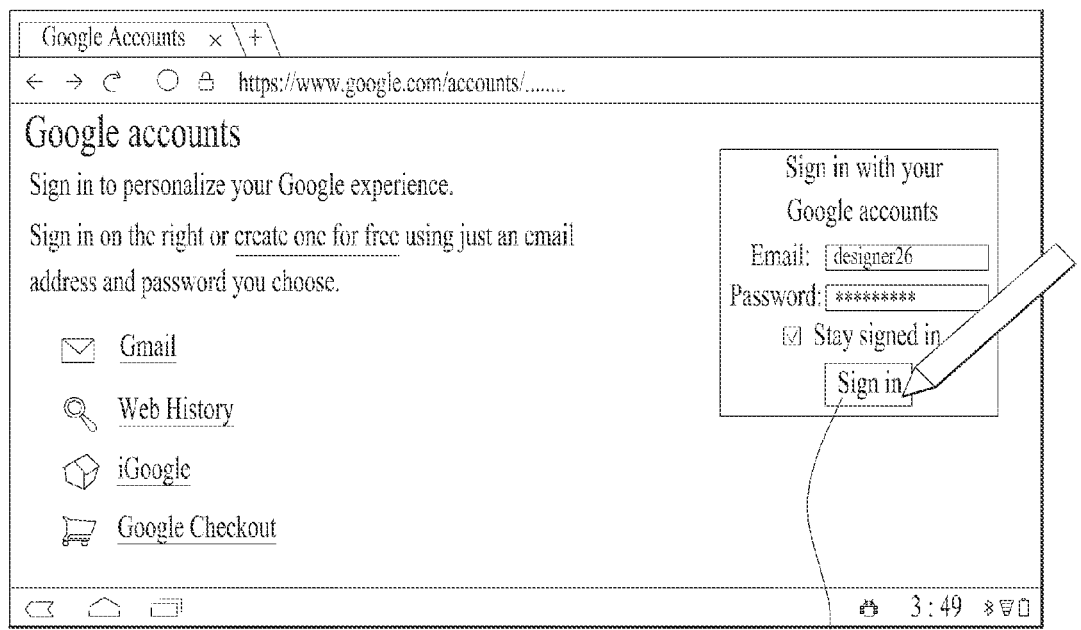
Figure 27A:
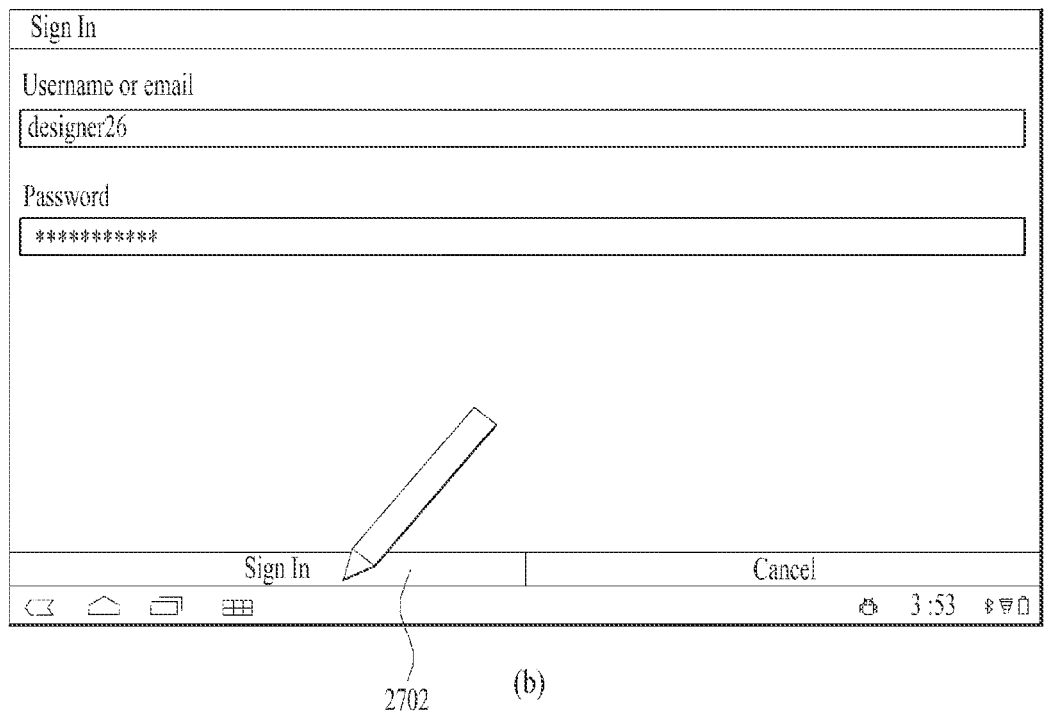

FIG. 27A is a diagram for automatically inputting an ID and a password in case of receiving an input of a command for a login to a website via a dedicated touch pen. And, FIG. 27B is a diagram for automatically inputting a user signature in case of writing an email using a dedicated touch pen.

Referring to FIG. 27A, while a specific website (e.g., an email transceiving website, an SNS website, etc.) is accessed, in case of receiving an input of a touch with a dedicated touch pen to a login command zone, the mobile terminal 100 may automatically receive an input of an ID and password registered at the specific website.

For instance, the ID and password registered at the specific website are saved in the dedicated touch pen. If the login command zone is touched with the dedicated touch pen, the saved ID and password may be automatically transmitted and inputted to the mobile terminal 100. For another instance, the ID and password registered at the specific website are saved in the memory 160. If the login command zone is touched with the dedicated touch pen, the saved ID and password may be automatically inputted to the mobile terminal 100.

Figure 27B:
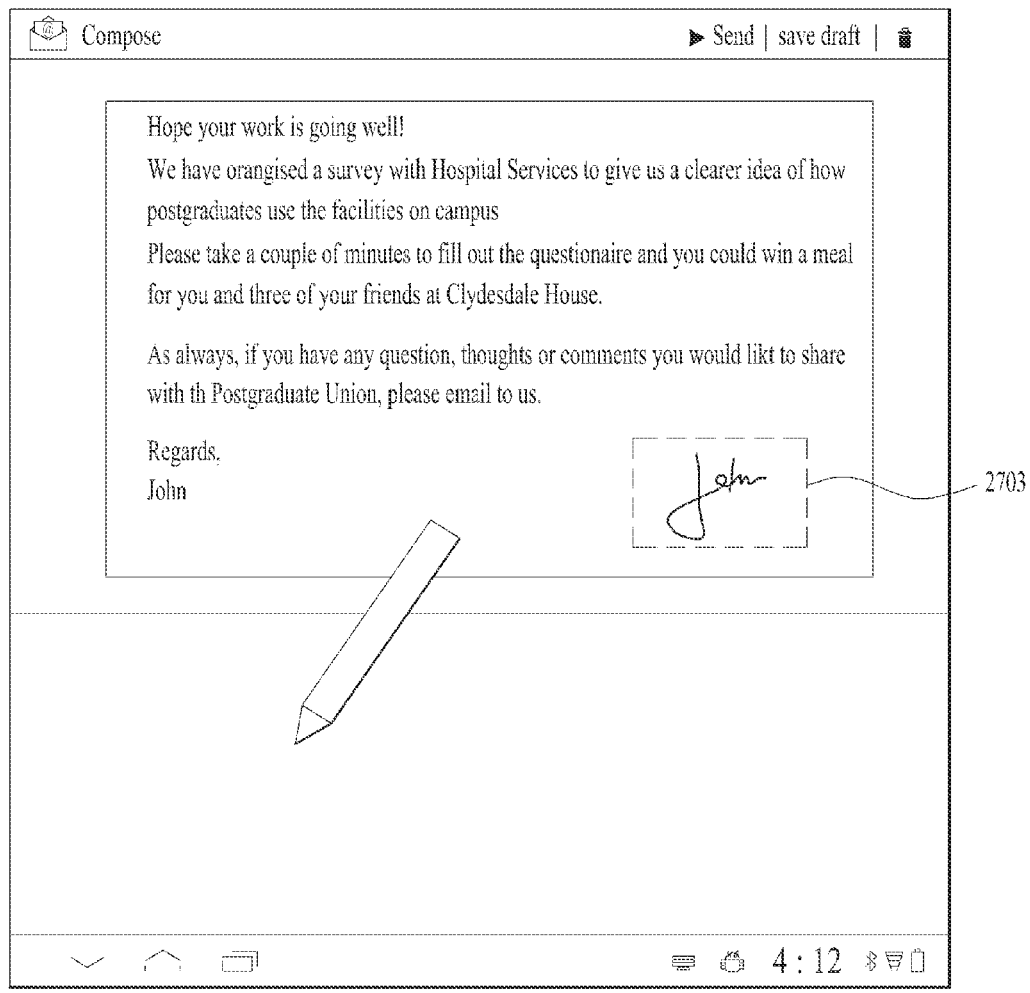

Referring to FIG. 27B, if an email content is written using a dedicated touch pen or a sending or saving command is inputted by the dedicated touch pen after completion of the email writing, the mobile terminal 100 may have a user signature 2703 attached to the written email content automatically.

For instance, when a user signature is saved in the dedicated touch pen, if a sending command zone is touched with the dedicated touch pen, the saved user signature may be automatically transmitted and inputted to the mobile terminal 100. For another instance, after a user signature has been saved in the memory 160 in advance, if the sending command zone is touched with the dedicated touch pen, the saved user signature may be automatically inputted to the mobile terminal 100.

Moreover, the embodiment shown in FIG. 27B may be applicable to a document writing, a message writing, a memo writing and the like as well as the email writing.

Figure 28A:
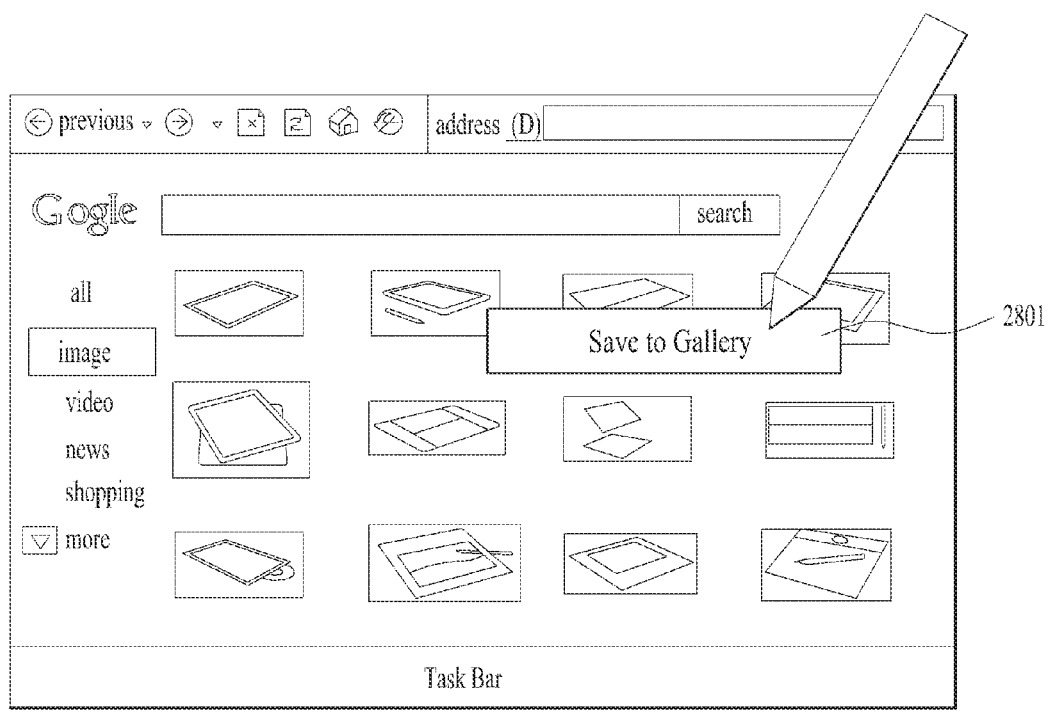
Figure 28B:
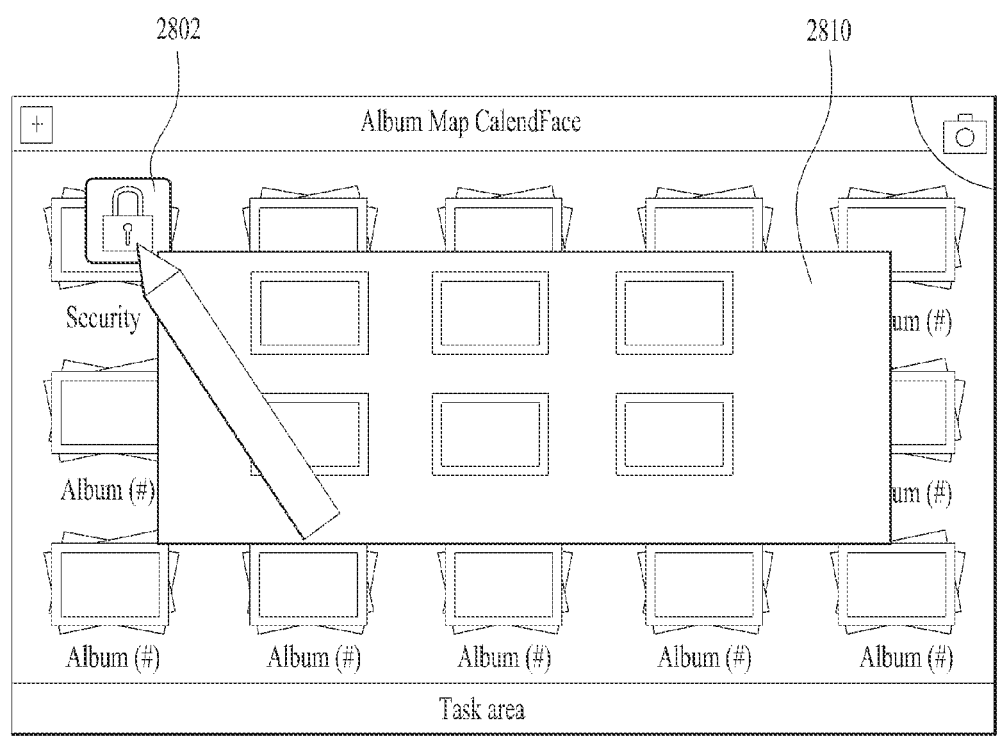

FIG. 28A and FIG. 28B show an embodiment for automatically saving target information in a security folder in case of receiving an input of an information saving command by a dedicated touch pen. For instance, the saving target information may include at least one of an image, an audio file, a video file, a document, a message, a schedule and the like, of which format is non-limited. And, the security folder may mean a folder requesting a prescribed authentication procedure (e.g., a password input, etc.) to release information saved therein.

Referring to FIG. 28A, the mobile terminal 100 may receive an input of a touch corresponding to a saving command with a dedicated touch pen to a specific one 2801 of a plurality of images. And, the mobile terminal 100 may save the specific image 2801 in the security folder. For instance, a long touch to the specific image 2801 may be inputted as the touch corresponding to the saving command, Referring to FIG. 28B, in case of receiving an input of a touch with a dedicated touch pen to a security folder icon 2802 of a security folder having a specific image 2801 saved therein, the mobile terminal 100 may display informations 2810 saved in the security folder. In this case, an authentication procedure for an access to the security folder may be omitted owing to the touch with the dedicated touch pen to the security folder icon 2801.

According to one embodiment of the present invention, the above-described display controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

Accordingly, the present invention provides the following effects and/or advantages.

First of all, since a different function can be executed in accordance with whether a means for touching a touchscreen is a user finger or a touch pen, a user determines a specific function to execute or activate in advance and may be then able to select a corresponding touch means.

Secondly, since a size of an object contained in a screen may be adjusted in accordance with whether a means for touching a touchscreen is a user finger or a touch pen, a touch error can be reduced by enlarging an object size in case of the user finger having a relatively large touch size. And, more objects can be provided to a screen in a manner of reducing an object size in case of the touch pen having a relatively small touch size.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a touch screen configured to:
   display information; and
   receive a touch input via at least a finger of a user or a touch pen; and
a controller configured to:
   determine whether the touch input was received via the finger of the user or via the touch pen;
   cause the touch screen to display a first screen corresponding to a first function when it is determined that the touch input is received via the finger of the user;
   determine whether the touch pen is a dedicated touch pen that is dedicatedly used for the mobile terminal when it is determined that the touch input was received via the touch pen;
   cause the touch screen to display a second screen corresponding to a second function when it is determined that the touch input is received via the dedicated touch pen; and
   execute the first function and the second function in a same application or execute the first function via a first application and execute the second function via a second application different from the first application; and
   cause the touch screen to display a list including a plurality of contacts corresponding to a plurality of counterparts wherein the touch input is received at a specific contact included in the displayed list;
   wherein one of the first function or the second function comprises causing the touch screen to display contact information related to the specific contact and the other of the first function or the second function comprises transmitting data to the specific contact.

2. The mobile terminal of claim 1, wherein:
the first function comprises an information display function; and
the second function comprises an information input function.

3. The mobile terminal of claim 1, wherein:
the first function comprises a function that does not involve information input; and
the second function is a touch pen dedicated function.

4. The mobile terminal of claim 1, wherein the controller is further configured to determine whether the touch input was received via the finger of the user or the touch pen based on at least a touch size, a touch pressure, an electrostatic variation attributed to the received touch input, or a temperature variation attributed to the received touch input.

5. The mobile terminal of claim 1, further comprising:
a wireless communication unit configured to receive a prescribed signal from the touch pen,
wherein the controller is further configured to determine that the touch input was received via the touch pen based on the received prescribed signal.

6. The mobile terminal of claim 1, wherein the controller is further configured to:
cease execution of the first function and begin execution of the second function when the touch input is received via the touch pen while the first screen is displayed on the touch screen; and
cease execution of the second function and begin execution of the first function when the touch input is received via the finger of the user while the second screen is displayed on the touch screen.

7. The mobile terminal of claim 1, wherein:
the controller is further configured to control the touch screen to display a calendar comprising at least one scheduled event, wherein the touch input is received at a specific scheduled event of the displayed at least one scheduled event; and
one of the first function or the second function comprises causing the touch screen to display information related to the specific scheduled event, and
another of the first function or the second function comprises causing the touch screen to display a screen for adding a scheduled event to the calendar for a date corresponding to the specific scheduled event or causing the touch screen to display a screen for editing the specific scheduled event.

8. The mobile terminal of claim 1, wherein:
the controller is further configured to control the touch screen to display a map, wherein the touch input is received at a specific point of the displayed map;
one of the first function or the second function comprises causing the touch screen to enlarge the map centering on the specific point; and
another of the first function or the second function comprises setting a place corresponding to the specific point as a destination or causing the touch screen to display a screen for inputting a memo related to the specific point.

9. The mobile terminal of claim 1, wherein:
the controller is further configured to control the touch screen to display an image list including at least one image, wherein the touch input is received at a specific image of the displayed at least one image;
one of the first function or the second function comprises causing the touch screen to display an enlarged view of the specific image; and
another of the first function or the second function comprises transmitting the specific image or causing the touch screen to display a screen for inputting a memo related to the specific image.

10. The mobile terminal of claim 1, wherein:
the controller is further configured to control the touch screen to display a webpage including an input region, wherein the touch input is received at the displayed input region;
one of the first function or the second function comprises causing the touch screen to display a virtual keypad; and
another of the first function or the second function comprises causing the touch screen to display a direct input window configured for receiving handwriting input.

11. The mobile terminal of claim 1, wherein:
the controller is further configured to control the touch screen to display a specific page of a plurality of pages of an electronic book (e-book), wherein the touch input is received at the displayed specific page;
the first function comprises causing the touch screen to cease displaying the specific page and to display another page of the plurality of pages of the e-book; and the second function comprises activating a mode for receiving pen drawing input via the touch pen.

12. The mobile terminal of claim 1, wherein:
the second screen is a touch pen dedicated home screen; and
the controller is further configured to control the touch screen to display the touch pen dedicated home screen in response to the touch input via the touch pen to a home screen displayed on the touch screen or to an unlock region of a locked screen displayed on the touch screen.

13. The mobile terminal of claim 1, wherein the controller is further configured to:
control the touch screen to display a locked screen including at least one indicator for an application requiring a touch input via the touch pen;
control the touch screen to display an unlocked screen in response to the touch input via the touch pen, wherein the touch input is received at a specific one of the at least one indicator; and
execute an application corresponding to the specific one of the at least one indicator.

14. The mobile terminal of claim 1, wherein the controller is further configured to control the touch screen to display:
a function key related to the touch pen when the second screen is displayed on the touch screen; and
at least one indicator related to a touch pen dedicated application in response to a second touch input via the touch pen to the function key.

15. The mobile terminal of claim 1, wherein the controller is further configured to activate a mode for controlling execution of a function and controlling a screen displayed on the touch screen based on whether the touch input was received via the finger of the user or via the touch pen.

16. The mobile terminal of claim 1, wherein the controller is further configured to recognize the touch pen as being associated with the mobile terminal.

17. The mobile terminal of claim 1, wherein the controller is further configured to control the touch screen to:
display at least one object;
increase a displayed size of the at least one object to at least a predetermined reference size when the touch input is received via one of the finger of the user or the touch pen; and
decrease the displayed size of the at least one object to less than the predetermined reference size when the touch input is received via another of the finger of the user or the touch pen.

18. The mobile terminal of claim 17, further comprising a memory for storing information,
wherein the predetermined reference size is determined based on object size information saved in the memory or object size information received from an external server.

19. The mobile terminal of claim 17, wherein the controller is further configured to control the touch screen to:
display at least one application indicator;
increase a displayed size of the at least one application indicator to at least a predetermined reference size when the touch input is received via one of the finger of the user or the touch pen; and
decrease the displayed size of the at least one application indicator to less than the predetermined reference size when the touch input is received via another of the finger of the user or the touch pen.

20. The mobile terminal of claim 17, wherein the controller is further configured to:
control the touch screen to display a first number of objects of the at least one object when the displayed size of the at least one object is less than the predetermined reference size; and
control the touch screen to display a second number of the at least one object when the displayed size of the at least one object is greater than the predetermined reference size;
wherein the first number is greater than the second number.

21. A method of controlling a display in a mobile terminal, the method comprising:
receiving a touch input on a touch screen of the mobile terminal via at least a finger of a user or a touch pen;
determining whether the touch input was received via the finger of the user or via the touch pen;
displaying a first screen corresponding to a first function when it is determined that the touch input is received via the finger of the user;
determining whether the touch pen is a dedicated touch pen that is dedicatedly used for the mobile terminal when it is determined that the touch input was received via the touch pen;
displaying a second screen corresponding to a second function when it is determined that the touch input is received via the dedicated touch pen; and
executing the first function and the second function in a same application or executing the first function in a first application and executing the second function in a second application different from the first application; and
displaying a list including a plurality of contacts corresponding to a plurality of counterparts wherein the touch input is received at a specific contact included in the displayed list;
wherein one of the first function or the second function comprises displaying contact information related to the specific contact and the other of the first function or the second function comprises transmitting data to the specific contact.

* * * * *